(12) United States Patent
McGinnis et al.

(10) Patent No.: US 9,679,423 B2
(45) Date of Patent: Jun. 13, 2017

(54) SYSTEMS AND METHODS OF CREATING AND DELIVERING ITEM OF MANUFACTURE SPECIFIC INFORMATION TO REMOTE DEVICES

(71) Applicant: TWEDDLE GROUP, Clinton Township, MI (US)

(72) Inventors: Patrick McGinnis, Rochester, MI (US); James Brei, Milford, MI (US); Michael Martin Flaherty, Oxford, MI (US); Joseph O'Deven, Auburn Hills, MI (US)

(73) Assignee: TWEDDLE GROUP, Clinton Township, MI (US)

( * ) Notice: Subject to any disclaimer, the term of this patent is extended or adjusted under 35 U.S.C. 154(b) by 0 days.

(21) Appl. No.: 14/968,529

(22) Filed: Dec. 14, 2015

(65) Prior Publication Data

US 2016/0171798 A1  Jun. 16, 2016

Related U.S. Application Data

(63) Continuation of application No. 14/448,683, filed on Jul. 31, 2014, now Pat. No. 9,367,973.

(Continued)

(51) Int. Cl.
*B60W 50/14* (2012.01)
*G07C 5/08* (2006.01)
(Continued)

(52) U.S. Cl.
CPC ........... *G07C 5/0808* (2013.01); *B60W 50/14* (2013.01); *G05B 19/418* (2013.01); *G06Q 10/10* (2013.01);
(Continued)

(58) Field of Classification Search
CPC .... G07C 5/0816; G07C 5/0808; G07C 5/006; G07C 5/008; B60W 50/14; B60W 2050/146
See application file for complete search history.

(56) References Cited

U.S. PATENT DOCUMENTS 5,809,437 A  9/1998 Breed
6,009,970 A  1/2000 Breed
(Continued)

FOREIGN PATENT DOCUMENTS

GB  2 263 376 A  7/1993
WO  2015/017711 A1  2/2015

OTHER PUBLICATIONS

"Apple Reinvents the Vehicle Owner's Manual—Patently Apple," Mar. 20, 2014, retrieved on May 5, 2014, from http://www.patentlyapple.com/patently-apple/2014/03/apple-reinvents-the-vehicle-owners- . . . , 10 pages.
(Continued)

*Primary Examiner* — Michael J Zanelli
(74) *Attorney, Agent, or Firm* — Seed IP Law Group LLP

(57) ABSTRACT

An asset authoring and delivery system generates a number of authored assets. Each of the authored assets includes a number of asset content objects that are logically associated with one or more components included in the item of manufacture. The authored assets generated by the asset authoring and delivery system are formatted and communicated to one or more remote devices logically associated with the item of manufacture. Authored assets may be provided responsive to one or more sensed characteristics, for instance vehicle operational parameters, vehicle operation and/or driver behavior, and may be customized to a make and/or model of vehicle.

33 Claims, 27 Drawing Sheets

Related U.S. Application Data

(60) Provisional application No. 61/861,887, filed on Aug. 2, 2013, provisional application No. 61/865,463, filed on Aug. 13, 2013.

(51) Int. Cl.
*G05B 19/418* (2006.01)
*G06Q 10/10* (2012.01)
*G07C 5/00* (2006.01)

(52) U.S. Cl.
CPC ......... *G06Q 10/1095* (2013.01); *G07C 5/002* (2013.01); *G07C 5/006* (2013.01); *G07C 5/008* (2013.01); *G07C 5/0816* (2013.01); *G07C 5/0841* (2013.01); *B60W 2050/146* (2013.01); *Y02P 90/14* (2015.11)

(56) References Cited

U.S. PATENT DOCUMENTS

| | | | |
|---|---|---|---|
| 6,141,611 A | 10/2000 | Mackey et al. |
| 6,175,787 B1 | 1/2001 | Breed |
| 6,179,326 B1 | 1/2001 | Breed et al. |
| 6,234,519 B1 | 5/2001 | Breed |
| 6,326,704 B1 | 12/2001 | Breed et al. |
| 6,330,499 B1 | 12/2001 | Chou et al. |
| 6,484,080 B2 | 11/2002 | Breed |
| 6,505,106 B1 | 1/2003 | Lawrence et al. |
| 6,533,316 B2 | 3/2003 | Breed et al. |
| 6,636,790 B1 | 10/2003 | Lightner et al. |
| 6,648,367 B2 | 11/2003 | Breed et al. |
| 6,662,642 B2 | 12/2003 | Breed et al. |
| 6,733,036 B2 | 5/2004 | Breed et al. |
| 6,735,506 B2 | 5/2004 | Breed et al. |
| 6,738,697 B2 | 5/2004 | Breed |
| 6,745,151 B2 | 6/2004 | Marko et al. |
| 6,748,797 B2 | 6/2004 | Breed et al. |
| 6,823,244 B2 | 11/2004 | Breed |
| 6,850,824 B2 | 2/2005 | Breed |
| 6,905,135 B2 | 6/2005 | Breed |
| 6,988,026 B2 | 1/2006 | Breed et al. |
| 7,048,185 B2 | 5/2006 | Hart |
| 7,050,897 B2 | 5/2006 | Breed et al. |
| 7,082,359 B2 | 7/2006 | Breed |
| 7,103,460 B1 | 9/2006 | Breed |
| 7,164,117 B2 | 1/2007 | Breed et al. |
| 7,253,725 B2 | 8/2007 | Breed et al. |
| 7,284,769 B2 | 10/2007 | Breed |
| 7,313,467 B2 | 12/2007 | Breed et al. |
| 7,379,800 B2 | 5/2008 | Breed |
| 7,408,453 B2 | 8/2008 | Breed |
| 7,421,321 B2 | 9/2008 | Breed et al. |
| 7,444,210 B2 | 10/2008 | Breed et al. |
| 7,467,034 B2 | 12/2008 | Breed et al. |
| 7,477,968 B1 | 1/2009 | Lowrey et al. |
| 7,481,453 B2 | 1/2009 | Breed |
| 7,502,672 B1 | 3/2009 | Kolls |
| 7,527,288 B2 | 5/2009 | Breed |
| 7,542,833 B2 | 6/2009 | Kelly et al. |
| 7,549,327 B2 | 6/2009 | Breed |
| 7,555,370 B2 | 6/2009 | Breed et al. |
| 7,580,782 B2 | 8/2009 | Breed et al. |
| 7,602,313 B2 | 10/2009 | Breed et al. |
| 7,603,894 B2 | 10/2009 | Breed |
| 7,617,028 B2 | 11/2009 | Kelly et al. |
| 7,630,802 B2 | 12/2009 | Breed |
| 7,635,043 B2 | 12/2009 | Breed |
| 7,636,623 B2 | 12/2009 | Kelly et al. |
| 7,648,164 B2 | 1/2010 | Breed |
| 7,650,210 B2 | 1/2010 | Breed |
| 7,657,354 B2 | 2/2010 | Breed et al. |
| 7,663,502 B2 | 2/2010 | Breed |
| 7,672,756 B2 | 3/2010 | Breed |
| 7,693,626 B2 | 4/2010 | Breed et al. |
| 7,760,080 B2 | 7/2010 | Breed et al. |
| 7,786,864 B1 | 8/2010 | Shostak et al. |
| 7,825,782 B2 | 11/2010 | Hermann |
| 7,832,762 B2 | 11/2010 | Breed |
| 7,880,594 B2 | 2/2011 | Breed et al. |
| 7,889,096 B2 | 2/2011 | Breed |
| 7,911,324 B2 | 3/2011 | Breed et al. |
| 8,006,121 B1 | 8/2011 | Samoilova et al. |
| 8,019,501 B2 | 9/2011 | Breed |
| 8,019,503 B2 | 9/2011 | Andreasen et al. |
| 8,024,084 B2 | 9/2011 | Breed |
| 8,036,788 B2 | 10/2011 | Breed |
| 8,060,282 B2 | 11/2011 | Breed |
| 8,131,417 B2 | 3/2012 | Picard |
| 8,157,047 B2 | 4/2012 | Breed |
| 8,169,311 B1 | 5/2012 | Breed |
| 8,180,379 B2 | 5/2012 | Forstall et al. |
| 8,229,624 B2 | 7/2012 | Breed |
| 8,285,439 B2 | 10/2012 | Hodges |
| 8,346,432 B2 | 1/2013 | Van Wiemeersch et al. |
| 8,346,438 B2 | 1/2013 | Breed |
| 8,405,512 B2 | 3/2013 | Johnson |
| 8,443,226 B2 | 5/2013 | Samoilova et al. |
| 8,452,529 B2 | 5/2013 | Alten |
| 8,482,399 B2 | 7/2013 | Breed |
| 8,521,654 B2 | 8/2013 | Ford et al. |
| 8,972,097 B2 | 3/2015 | McQuade et al. |
| 9,141,935 B2 | 9/2015 | Apostolides |
| 2001/0037460 A1 | 11/2001 | Porcari |
| 2003/0014387 A1 | 1/2003 | Kreidler et al. |
| 2003/0216889 A1 | 11/2003 | Marko et al. |
| 2004/0068525 A1 | 4/2004 | Yamazaki |
| 2005/0192727 A1 | 9/2005 | Shostak et al. |
| 2007/0078695 A1 | 4/2007 | Zingelewicz et al. |
| 2007/0126561 A1 | 6/2007 | Breed |
| 2007/0205881 A1 | 9/2007 | Breed |
| 2007/0250228 A1 | 10/2007 | Reddy et al. |
| 2008/0046149 A1 | 2/2008 | Breed |
| 2008/0065290 A1 | 3/2008 | Breed et al. |
| 2008/0086240 A1 | 4/2008 | Breed |
| 2008/0119966 A1 | 5/2008 | Breed et al. |
| 2008/0120175 A1 | 5/2008 | Doering |
| 2008/0140278 A1 | 6/2008 | Breed |
| 2008/0147280 A1 | 6/2008 | Breed |
| 2008/0154691 A1 | 6/2008 | Wellman et al. |
| 2008/0157510 A1 | 7/2008 | Breed et al. |
| 2008/0161989 A1 | 7/2008 | Breed |
| 2008/0186205 A1 | 8/2008 | Breed |
| 2008/0204279 A1 | 8/2008 | Bourgault |
| 2008/0208609 A1 | 8/2008 | Preece et al. |
| 2008/0231434 A1 | 9/2008 | Hermann |
| 2009/0106036 A1 | 4/2009 | Tamura et al. |
| 2009/0108140 A1 | 4/2009 | Adams et al. |
| 2009/0143923 A1 | 6/2009 | Breed |
| 2009/0182492 A1 | 7/2009 | Alten |
| 2009/0182533 A1 | 7/2009 | Neuenschwander et al. |
| 2009/0237245 A1 | 9/2009 | Brinton et al. |
| 2009/0273563 A1 | 11/2009 | Pryor |
| 2009/0273575 A1 | 11/2009 | Pryor |
| 2009/0309745 A1 | 12/2009 | Johnson |
| 2010/0017118 A1 | 1/2010 | Dougherty |
| 2010/0256861 A1 | 10/2010 | Hodges |
| 2010/0305848 A1 | 12/2010 | Stallman |
| 2010/0321175 A1 | 12/2010 | Gilbert |
| 2011/0071720 A1 | 3/2011 | Schondorf et al. |
| 2011/0071725 A1 | 3/2011 | Kleve et al. |
| 2011/0071734 A1 | 3/2011 | Van Wiemeersch et al. |
| 2011/0093158 A1 | 4/2011 | Theisen et al. |
| 2011/0166741 A1 | 7/2011 | Forthoffer et al. |
| 2011/0196800 A1 | 8/2011 | Sachire et al. |
| 2011/0251751 A1 | 10/2011 | Knight |
| 2011/0267185 A1 | 11/2011 | Zhang et al. |
| 2011/0295636 A1 | 12/2011 | Anderson |
| 2012/0053782 A1 | 3/2012 | Gwozdek et al. |
| 2012/0123629 A1 | 5/2012 | Edwards et al. |
| 2012/0130844 A1 | 5/2012 | Picard |
| 2012/0296514 A1 | 11/2012 | Sohmshetty et al. |
| 2012/0296567 A1 | 11/2012 | Breed |
| 2012/0297337 A1 | 11/2012 | St. Denis et al. |

(56) References Cited

U.S. PATENT DOCUMENTS

| | | | |
|---|---|---|---|
| 2013/0046432 A1* | 2/2013 | Edwards | G01C 21/3605 701/29.4 |
| 2013/0059607 A1 | 3/2013 | Herz et al. | |
| 2013/0078968 A1 | 3/2013 | Breed et al. | |
| 2013/0099892 A1 | 4/2013 | Tucker et al. | |
| 2013/0173102 A1 | 7/2013 | Aldighieri et al. | |
| 2013/0211976 A1 | 8/2013 | Breed | |
| 2013/0260723 A1 | 10/2013 | Chander et al. | |
| 2013/0275875 A1 | 10/2013 | Gruber et al. | |
| 2013/0275899 A1 | 10/2013 | Schubert et al. | |
| 2013/0297100 A1 | 11/2013 | Petersen et al. | |
| 2013/0332013 A1 | 12/2013 | Malone et al. | |
| 2014/0077972 A1 | 3/2014 | Rathi et al. | |
| 2014/0195100 A1 | 7/2014 | Lundsgaard et al. | |
| 2014/0207734 A1 | 7/2014 | Lin et al. | |
| 2015/0057875 A1 | 2/2015 | McGinnis et al. | |
| 2015/0081161 A1 | 3/2015 | Chapman et al. | |
| 2015/0142676 A1 | 5/2015 | McGinnis et al. | |
| 2015/0347848 A1 | 12/2015 | Gurovich et al. | |

OTHER PUBLICATIONS

Chapman et al., "Systems, Article and Methods for Managing Vehicle Logistics Including Authored Content Generation, Approval, and Distribution," Office Action mailed Oct. 27, 2015 for U.S. Appl. No. 14/485,419, 24 pages.

McGinnis et al., "Systems and Methods of Creating and Delivering Item of Manufacture Specific Information to Remote Devices," U.S. Appl. No. 14/448,674, filed Jul. 31, 2014, 258 pages.

McGinnis et al., "Systems and Methods of Creating and Delivering Item of Manufacture Specific Information to Remote Devices," Preliminary Amendment filed Nov. 12, 2014, for U.S. Appl. No. 14/448,674, 17 pages.

Reisinger, "Apple aims at reimagining vehicle owner's manuals," Mar. 20, 2014, retrieved on May 5, 2014, from http://www.cnet.com/news/apple-aims-at-reimagining-vehicle-owners-manuals/, 5 pages.

Rathi et al., "Identifying and Presenting Information Based on Unique Vehicle Identifier," Office Action mailed Mar. 27, 2014, for U.S. Appl. No. 13/623,562, 14 pages.

International Search Report mailed Nov. 17, 2014, for International Application No. PCT/US2014/049260, 4 pages.

Written Opinion mailed Nov. 17, 2014, for International Application No. PCT/US2014/049260, 6 pages.

McGinnis et al., "Systems and Methods of Creating and Delivering Item of Manufacture Specific Information to Remote Devices," Preliminary Amendment filed Nov. 12, 2014, for U.S. Appl. No. 14/448,683, 10 pages.

McGinnis et al., "Systems and Methods of Creating and Delivering Item of Manufacture Specific Information to Remote Devices," Office Action mailed Jun. 9, 2015, for U.S. Appl. No. 14/448,683, 13 pages.

McGinnis et al., "Systems and Methods of Creating and Delivering Item of Manufacture Specific Information to Remote Devices," Amendment filed Aug. 10, 2015, for U.S. Appl. No. 14/448,683, 16 pages.

Chapman et al., "Systems, Article and Methods for Managing Vehicle Logistics Including Authored Content Generation, Approval, and Distribution," Amendment filed Jan. 27, 2016 for U.S. Appl. No. 14/485,419, 15 pages.

Extended European Search Report dated Jul. 6, 2016 for corresponding EP Application No. 14831686.2, 8 pages.

Chapman et al., "Systems, Article and Methods for Managing Vehicle Logistics Including Authored Content Generation, Approval, and Distribution," Office Action mailed Feb. 24, 2016, for U.S. Appl. No. 14/485,419, 26 pages.

\* cited by examiner

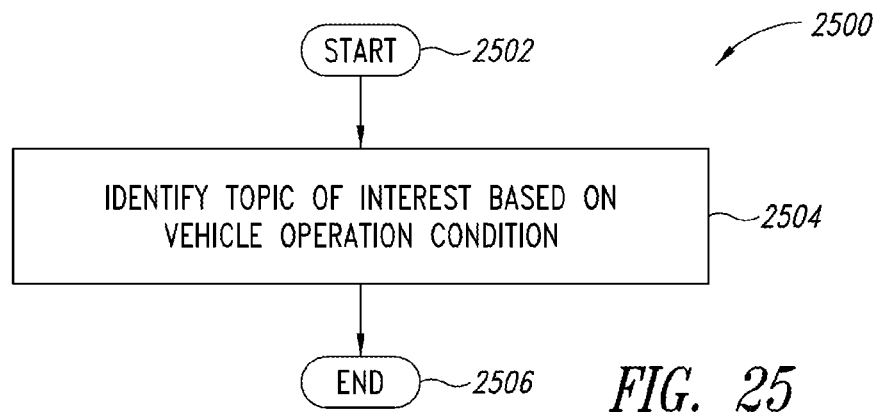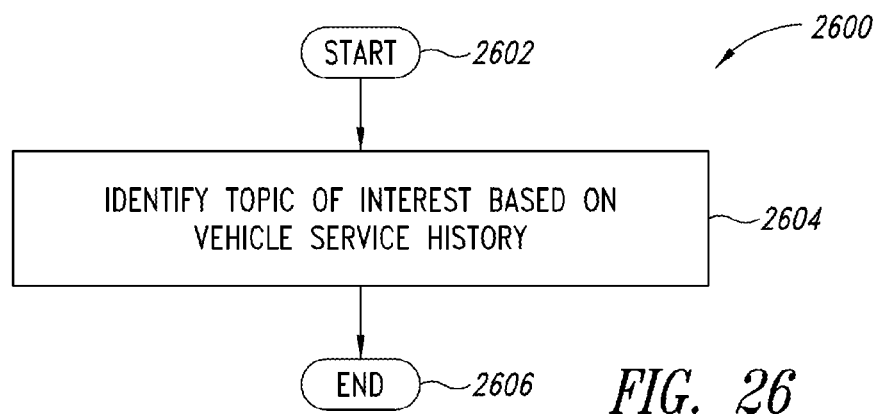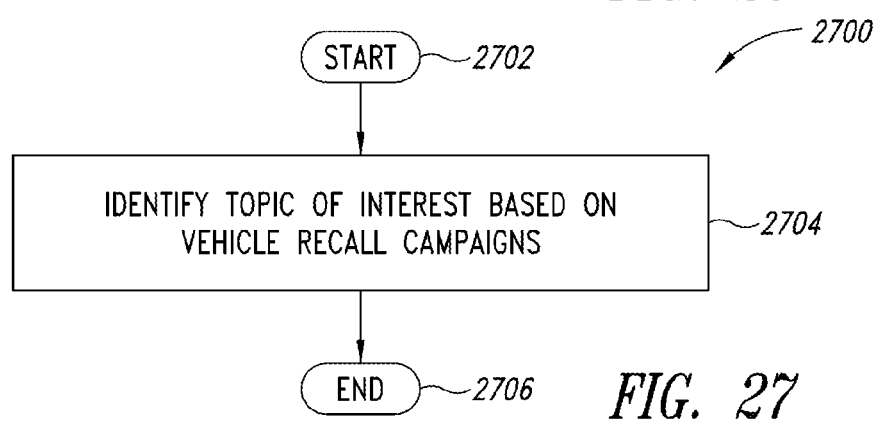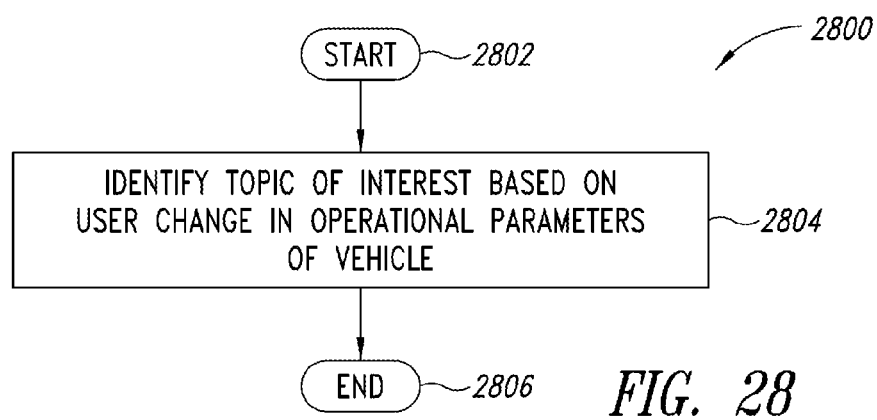

SYSTEMS AND METHODS OF CREATING AND DELIVERING ITEM OF MANUFACTURE SPECIFIC INFORMATION TO REMOTE DEVICES

BACKGROUND

Technical Field

The present disclosure generally relates to composition and delivery of content related to one or more remote devices, more specifically the delivery of content tailored to one or more items of manufacture.

Description of the Related Art

As manufacturing processes evolved, the ability for manufacturers to offer a multitude of options to consumers increased. For example, in 1932 the Ford Model B was offered with only eight options (single sidemounts, twin sidemounts, luggage rack, clock, inside mirror, outside mirror, leather interior, and broadcloth interior). A quick survey of an auto configurator on a Website such as Edmunds.com reveals an appreciable number of available options on even "base model" vehicles. One can readily appreciate the dizzying array of possible permutations. Although offering a prime example of diversity of options/features in an item of manufacture, the automotive industry is not alone in providing such a cornucopia of choices. For example, a similar diversity of options/features also exists in industries such as home building, computers, handheld electronics and appliances.

With each automobile, home, computer, or appliance, the manufacturer provides documentation (e.g., an owner's guide) to the consumer and makes available a service or similar guide (e.g., a maintenance manual) to technicians responsible for servicing and/or maintaining the item. To cover the vast number of available options, manufacturers often provide information in a single printed publication such covering every available option for a given item or class of items of manufacture. The use of a single manual simplifies supply chain logistics since the same document is provided with every item of manufacture regardless of the presence or absence of specific features or options on the item. Similarly, maintenance or service manuals provided by the manufacturer contain instructions relevant to every option/feature available on the item of manufacture regardless of the presence or absence of the option/feature on the item of manufacture.

Many times, the portions or passages in such owner's guides or maintenance manuals related to optional or alternative equipment that may not be present on a particular item of manufacture may be prefaced with a qualifier such as "IF EQUIPPED," "IF PRESENT," or similar. While guides and manuals organized in such a manner provide coverage of all available options and features, the conveyance of information relevant to a particular item of manufacture is predicated upon the owner's or technician's knowledge of the specific features and/or options present on the particular item of manufacture.

BRIEF SUMMARY

From the 1911 Ford Model T to present automobiles from every worldwide manufacturer, printed owner's guides and printed maintenance manuals have been the de rigueur norms. As the number of options, accessories, and features has grown, appendices or attachments to such owner's guides and maintenance manuals are added to cover the operation and maintenance of these additional items. Oftentimes, sections or passages in the owner's guide or maintenance manual associated with optional accessories or features which are not present on all of a particular item of manufacture may be prefaced with the phrase "IF EQUIPPED" or similar. As mentioned above, such a printed publication predicates the conveyance of information relevant to a particular item of manufacture on an individual's knowledge of the optional accessories or features included with the item.

The use of printed manuals provides manufacturers the ability to disseminate information relevant to their products using a standard format publication easily integrated into the manufacturing and supply chain process. In short, each item "X" produced by the manufacturer was shipped with one or more standard publications that covered item "X" along with every possible option available for item "X." To the manufacturer, the incremental cost of including some quantity of irrelevant information in the standard publications accompanying item "X" was negligible compared to the cost of developing, storing, coordinating, and shipping custom publications covering only the specific combination of options included with a particular item "X."

Given the increasing number of features and options available on many products, including a discussion of every available feature in a single publication would result in shipment of a sizable owner's manual having many "OPTIONAL" or "IF EQUIPPED" sections, many of which would not be relevant to the owner of an item that is not equipped with every available option. To the individual owning, using, and/or maintaining the product, searching through a voluminous owner's guide or maintenance manual for information relevant to a particular item or a particular option supplied with the item is time consuming and often requires wading through extraneous information to locate needed information. Finally, the cost to the manufacturer (and ultimately the consumer) associated with providing such a sizable printed publication with each product is substantial.

Manufacturers use model numbers, serial numbers, product identification numbers and the like to identify particular manufactured items. Often, the model number, serial number and/or product identification number that is assigned to a particular item of manufacture identifies not only the item, but also provides the ability to directly or indirectly identify the various factory installed options included with the item of manufacture. For example, a Vehicle Identification Number or "VIN" not only uniquely identifies a vehicle, the VIN also identifies certain components, devices, systems, and/or sub-systems included with the vehicle.

An inventory of standard and optional equipment included with a particular item of manufacture is created using information such as the product identification number logically associated with the item. The model number, serial number, and/or product identification number of a particular item of manufacture identify the factory-installed components, devices, or systems included with the item of manufacture. Based at least in part on the standard and any optional components, devices and/or systems present on the item of manufacture, a processor compiles, assembles, and/or generates a number of authored assets (e.g., owner's guides, maintenance manuals, and similar), each of which includes asset content objects logically associated with each of the standard and/or optional components, devices and/or systems. Advantageously, such owner's guides and maintenance manuals contain information on both the standard equipment and any optional components included in or on a particular item of manufacture. In some instances, an asset authoring and delivery system upon receipt of an item identifier such as a model number, serial number, or VIN may dynamically generate such authored assets by compiling those asset content objects logically associated with components included in a particular item of manufacture. In other instances, an asset authoring and delivery system upon receipt of an item identifier such as a model number, serial number, or VIN may look-up or retrieve one or more pre-assembled authored assets, each containing asset content objects logically associated with components included in a particular item of manufacture. The asset authoring and delivery system can format each authored asset for presentation on one or more remote devices, each of which is logically associated with the particular item of manufacture.

Electronic format documents afford many advantages over traditional published owner's guides and maintenance manuals. Original equipment manufacturers (OEMs) supply information in many different formats, including electronic, printed text, microfilm, drawings, and the like. OEMs may also provide information in the form of video clips, audio clips, or multimedia clips. Additionally, public or crowd-sourced information may also be available from resources such as YouTube® and bulletin boards or similar information exchanges hosted or sanctioned in some way by the OEM or vehicle manufacturer. Such information is broken into data groups, files, or the like (collectively "asset content objects") that are logically associable with one or more components, devices, or systems that may be present on a particular vehicle. Each asset content object can be logically associated with a particular components, device, or system included on one or more items of manufacture. Advantageously, such stored asset content objects can be updated at a central location and the latest revision of an owner's guide or maintenance manual pushed by one or more central distribution points to one or more remote devices or pulled from one or more central distribution points by one or more remote devices.

In many instances, data indicative of the situational context of the user and/or the item of manufacture is available to one or more computers or controllers communicably coupled to the authored asset system. The asset authoring and delivery system can beneficially supply situationally and/or contextually relevant information to the user based on such situational context data. Thus, in response to a detected difficulty in setting up a surround sound feature on an entertainment system, the asset authoring and delivery system can provide information to a remote device in the form of assembled and formatted asset content objects logically relevant to the setup and operation of the surround sound system. In response to a detected loss of tire air pressure indicative of a flat tire, the asset authoring and delivery system can provide information to a remote device in the form of assembled and formatted asset content objects logically relevant to the replacement of the tire with a vehicular spare tire.

With increasing emphasis on performance, handling, and fuel economy, vehicles are a combination of mechanical systems the operation of which are coordinated using a number of specialty or general-purpose computers or controllers. Each of these computers or controllers executes an operating system and software used to control one or more operational aspects of the vehicle. The use of such computers and controllers will increase over time to provide desired features to vehicle owners and operators as well as to comply with increasingly stringent fuel economy and emissions requirements. Often times, input is provided to these computer-controlled systems via a general-purpose user interface (e.g., a touchscreen, joystick, pointer, and/or keypad). The use of a general-purpose interface and computer-controlled systems provides manufacturers with heretofore unheard of abilities to update vehicle software to provide new features and functionality. The delivery of instructions for using these new features via one or more printed publications (i.e., Owner's Guide updates) would not only seem out-of-place and archaic, but would also be reliant upon the vehicle owner's care in maintaining all of the updated information in a single location. If such updates were misplaced or lost, owners may be left without operating instructions for one or more systems or with erroneous (i.e., out-of-date) instructions for those systems.

Modern vehicles are equipped with a plurality of data acquisition devices used by one or more onboard systems. Such systems can include, for example, a vehicular traction control system that limits wheel slip by retarding engine performance or applying light braking pressure to wheels experiencing wheel slip. Other on-board sensors provide diagnostic or forensic evidence related to vehicle performance (e.g., vehicle speed, lateral acceleration, braking pressure, acceleration, throttle position, engine speed, and the like) and/or vehicle occupants (e.g., occupied positions in vehicle, seat belt use, and the like). A nontransitory storage media can store data provided by some or all of the data acquisition devices. In some instances, local, state, or federal regulation may specify the some or all of the data stored, the duration of storage, and the like.

To improve performance, fuel economy, reliability, and/or responsiveness, one or more operational aspects of many vehicular systems are controlled using controllers, processors, or similar digital processors. In many instances, the mechanical and/or electrical controls in the vehicle provide inputs to one or more controllers or digital processors. In turn, the controller or digital processor generates an output that causes a change in a vehicular system. For example, pressing a REAR WINDOW DEFROST button may provide an input to a controller. Logic executed by the controller may, in turn cause power to flow to the rear window defroster for a predetermined amount of time or until a predefined glass temperature is achieved. In addition to logging and controlling the performance of various onboard systems, the one or more nontransitory memories may also log or otherwise store operational information such as error codes generated by the onboard controllers and/or digital processors.

A nontransitory storage location can store data indicative of some or all of the controller inputs and/or outputs. In many instances, such nontransitory storage locations may be onboard the vehicle. However, in some instances such data may be stored in a communicably coupled nontransitory location remote from the vehicle. Thus, a wealth of vehicle data, including data indicative of not only the operation of the vehicle, but also the various system inputs and outputs generated during routine operation of the vehicle, and error codes generated by the vehicle may be collected and stored in one or more nontransitory memories.

An assessment and notification system can retrieve or otherwise obtain from one or more vehicles all or a portion of the operational inputs, system control, and error code data stored in the one or more nontransitory memories. Using this retrieved data, the assessment and notification system can autonomously generate instances of service alerts on a per vehicle basis using data specific to a particular vehicle. The assessment and notification system can communicate service alerts or bulletins to one or more remote devices logically associated with the particular vehicle, the vehicle owner, and/or the vehicle operator.

An assessment and notification system can associate a vehicle operator with all or a portion of the operational inputs, system control, and error code data stored in the one or more nontransitory memories. The assessment and notification system can autonomously obtain such vehicle operator information, for example using a key or a radio frequency tag associated with a particular vehicle operator. The assessment and notification system can obtain such information by associating operating dates or times with a particular vehicle operator.

The assessment and notification system can generate driver behavior reports based on the received data. In some instances, the assessment and notification system can communicate such behavior reports to one or more third parties, for example a vehicle owner.

The assessment and notification system can accept system user inputs corresponding to one or more event definitions. Such event definitions may include various system parameters and may specify a particular make and/or model of vehicle. Using the event definition, the assessment and notification system can poll or otherwise obtain data from any number of vehicles meeting the event definition. Such data acquisition functionality advantageously permits system users to anonymously and transparently obtain and analyze data from a large vehicle population.

Vehicles include an increasing number of sensors and/or computer controlled systems such as entertainment systems, ignition systems, hybrid vehicle control systems, electric vehicle control and charging systems, and the like. Each of the sensors provides one or more signals indicative of the state or the operation of one or more vehicular systems. Each of the computer controlled systems includes a number of inputs and outputs indicative of the state or the operation of one or more vehicular systems. When coupled to a nontransitory storage medium, one or more data stores or databases containing a significant population of rich and diverse vehicle operation, performance, and/or diagnostic data is created. Providing one or more on-board vehicle communication systems (e.g., a vehicle head unit) with access to such stored information provides the asset authoring and delivery system with access to the information generated by a single vehicle or by large population of vehicles. Using various database querying techniques, a system user can therefore compile real-world performance and diagnostic data from any number of vehicles.

A method of operation in an assessment and notification system may be summarized as including receiving respective vehicle operational values from a plurality of transducers for at least a first vehicle, the vehicle operational values specifying operational values for a plurality of at least one of functions or subsystems of at least the first vehicle over time by at least one circuit of the assessment and notification system via at least one nontransitory storage medium of the assessment and notification system, the at least one nontransitory storage medium communicatively coupled to the at least one circuit; detecting a serviceable condition based at least on the vehicle operational values by the at least one circuit of the assessment and notification system; identifying one or more devices logically associated with at least one of the vehicle or an individual logically associated with the vehicle by the at least one circuit of the assessment and notification system; for each of at least one of the identified devices, formatting at least one instance of a service alert based on at least one characteristic of the respective at least one of the identified devices by the at least one circuit of the assessment and notification system; and transmitting the formatted instances of the service alert to the at least one of the identified devices.

Receiving respective vehicle operational values from a plurality of transducers for at least a first vehicle may include receiving a fault code from a diagnostic system of the vehicle, and may further include evaluating the fault code; determining a severity of a fault indicated by the fault code; and determining a description of a fault associated with the fault code. Detecting a serviceable condition based at least on the vehicle operational values may include detecting the serviceable condition based at least in part on both the vehicle operational values and a service history of the vehicle. Detecting a serviceable condition based at least in part on the vehicle operational values may further include detecting the serviceable condition based at least in part on a build configuration of the vehicle. Identifying one or more devices logically associated with at least one of the vehicle or an individual logically associated with the vehicle may include accessing a set of user preference information which identifies a set of devices for use in communicating with at least one of an owner or a driver of the vehicle. Identifying one or more devices logically associated with at least one of the vehicle or an individual logically associated with the vehicle may include accessing a set of user preference information which identifies a set of devices for use in communicating with at least one of an owner or a driver of the vehicle, and selecting one or more of the identified devices based on at least one situational awareness criteria indicative of a current situation of at least one of the vehicle, the owner or the driver of the vehicle, or of the devices. Identifying one or more devices logically associated with at least one of the vehicle or an individual logically associated with the vehicle may include identifying a user interface of a head unit of the vehicle and at least one of a handheld mobile communications device or an electronic mail address logically associated with at least one of an owner or a driver of the vehicle. Formatting at least one instance of a service alert based on at least one characteristic of the respective at least one of the identified devices may include formatting a second instance of the service alert as at least one of an audio or an audiovisual message playable via at least one of a head unit of the vehicle or handheld mobile communications device or a Web browser executed by a processor-based device. Formatting at least one instance of a service alert based on at least one characteristic of the respective at least one of the identified devices may further include formatting a third instance of the service alert as a textual description for transmission as an electronic mail or text, providing further details of regarding the serviceable condition and a subsystem to which the serviceable condition relates beyond the audio or the audiovisual message.

The method of operation in an assessment and notification system may further include determining a user specified level of detail reporting preference; and wherein the formatting the third instance of the service alert as a textual description may be based at least in part on the user specified level of detail reporting preference.

The method of operation in an assessment and notification system may further include identifying at least one service provider; determining a number of appointment availabilities for the identified service providers; and transmitting the determined appointment availabilities to at least one of the vehicle, an owner of the vehicle or a driver of the vehicle.

Transmitting the determined appointment availabilities may include transmitting the appointment availabilities for presentation as respective selectable icons. Identifying at least one service provider may include identifying at least one service provider previously used by the owner of the vehicle or the driver of the vehicle.

The method of operation in an assessment and notification system may further include transmitting an appointment request to the at least one service provider in response to a selection of one of the appointment availabilities.

The method of operation in an assessment and notification system may further include transmitting to the at least one service provider a report which provides at least the fault code.

The method of operation in an assessment and notification system may further include identifying at least one service that is at least one of overdue or due to be performed on the vehicle within a defined period of a current date; and transmitting a scheduled service notification to the at least one device notifying at least one of the owner or the driver of the vehicle of the service to be performed.

The method of operation in an assessment and notification system may further include determining an amount of time required to service the vehicle to correct the fault condition; and accounting for the time required to service the vehicle to correct the fault condition when determining the appointment availabilities.

The method of operation in an assessment and notification system may further include determining whether parts are needed to service the vehicle to correct the fault condition; if parts are needed, determining whether the parts are in stock; if the parts are not in stock, determining an amount of time required to obtain the parts; and accounting for the time required to obtain the parts when determining the appointment availabilities when determining the appointment availabilities.

The method of operation in an assessment and notification system may further include identifying at least one scheduled maintenance service that is at least one of overdue or due to be performed in a defined period of a present date; transmitting a scheduled maintenance service notification to the at least one device notifying at least one of the owner or the driver of the vehicle of the scheduled maintenance service to be performed.

The method of operation in an assessment and notification system may further include determining an amount of time required to perform the scheduled maintenance service on the vehicle; and accounting for the time required to perform the scheduled maintenance service on the vehicle in addition to the service to correct the fault condition when determining the appointment availabilities.

The method of operation in an assessment and notification system may further include determining whether parts are needed to perform the scheduled maintenance service on the vehicle; if parts are needed, determining whether the parts are in stock; if the parts are not in stock, determining an amount of time required to obtain the parts; and accounting for the time required to obtain the parts when determining the appointment availabilities.

The method of operation in an assessment and notification system may further include identifying at least one warranty service that is at least due to be performed; transmitting a warranty service notification to the at least one device notifying at least one of the owner or the driver of the vehicle of the warranty service to be performed.

The method of operation in an assessment and notification system may further include determining an amount of time required to perform the warranty service on the vehicle; and accounting for the time required to perform the warranty service on the vehicle in addition to the service to correct the fault condition when determining the appointment availabilities.

The method of operation in an assessment and notification system may further include determining whether parts are needed to perform the warranty service on the vehicle; if parts are needed, determining whether the parts are in stock; if the parts are not in stock, determining an amount of time required to obtain the parts; and accounting for the time required to obtain the parts when determining the appointment availabilities.

An assessment and notification system may be summarized as including at least one communications interface: a processor communicably coupled to the at least one communications interface; and at least one nontransitory storage communicably coupled to the processor and containing processor-readable, machine-executable instructions that, when executed by the processor, cause the at least one processor to provide an assessment and notification system, and which further cause the processor to: receive respective vehicle operational values from a plurality of transducers for at least a first vehicle, the vehicle operational values specifying operational values for a plurality of at least one of functions or subsystems of at least the first vehicle over time; determine a serviceable condition based at least on the vehicle operational values; identify one or more devices logically associated with at least one of the vehicle or an individual logically associated with the vehicle; for each of at least one of the identified devices, format at least one instance of a service alert based on at least one characteristic of the respective at least one of the identified devices; and transmit the formatted instances of the service alert to the at least one of the identified devices.

The machine-executable instructions that cause the processor to receive respective vehicle operational values from a plurality of transducers for at least a first vehicle may include receiving a fault code from a diagnostic system of the vehicle, and may further cause the processor to: evaluate the fault code; determine a severity of a fault indicated by the fault code; and determine a description of a fault associated with the fault code. The machine-executable instructions that cause the processor to determine a serviceable condition based at least on the vehicle operational values, may further cause the processor to: determine the serviceable condition based at least in part on both the vehicle operational values and a service history of the vehicle. The machine-executable instructions that cause the processor to determine a serviceable condition based at least in part on the vehicle operational values, may further cause the processor to: determine the serviceable condition based at least in part on a build configuration of the vehicle. The machine-executable instructions that cause the processor to identify one or more devices logically associated with at least one of the vehicle or an individual logically associated with the vehicle, may further cause the processor to: access a set of user preference information which identifies a set of devices for use in communicating with at least one of an owner or a driver of the vehicle. The machine-executable instructions that cause the processor to identify one or more devices logically associated with at least one of the vehicle or an individual logically associated with the vehicle, may further cause the processor to: access a set of user preference information which identifies a set of devices for use in communicating with at least one of an owner or a driver of the vehicle; and select one or more of the identified devices based on at least one situational awareness criteria indicative of a current situation of at least one of the vehicle, the owner or the driver of the vehicle, or of the devices. The machine-executable instructions that cause the processor to identify one or more devices logically associated with at least one of the vehicle or an individual logically associated with the vehicle, may further cause the processor to: identify a user interface of a head unit of the vehicle and at least one of a handheld mobile communications device or an electronic mail address logically associated with at least one of an owner or a driver of the vehicle. The machine-executable instructions that cause the processor to format at least one instance of a service alert based on at least one characteristic of the respective at least one of the identified devices, may further cause the processor to: format a first instance of the service alert as at least one of an audio or an audiovisual message playable via a head unit of the vehicle. The machine-executable instructions that cause the processor to format at least one instance of a service alert based on at least one characteristic of the respective at least one of the identified devices, may further cause the processor to: format a second instance of the service alert as at least one of an audio or an audiovisual message playable via at least one of a head unit of the vehicle or handheld mobile communications device or a Web browser executed by a processor-based device. The machine-executable instructions that cause the processor to format at least one instance of a service alert based on at least one characteristic of the respective at least one of the identified devices, may further cause the processor to: format a third instance of the service alert as a textual description for transmission as an electronic mail or text, providing further details of regarding the serviceable condition and a subsystem to which the serviceable condition relates beyond the audio or the audiovisual message. The machine-executable instructions that cause the processor to format the third instance of the service alert as a textual description, may further cause the processor to: determine a user specified level of detail reporting preference; and format the third instance of the service alert as a textual description based at least in part on the user specified level of detail reporting preference. The machine-executable instructions may cause the processor to further: identify at least one service provider; determine a number of appointment availabilities for the identified service providers; and transmit the determined appointment availabilities to at least one of the vehicle, an owner of the vehicle or a driver of the vehicle. The machine-executable instructions that cause the processor to transmit the determined appointment availabilities, may further cause the processor to: transmit the appointment availabilities for presentation as respective selectable icons. The machine-executable instructions that cause the processor to identify at least one service provider, may further cause the processor to: identify at least one service provider previously used by the owner of the vehicle or the driver of the vehicle. The machine-executable instructions may further cause the processor to: transmit an appointment request to the at least one service provider in response to a selection of one of the appointment availabilities. The machine-executable instructions may further cause the processor to: transmit to the at least one service provider a report which provides at least the fault code. The machine-executable instructions may further cause the processor to: identify at least one service that is at least one of overdue or due to be performed on the vehicle within a defined period of a current date; and transmit a scheduled service notification to the at least one device notifying at least one of the owner or the driver of the vehicle of the service to be performed. The machine-executable instructions may further cause the processor to: determine an amount of time required to service the vehicle to correct the fault condition; and account for the time required to service the vehicle to correct the fault condition when determining the appointment availabilities. The machine-executable instructions may further cause the processor to: determine whether parts are needed to service the vehicle to correct the fault condition; if parts are needed, determine whether the parts are in stock; if the parts are not in stock, determine an amount of time required to obtain the parts; and account for the time required to obtain the parts when determining the appointment availabilities when determining the appointment availabilities. The machine-executable instructions may further cause the processor to: identify at least one scheduled maintenance service that is at least one of overdue or due to be performed in a defined period of a present date; transmit a scheduled maintenance service notification to the at least one device notifying at least one of the owner or the driver of the vehicle of the scheduled maintenance service to be performed. The machine-executable instructions may further cause the processor to: determine an amount of time required to perform the scheduled maintenance service on the vehicle; and account for the time required to perform the scheduled maintenance service on the vehicle in addition to the service to correct the fault condition when determining the appointment availabilities. The machine-executable instructions further cause the processor to: determine whether parts are needed to perform the scheduled maintenance service on the vehicle; if parts are needed, determine whether the parts are in stock; if the parts are not in stock, determine an amount of time required to obtain the parts; and account for the time required to obtain the parts when determining the appointment availabilities. The machine-executable instructions may further cause the processor to: identify at least one warranty service that is at least due to be performed; transmit a warranty service notification to the at least one device that notifies at least one of the owner or the driver of the vehicle of the warranty service to be performed. The machine-executable instructions may further cause the processor to: determine an amount of time required to perform the warranty service on the vehicle; and account for the time required to perform the warranty service on the vehicle in addition to the service to correct the fault condition when determining the appointment availabilities. The machine-executable instructions may further cause the processor to: determine whether parts are needed to perform the warranty service on the vehicle; if parts are needed, determine whether the parts are in stock; if the parts are not in stock, determine an amount of time required to obtain the parts; and account for the time required to obtain the parts when determining the appointment availabilities.

A method of operation in an assessment and notification system may be summarized as including receiving respective vehicle operational values from a plurality of transducers for at least a first vehicle, the vehicle operational values specifying operational values for a plurality of at least one of functions or subsystems of at least the first vehicle over time by at least one circuit of the assessment and notification system; logically associating the received vehicle operational values with respective ones of a number of drivers of the vehicle who operate at least the first vehicle at a number of distinct times by the at least one circuit of the assessment and notification system; generating a report based at least in part on the logical association of the received vehicle operational values with respective ones of the drivers of the vehicle who operate at least the first vehicle at the number of distinct times by the at least one circuit of the assessment and notification system; and generating a driver behavior report indicative of driver behavior for at least one of the drivers of the vehicle based at least in part on the logical association of the received vehicle operational values with respective ones of the drivers of the vehicle who operate at least the first vehicle at the number of distinct times by the at least one circuit of the assessment and notification system.

The method of operation in an assessment and notification system may further include causing the generated driver behavior report for at least one of the drivers of the vehicle to be provided to at least one device remotely located from the assessment and notification system by the at least one circuit of the assessment and notification system.

Causing the generated driver behavior report for at least one of the drivers of the vehicle to be provided to at least one device remotely located from the assessment and notification system may include causing the generated driver behavior report for at least one of the drivers of the vehicle to be provided to at least one device logically associated with a registered owner of the first vehicle. Causing the generated driver behavior report for at least one of the drivers of the vehicle to be provided to at least one device remotely located from the assessment and notification system may include causing the generated driver behavior report for at least one of the drivers of the vehicle to be provided to at least one device logically associated with an identified parent, guardian or supervisor of the respective driver of the first vehicle. Causing the generated driver behavior report for at least one of the drivers of the vehicle to be provided to at least one device remotely located from the assessment and notification system may include causing the generated driver behavior report for at least one of the drivers of the vehicle to be provided to at least one device logically associated with a prospective purchaser of at least the first vehicle.

The method of operation in an assessment and notification system may further include determining an effect of the driver behavior on the first vehicle; and reporting the effect of the driver behavior on the first vehicle.

Determining an effect of driver behavior on the first vehicle may include determining an effect of the driver behavior of a projected life span of at least one component of the vehicle. Determining an effect of driver behavior on the first vehicle may include determining an effect of the driver behavior of a projected cost of ownership of at least one component of the vehicle. Determining an effect of driver behavior on the first vehicle may include determining an effect of the driver behavior of a projected maintenance cost of at least one component of the vehicle. Determining an effect of driver behavior on the first vehicle may include determining the effect of driver behavior based at least in part on a determined build configuration of the vehicle. Reporting the effect of the driver behavior on the first vehicle may include providing an indication of at least one driver behavior modification to address the affect.

The method of operation in an assessment and notification system may further include determining at least one user preference indicative of a preference of a user, and wherein causing the generated driver behavior report for at least one of the drivers of the vehicle to be provided to at least one device remotely located from the assessment and notification system may include causing the generated driver behavior report for at least one of the drivers of the vehicle to be provided to at least one device remotely located from the assessment and notification system based at least in part on the determined at least one user preference.

The method of operation in an assessment and notification system may further include determining at least one parameter of a respective user interface of the at least one device that is remotely located from the asset authoring and delivery system, and wherein causing the generated driver behavior report for at least one of the drivers of the vehicle to be provided to at least one device remotely located from the assessment and notification system may include causing the generated driver behavior report for at least one of the drivers of the vehicle to be provided to at least one device remotely located from the assessment and notification system based at least in part on the at least one parameter of the user interface of the device.

Determining at least one parameter of a user interface of the device that is remotely located from the asset authoring and delivery system at least may include determining a screen size of a display device of at least one of a personal computer, a tablet computer, a smartphone, a personal digital assistant, or a head unit of the vehicle.

The method of operation in an assessment and notification system may further include determining a present situation of at least one of the vehicle or a driver of the vehicle, and wherein causing the generated driver behavior report for at least one of the drivers of the vehicle to be provided to at least one device remotely located from the assessment and notification system may include causing the generated driver behavior report for at least one of the drivers of the vehicle to be provided to at least one device remotely located from the assessment and notification system based at least in part on the determined present situation.

The method of operation in an assessment and notification system may further include determining a present situation of at least one of the vehicle or a driver of the vehicle; selecting one or more devices for use in presenting the vehicle related authored asset based at least in part on the determined present situation, and wherein causing the generated driver behavior report for at least one of the drivers of the vehicle to be provided to at least one device remotely located from the assessment and notification system may include causing the generated driver behavior report for at least one of the drivers of the vehicle to be provided to at least one device remotely located from the assessment and notification system based at least in part on the selected one or more devices.

An assessment and notification system may be summarized as including: at least one communications interface: a processor communicably coupled to the at least one communications interface; and at least one nontransitory storage communicably coupled to the processor and containing processor-readable, machine-executable instructions that, when executed by the processor, cause the at least one processor to provide an assessment and notification system, and which may further cause the processor to: receive respective vehicle operational values from a plurality of transducers for at least a first vehicle, the vehicle operational values specifying operational values for a plurality of at least one of functions or subsystems of at least the first vehicle over time; logically associate the received vehicle operational values with respective ones of a number of drivers of the vehicle who operate at least the first vehicle at a number of distinct times; generate a report based at least in part on the logical association of the received vehicle operational values with respective ones of the drivers of the vehicle who operate at least the first vehicle at the number of distinct times; and generate a driver behavior report indicative of driver behavior for at least one of the drivers of the vehicle based at least in part on the logical association of the received vehicle operational values with respective ones of the drivers of the vehicle who operate at least the first vehicle at the number of distinct times.

The machine-executable instructions may further cause the processor to: provide the generated driver behavior report for at least one of the drivers of the vehicle to at least one device remotely located from the assessment and notification system. The machine-executable instructions that cause the processor to provide the generated driver behavior report for at least one of the drivers of the vehicle to at least one device remotely located from the assessment and notification system, may further cause the processor to: provide the generated driver behavior report for at least one of the drivers of the vehicle to at least one device logically associated with a registered owner of the first vehicle. The machine-executable instructions that cause the processor to provide the generated driver behavior report for at least one of the drivers of the vehicle to at least one device remotely located from the assessment and notification system, may further cause the processor to: provide the generated driver behavior report for at least one of the drivers of the vehicle to at least one device logically associated with an identified parent, guardian or supervisor of the respective driver of the first vehicle. The machine-executable instructions that cause the processor to provide the generated driver behavior report for at least one of the drivers of the vehicle to at least one device remotely located from the assessment and notification system, may further cause the processor to: provide the generated driver behavior report for at least one of the drivers of the vehicle to at least one device logically associated with a prospective purchaser of at least the first vehicle. The machine-executable instructions may further cause the processor to: determine an effect of the driver behavior on the first vehicle; and report the effect of the driver behavior on the first vehicle. The machine-executable instructions that cause the processor to determine an effect of driver behavior on the first vehicle, may further cause the processor to: determine an effect of the driver behavior of a projected life span of at least one component of the vehicle. The machine-executable instructions that cause the processor to determine an effect of driver behavior on the first vehicle, may further cause the processor to: determine an effect of the driver behavior of a projected cost of ownership of at least one component of the vehicle. The machine-executable instructions that cause the processor to determine an effect of driver behavior on the first vehicle, may further cause the processor to: determine an effect of the driver behavior of a projected maintenance cost of at least one component of the vehicle. The machine-executable instructions that cause the processor to determining an effect of driver behavior on the first vehicle, may further cause the processor to: determine the effect of driver behavior based at least in part on a determined build configuration of the vehicle. The machine-executable instructions that cause the processor to report the effect of the driver behavior on the first vehicle, may further cause the processor to: provide an indication of at least one driver behavior modification to address the affect. The machine-executable instructions may further cause the processor to: determine at least one user preference indicative of a preference of a user, and wherein causing the generated driver behavior report for at least one of the drivers of the vehicle to be provided to at least one device remotely located from the assessment and notification system may include causing the generated driver behavior report for at least one of the drivers of the vehicle to be provided to at least one device remotely located from the assessment and notification system based at least in part on the determined at least one user preference. The machine-executable instructions may further cause the processor to: determine at least one parameter of a respective user interface of the at least one device that is remotely located from the asset authoring and delivery system, and wherein causing the generated driver behavior report for at least one of the drivers of the vehicle to be provided to at least one device remotely located from the assessment and notification system may include causing the generated driver behavior report for at least one of the drivers of the vehicle to be provided to at least one device remotely located from the assessment and notification system based at least in part on the at least one parameter of the user interface of the device. The machine-executable instructions that cause the processor to determine at least one parameter of a user interface of the device that is remotely located from the asset authoring and delivery system, may further cause the processor to: determine a screen size of a display device of at least one of a personal computer, a tablet computer, a smartphone, a personal digital assistant, or a head unit of the vehicle. The machine-executable instructions that cause the processor to provide the generated driver behavior report for at least one of the drivers of the vehicle to at least one device remotely located from the assessment and notification system, may further cause the processor to: determine a present situation of at least one of the vehicle or a driver of the vehicle, and provide the generated driver behavior report for at least one of the drivers of the vehicle to at least one device remotely located from the assessment and notification system based at least in part on the determined present situation. The machine-executable instructions that cause the processor to provide the generated driver behavior report for at least one of the drivers of the vehicle to at least one device remotely located from the assessment and notification system, may further cause the processor to: determine a present situation of at least one of the vehicle or a driver of the vehicle; select one or more devices for use in presenting the vehicle related authored asset based at least in part on the determined present situation; and provide the generated driver behavior report for at least one of the drivers of the vehicle to at least one device remotely located from the assessment and notification system based at least in part on the selected one or more devices.

A method of operation in a vehicle assessment system may be summarized as including: receiving respective vehicle operational values from a plurality of transducers for each of a plurality of vehicles of a first make and model of vehicle by at least one circuit of the vehicle assessment system, the vehicles of the first make and model of vehicles having respective ones of a number of build configurations, the vehicle operational values specifying operational values for a plurality of at least one of functions or subsystems of a respective one of the vehicles over time; receiving an event definition, the event definition specifying at least one of: driver demographic specifying information, environmental condition specifying information, geographic area specifying information, driver behavior specifying information, vehicle build configuration specifying information; and compiling data from each of the vehicles that fit within or which operation fits within the event definition.

The method of operation in a vehicle assessment system may further include: performing statistical trend analysis of the complied data.

The method of operation in a vehicle assessment system may further include: sampling data for a first set of functions at a first frequency over a first period; and sampling data for a second set of functions at a second frequency over the first period.

Receiving an event definition may include receiving driver demographic specifying information that specifies a set of driver age ranges. Receiving an event definition may include receiving environmental condition specifying information that specifies a set of climate zones. Receiving an event definition may include receiving environmental condition specifying information that specifies a portion of vehicles to be sampled from each of at least two different climate zones. Receiving an event definition may include receiving driver behavior specifying information that specifies at least one of a driver braking profile or acceleration profile. Receiving an event definition may include receiving vehicle build configuration specifying information that specifies at least one sales code that identifies a subset from all vehicles of the first make and model of vehicles.

The method of operation in a vehicle assessment may further include: for each of the plurality of vehicles, receiving respective environmental data indicative of ambient environmental conditions in which the vehicle is operating, the environmental data correlatable with the operational values by the at least one circuit of the vehicle assessment system.

A vehicle assessment system may be summarized as including: at least one communications interface; a processor communicably coupled to the at least one communications interface; and at least one nontransitory storage communicably coupled to the processor and containing processor-readable, machine-executable instructions that, when executed by the processor, cause the at least one processor to provide an assessment and notification system, and which further cause the processor to: receive respective vehicle operational values from a plurality of transducers for each of a plurality of vehicles of a first make and model of vehicle by at least one circuit of the vehicle assessment system, the vehicles of the first make and model of vehicles having respective ones of a number of build configurations, the vehicle operational values specifying operational values for a plurality of at least one of functions or subsystems of a respective one of the vehicles over time; receive an event definition, the event definition specifying at least one of: driver demographic specifying information, environmental condition specifying information, geographic area specifying information, driver behavior specifying information, vehicle build configuration specifying information; and compile data from each of the vehicles that fit within or which operation fits within the event definition.

The machine-executable instructions may further cause the processor to: perform a statistical trend analysis of the complied data. The machine-executable instructions may further cause the processor to: sample data for a first set of functions at a first frequency over a first period; and sample data for a second set of functions at a second frequency over the first period. The machine-executable instructions that cause the processor to receive an event definition, may further cause the processor to: receive driver demographic specifying information that specifies a set of driver age ranges. The machine-executable instructions that cause the processor to receive an event definition, may further cause the processor to: receive environmental condition specifying information that specifies a set of climate zones. The machine-executable instructions that cause the processor to receive an event definition, may further cause the processor to: receive environmental condition specifying information that specifies a portion of vehicles to be sampled from each of at least two different climate zones. The machine-executable instructions that cause the processor to receive an event definition, may further cause the processor to: receive driver behavior specifying information that specifies at least one of a driver braking profile or acceleration profile. The machine-executable instructions that cause the processor to receive an event definition, may further cause the processor to: receive vehicle build configuration specifying information that specifies at least one sales code that identifies a subset from all vehicles of the first make and model of vehicles. The machine-executable instructions may further cause the processor to: for each of the plurality of vehicles, receive respective environmental data indicative of ambient environmental conditions in which the vehicle is operating; and correlate the received environmental data with the operational values.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn, are not intended to convey any information regarding the actual shape of the particular elements, and have been solely selected for ease of recognition in the drawings.

FIG. 25 is a flow diagram of a method of generating an authored asset on a remote device based using a topic of interest based on an identified vehicle operating condition, according to one non-limiting illustrated embodiment.

FIG. 26 is a flow diagram of a method of generating an authored asset on a remote device based using a topic of interest based on an identified vehicle service history, according to one non-limiting illustrated embodiment.

FIG. 27 is a flow diagram of a method of generating an authored asset on a remote device based using a topic of interest based on an identified vehicle recall campaign, according to one non-limiting illustrated embodiment.

FIG. 28 is a flow diagram of a method of generating an authored asset on a remote device based using a topic of interest based on an identified change in vehicular operational parameters, according to one non-limiting illustrated embodiment.

DETAILED DESCRIPTION

Figure 1:
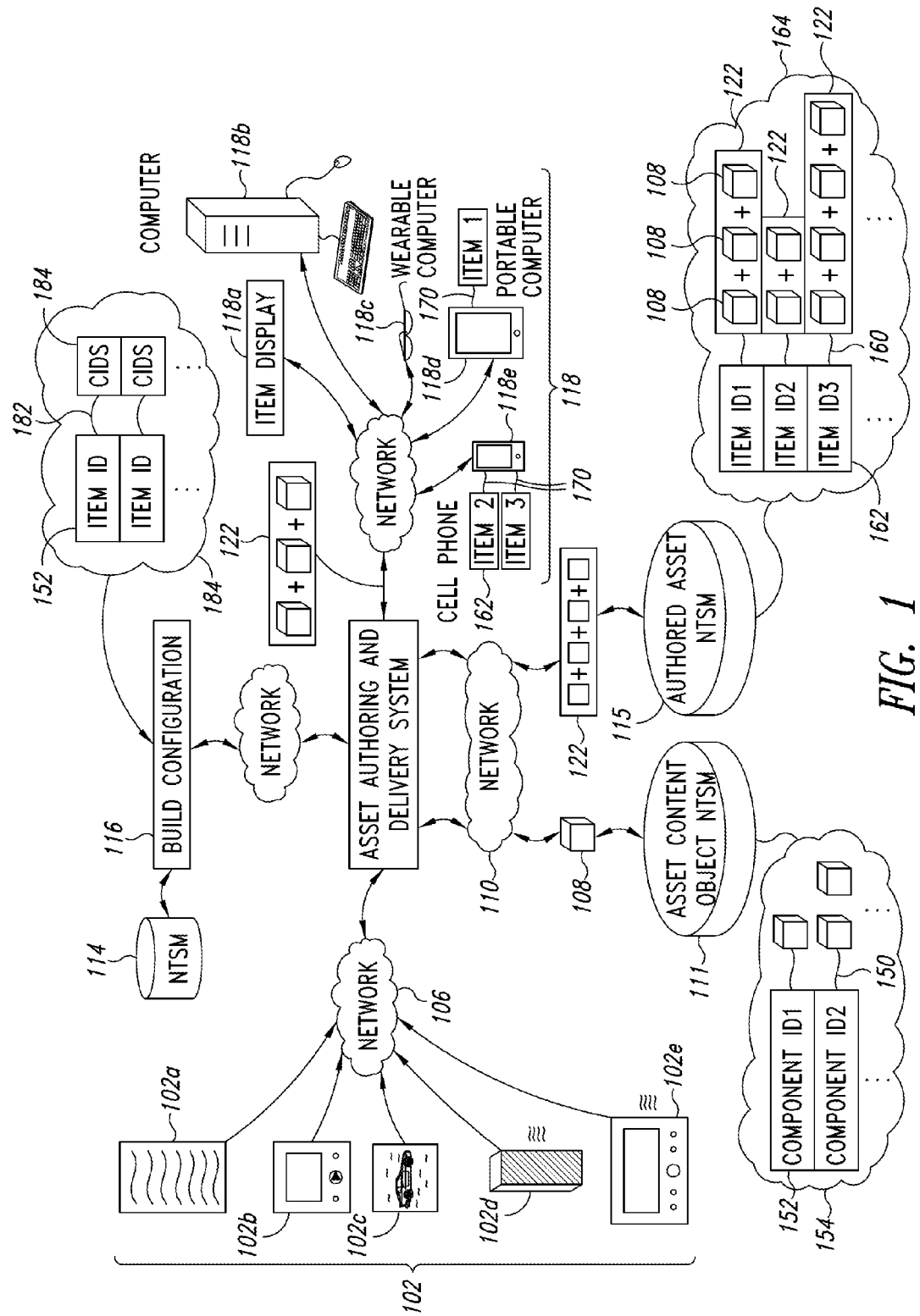
FIG. 1 is a schematic diagram of an example asset authoring and delivery system in which information provided by a manufacturer, a dealer, and/or an aftermarket supplier are used to generate a number of asset content objects which are selectively combinable to form one or more authored assets logically associated with a particular item of manufacture, according to one non-limiting illustrated embodiment.

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with computing devices, automotive head units, portable communication devices, manufacturing processes, document, audio, and video editing processes, the content and form of product owner's guides and maintenance manuals, and the like are not been discussed in detail.

Unless the context requires otherwise, throughout the specification and claims that follow, the word "comprise" and variations thereof, such as, "comprises" and "comprising" are to be construed in an open, inclusive sense that is as "including, but not limited to."

Reference throughout this specification to "one embodiment" or "an embodiment" means that a particular feature, structure or characteristic described in connection with the embodiment is included in at least one embodiment. Thus, the appearances of the phrases in "one embodiment" or "in an embodiment" in various places throughout this specification are not necessarily all referring to the same embodiment.

The use of ordinals such as first, second and third does not necessarily imply a ranked sense of order, but rather may only distinguish between multiple instances of an act or structure.

Reference to a prime mover means any device suitable for converting electrical energy to a power output. Such power outputs can include, but are not limited to shaft outputs such as those provided by electric traction motors.

Reference to "assets" or "asset content objects" means any data capable of conveying information to a user. Such assets may include any form current or future developed data capable of conveying information in a human perceptible format. Such assets or assent content objects may include data indicative of text content, data indicative of image or graphical content, data indicative of audio content, data indicative of moving image or video content, data indicative of audio/visual content, or combinations thereof. Each asset or asset content object is logically associated with the use, maintenance, operation, configuration, and/or set-up of at least one component, feature, device, system, and/or sub-system included with an item of manufacture. The assets or asset content objects logically related to the standard and/or optional components, devices, systems, and/or sub-systems included with an item of manufacture represent the "building blocks" from which authored asset content such as owner's guides and maintenance manuals are developed.

Reference to "Owner's Guide" means any printed or electronic publication that includes information relevant to the use and/or operation of one or more aspects of an item of manufacture.

Reference to "Maintenance Manual" means any printed and/or electronic publication that includes information relevant to the maintenance, repair, care, or upkeep of one or more aspects of an item of manufacture.

Reference to a "purchase" of an item of manufacture as used herein means any conveyance or transfer of the item of manufacture from a retailer or distributor to a product user. As such, the term "purchase" may include leases and other item use arrangements where legal title to the item of manufacture remains with a party other than the user of the item, for example a lease arrangement where legal title remains with a leasehold company or a financing arrangement where legal title remains with an escrow company or lien-holder.

Reference to a "component" or "components" means any component, device, feature, system, or sub-system present in or on an item of manufacture. Such components may include mechanical components, electrical components, and electromechanical components. Such components may also include features implemented either as hardware or as features implemented in hardware based at least in part on the execution of software by a dedicated processor in the item of manufacture (e.g., a user interface on a vehicle head unit).

The headings and Abstract of the Disclosure provided herein are for convenience only and do not interpret the scope or meaning of the embodiments.

FIG. 1 shows a system 100 in which an asset authoring and delivery system 104 uses a number of physical and/or electronic materials or information inputs 102 (collectively "information 102") to generate a number of asset content objects 108. Each asset content object 108 contains data extracted from the information 102 and is logically associated with at least one component, feature, device, system, or sub-system used in producing an item of manufacture. The asset authoring and delivery system 104 also generates an authored asset 122 based upon an build configuration 116 that includes at least some of the components used in assembling, building, or creating an item of manufacture. Each authored asset 122 is logically associated with at least one item of manufacture and includes a number of asset content objects 108 that are logically associated with the components used in producing the respective item of manufacture. The asset authoring and delivery system 104 formats and communicates at least some of the generated authored assets 122 to each of any number of remote devices 118.

The information 102 used by the asset authoring and delivery system 104 is provided from various sources that can include, but are not limited to, the manufacturer of the item, original equipment manufacturers supplying components used in the manufacture of the item, crowd-sourced information from users and/or maintainers of the item, and the like. The information 102 provided to the asset authoring and delivery system 104 can be in virtually any form or format, including but not limited to: one or more published documents 102a; one or more digital video files 102b; image files 102c; audio files 102d; and/or audio/visual files 102e. In at least some instances, digital information may be communicated to the asset authoring and delivery system 104 via one or more networks 106 which can include one or more local area networks, private networks, wide area networks, worldwide networks (i.e., the Internet), or combinations thereof. In some instances, the asset authoring and delivery system 104 can request (i.e., "pull") information 102 from one or more sources. In some instances, the sources can provide (i.e., "push") information 102 to the asset authoring and delivery system 104. In at least some implementations, the asset authoring and delivery system 104 can generate one or more information queries directed to the information sources. Responsive to the receipt of such an information query from the asset authoring and delivery system 104, one or more information sources may respond by communicating information 102 relevant to the received query to the asset authoring and delivery system 104.

The asset authoring and delivery system 104 converts the received information 102 into one or more asset content objects 108. Asset content objects 108 are a form of basic building block used to generate the authored asset 122 logically associated with one or more items of manufacture. In at least some instances, the asset authoring and delivery system 104 can autonomously create one or more asset content objects 108 using received information 102. For example, the asset authoring and delivery system 104 can autonomously convert information 102 in the form of a digital captioned image file into a first asset content object 108a that includes data representative of the image and a second asset content object 108b that includes data representative of the text caption.

Asset content objects 108 include information relevant to one or more components used in an item of manufacture. Such components may include any number of features, devices, systems or sub-systems. Such components may include any components forming any portion of any item of manufacture, such as: mechanical components, electrical components, electromechanical components, computer hardware components, computer firmware components, computer software components, or combinations thereof. Dependent upon the function and complexity of the component, a small or large number of asset content objects 108 may be logically associated with a particular component. For example, a computer controlled mechanical actuator may have three or more logically associated asset content objects 108: a first asset content object 108a including textual data related to the operation, maintenance, and repair of one or more mechanical aspects of the actuator; a second asset content object 108b including textual data related to the computer controls of the actuator; and, a third asset content object 108c including video data related to the user interface used to control the actuator.

Each of the asset content objects 108 created by the asset authoring and delivery system 104 is logically associated 150 with a component identifier 152. In at least some implementations, one or more data stores or databases 154 containing data indicative of the logical associations 150 between each component identifier 152 and any number of asset content objects 108 may be stored or otherwise retained the nontransitory storage media 111. Thus, in the above example, the asset authoring and delivery system 104 would logically associate 150 a computer controlled actuator identifier 152 with each of the asset content objects 108a, 108b, and 108c.

Manufacturers assign item identifiers 162 to each item produced. In some instances, such item identifiers 162 identify a class of items (e.g., the model number of an item or the make and model of a vehicle). In some instances, such item identifiers 162 can uniquely identify an item (e.g., a serial number assigned to an item or VIN assigned to a vehicle). Through the use of manufacturing records, production records, bills of material, production orders, or the like (collectively "build configurations 116") the asset authoring and delivery system 104 identifies some or all of the components used and/or features present in and associated with 182 a particular item of manufacture. In at least some instances, one or more data stores or data bases 184 containing data indicative of the association 182 between an item identifier 162 and any number of component identifiers 152 may be stored or otherwise retained in the nontransitory storage media 114.

Thus, the provision of an item identifier 162 to the asset authoring and delivery system 104 permits the asset authoring and delivery system 104 to retrieve at least one bill of material 116 that provides the component identifiers 152 associated 182 with a particular item identifier 162. Using the component identifiers 152, the asset authoring and delivery system 104 can then retrieve the asset content object(s) 108 associated with some or all of the component identifiers 152 from the one or more data stores or databases 154. After retrieving some or all of the asset content objects 108 associated with some or all of the component identifiers 152 associated with a particular item identifier 162, the asset authoring and delivery system 104 can use the asset content objects 108 to generate an authored asset 122 for the item. The generated authored asset 122 can include some or all of the asset content objects 108 associated with the item identifier 162 based on the component identifier 152 data included in the bill of material 116 associated with the item identifier 162.

In at least some instances, the asset authoring and delivery system 104 associates data indicative of a temporal timestamp with some or all asset content objects 108. The availability of such timestamp data may be useful for providing an authored asset 122 containing information relevant to a particular item of manufacture. For example, the installation of a particular component on a 1997 Jeep Cherokee may differ from the installation of the same component in a 2006 Jeep Cherokee. Based on the time stamps logically associated with the asset content objects 108, the asset authoring and delivery system 104 can generate and communicate an authored asset 122 having asset content objects 108 relevant to the 1997 model year to the remote device 118 or user associated with the 1997 Cherokee. Similarly, the asset authoring and delivery system 104 can generate and communicate an authored asset 122 having asset content objects 108 relevant to the 2006 model year to the remote device 118 or user associated with the 2006 Cherokee. The inclusion of temporal data permits the asset authoring and delivery system 104 to select appropriate asset content objects 108 based on an indicated date of manufacture of the item of manufacture. The inclusion of temporal data also beneficially provides component suppliers and item manufacturers with the ability to support components included in both past and present items of manufacture.

The one or more remote devices 118 can include any device capable of receiving the authored asset 122 from the asset authoring and delivery system 110 and rendering at least a portion of the received authored asset 122 as a human perceptible output. Such remote devices 118 can include, but are not limited to: an output device on the item of manufacture (e.g., a "head unit" display in an automobile) 118a; a desktop computing device 118b; a wearable computer (e.g., Google Glass®); a cellular communication device such as a smartphone 118d, or a portable computing device such as a tablet computer 118e.

In at least some instances, each remote device 118 is logically associated with one or more items of manufacture. Upon establishing a connection between the remote device and the asset authoring and delivery system 104, the asset authoring and delivery system 104 can identify a particular remote device 118 using message header data, telephone identification data, IP address data, or the like. In some instances, users may register one or more remote devices 118 with the asset authoring and delivery system 104 to permit identification of the remote device 118 by the asset authoring and delivery system 104. Thus, upon establishing a connection between a remote device and the asset authoring and delivery system 104, the asset authoring and delivery system 104 is able to identify those items of manufacture that have been associated with the remote device. In some instances, where more than one item of manufacture has been associated with a particular remote device 118, the asset authoring and delivery system 104 provides a menu permitting the remote device user to select of an item that is associated with the remote device 118.

In some instances, the asset authoring and delivery system 110 can communicate an authored asset 122 to a remote device 118 by pushing an authored asset 122 for one or more items of manufacture that have been associated with the remote device to the remote device 118. In other instances, one or more remote devices 118 can pull an authored asset 122 for one or more items of manufacture that have been associated with the remote device from the asset authoring and delivery system 110. For example, the remote device 118 can generate and communicate a request for a particular authored asset 122 to the asset authoring and delivery system 110. In at least some instances, a remote device 118 may locally store all or a portion of the authored asset 122 in a nontransitory storage media communicably coupled to the remote device 118. Local storage of authored assets 122 by the remote device 118 advantageously permits access to all or a portion of an authored asset 122 in an "OFFLINE" or equivalent mode where communication with the asset authoring and delivery system 104 is not possible.

In at least some instances, the asset authoring and delivery system 104 autonomously generates, formats, and communicates one or more authored assets 122 to one or more remote devices 118 based at least in part on item identification 162 or other data received either directly from an item of manufacture, or from a remote device associated with a particular item of manufacture. For example, a vehicular head unit may communicate to an asset authoring and delivery system 104 information indicative of a vehicle component, feature, device, system, or sub-system parameter falling outside of a defined operating range. Responsive to the receipt of such data from the vehicular head unit, the asset authoring and delivery system 104 generates a number of authored assets 122, each logically related to one or more aspects of the relevant vehicular component, feature, device, system, or subsystem.

The asset authoring and delivery system 104 can an authored asset 122 to the vehicular head unit, for example in the form of an audio message that informs the vehicle operator of the parameter and provides information relevant to the repair of the component, feature, device, system, or subsystem. The asset authoring and delivery system 104 can further communicate another authored asset 122 to a smartphone that has been logically associated with the vehicle, for example in the form of an SMS message or email that informs the smartphone user of the parameter and provides information relevant to the repair of the component, feature, device, system, or subsystem. The asset authoring and delivery system 104 can also communicate another such authored asset 122 to a vehicle dealership or repair facility computer system, for example in the form of a service appointment request that includes a diagnostic assessment and list of expected replacement components, devices, systems, or subsystems needed to repair the vehicle. Advantageously, the asset authoring and delivery system 104 delivers each authored asset to each recipient remote device 118 in a format appropriate to the recipient remote device 118. Additionally, the asset authoring and delivery system 104 includes authored assets 122 containing asset content objects 118 directly relevant to the needs of the user associated with the recipient remote device 118. At times, the asset authoring and delivery system 104 is thus able to identify the situational context of a request from a remote device 118, identify relevant asset content objects 108, identify appropriate recipient remote devices 118, and generate, format, and deliver to each recipient remote device 118 an authored asset 122 containing information relevant to the user associated with the remote device 118.

By providing information relevant to one or more components, features, devices, systems, and/or sub-systems to a number of remote devices 118, the asset authoring and delivery system 104 beneficially improves both the effectiveness and timeliness of such communications. The delivery of an authored asset 122 that includes relevant asset content objects 108 improves efficiency by providing only information core to understanding the issues related to a specific number of components, devices, systems, or subsystems. The asset authoring and delivery system's 104 ability to autonomously identify the relevant asset content objects 108 beneficially reduces the time required to provide information to users responsible for the operation, repair, or maintenance of an item of manufacture.

In at least some instances, a system user can provide the asset authoring and delivery system 104 with a number of search, query, or inquiry criteria. Using such search, query, or inquiry criteria, the asset authoring and delivery system 104 can retrieve information from some or all of the items of manufacture. For example, a system user may enter a query into the asset authoring and delivery system 104 requesting information on the number of times or duration that system "X" used on various items of manufacture has exceeded parameter "Y." Responsive to the receipt of such a request, the asset authoring and delivery system 104 can identify using the build configuration data store or database 184, those items of manufacture in which system "X" was included. Once the items of manufacture are identified, the asset authoring and delivery system 104 can request information by transmitting structured query to at least some of the items identified on a build configuration 116. Such a structured query causes the item of manufacture to respond with data indicative of the number of times or the duration that system "X" has exceeded parameter "Y."

The asset authoring and delivery system 104 operates any number of modes. In a first operating mode, the asset authoring and delivery system 104 generates and communicates authored assets 122 to one or more remote devices 118 responsive to the receipt of a request or query from the one or more remote devices 118. In such instances, the asset authoring and delivery system 104 will generate or otherwise assemble the authored asset 122 using asset content objects 108 logically associated with the components included an item of manufacture associated with the remote device 118 providing the request. In some instances, such authored assets 122 may include information, structure, content, or formatting selected by the asset authoring and delivery system 104 based upon a situational context of the item of manufacture, a situational context of the user of the remote device, a situational context of the user of the item of manufacture, or some combination thereof. For example, in response to an authored asset request received from a smartphone 118e of user seated in a vehicle with a touchscreen head unit 118a, the asset authoring and delivery system 104 can generate, format, and deliver a first authored asset 122a to the vehicle head unit 118a. Further, the asset authoring and delivery system 104 can generate, format, and deliver a second authored asset 122b to the smartphone 118e. Due to differences in physical configuration and display limitations between the vehicle head unit and the smartphone, the asset authoring and delivery system 104 adjusts the format and possibly the content of each authored asset 122a, 122b for presentation to the user on the head unit 118a, and the smartphone 118e, respectively.

In a second operating mode, the asset authoring and delivery system 104 autonomously generates and communicates authored assets 122 to one or more remote devices 118. In such instances, the asset authoring and delivery system 104 will generate authored assets 122 that include asset content objects 108 logically associated with components included on a bill of material 116. The asset authoring and delivery system 104 then "pushes" such generated authored assets 122 to the remote devices associated with the item(s) of manufacture logically associated with the respective bill of material 116. The second mode of operation is particularly useful in distributing "blanket" updates to a large number of users. For example, owner's guides and maintenance manuals stored on one or more remote devices 118 can be updated to reflect a new feature or modified component or to append new information by updating the relevant asset content object(s) 108 in the asset authoring and delivery system 104 and pushing an updated authored asset 122 that includes the updated asset content object(s) to the remote devices 108.

Figure 2:
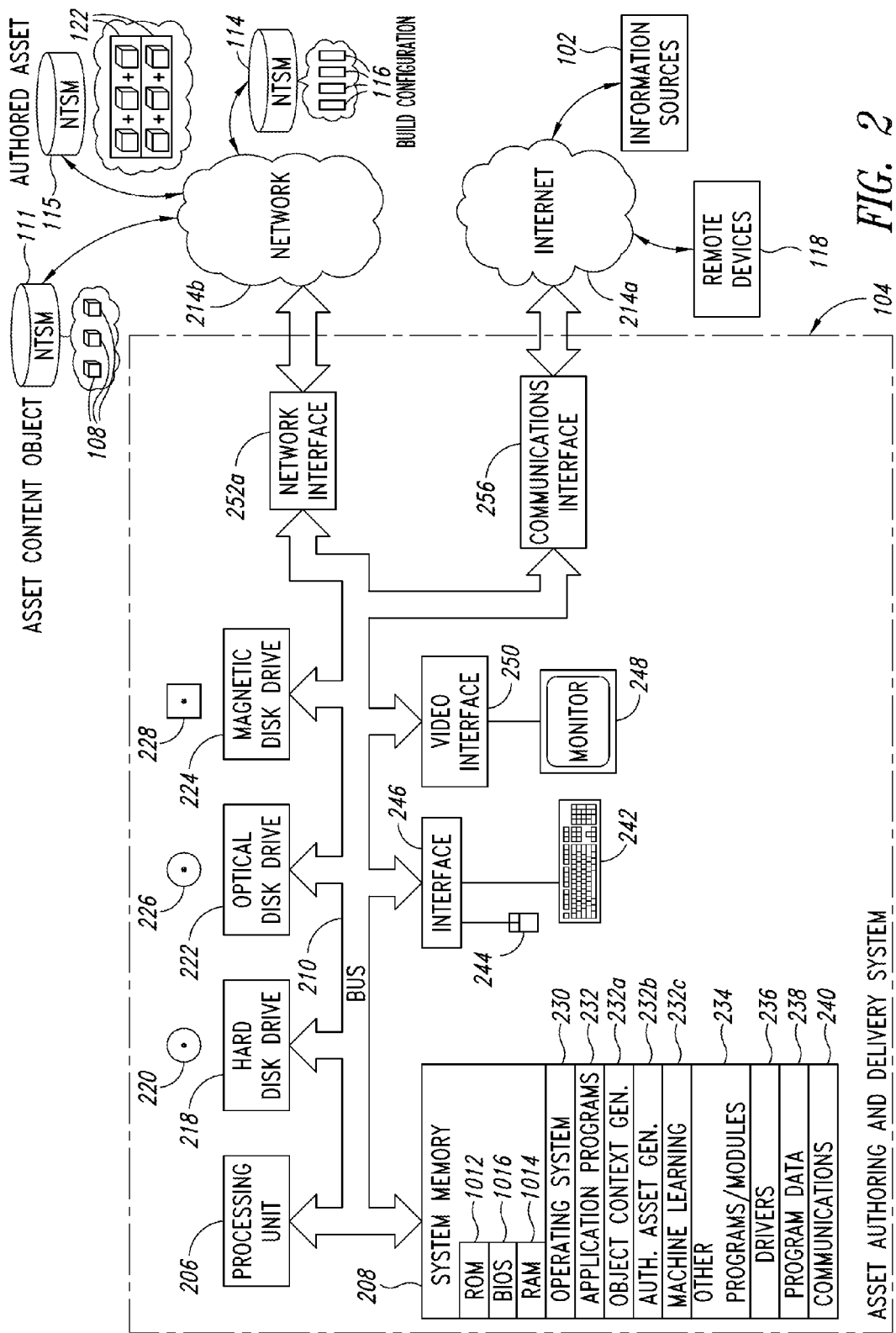
FIG. 2 is a block diagram of an example asset authoring and delivery system computing device used to select and assemble a number of asset content objects into one or more authored assets using an item identifier that identifies an item and the options or features included with the item, according to one non-limiting illustrated embodiment.

FIG. 2 shows an asset authoring and delivery system 104 suitable for implementing various illustrated embodiments described herein. Although not required, some portion of the embodiments will be described in the general context of computer-executable instructions or logic, such as program application modules, objects, or macros being executed by a computer. Those skilled in the relevant art will appreciate that the illustrated embodiments as well as other embodiments can be practiced with other computer system configurations, including handheld devices, multiprocessor systems, microprocessor-based or programmable consumer electronics, personal computers ("PCs"), network PCs, minicomputers, mainframe computers, and the like. The embodiments can be practiced in distributed computing environments where tasks or modules are performed by remote processing devices, which are linked through a communications network. In a distributed computing environment, program modules may be located in both local and remote memory storage devices.

The image asset authoring and delivery system 104 may take the form of a conventional PC, which includes a processing unit 206, a system memory 208 and a system bus 210 that couples various system components including the system memory 208 to the processing unit 206. The asset authoring and delivery system 104 will at times be referred to in the singular herein, but this is not intended to limit the embodiments to a single system, since in certain embodiments, there will be more than one system or other networked computing device involved. Non-limiting examples of commercially available systems include, but are not limited to, an 80×86 or Pentium series microprocessor from Intel Corporation, U.S.A., a PowerPC microprocessor from IBM, a Sparc microprocessor from Sun Microsystems, Inc., a PA-RISC series microprocessor from Hewlett-Packard Company, or a 68xxx series microprocessor from Motorola Corporation.

The processing unit 206 may be any logic processing unit, such as one or more central processing units (CPUs), microprocessors, digital signal processors (DSPs), application-specific integrated circuits (ASICs), field programmable gate arrays (FPGAs), etc. Unless described otherwise, the construction and operation of the various blocks shown in FIG. 2 are of conventional design. As a result, such blocks need not be described in further detail herein, as they will be understood by those skilled in the relevant art.

The system bus 210 can employ any known bus structures or architectures, including a memory bus with memory controller, a peripheral bus, and a local bus. The system memory 208 includes read-only memory ("ROM") 1012 and random access memory ("RAM") 214. A basic input/output system ("BIOS") 216, which can form part of the ROM 212, contains basic routines that help transfer information between elements within the image editing system 204, such as during start-up. Some embodiments may employ separate buses for data, instructions and power.

The image editing system 204 also includes one or more solid state or hard disk drives 218 for reading from and writing to a non-volatile, nontransitory storage media 220, and an optical disk drive 222 and a magnetic disk drive 224 for reading from and writing to removable optical disks 226 and magnetic disks 228, respectively. The optical disk 226 can be a CD or a DVD, while the magnetic disk 228 can be a magnetic floppy disk or diskette. The hard disk drive 218, optical disk drive 222 and magnetic disk drive 224 communicate with the processing unit 206 via the system bus 210. The solid state or hard disk drive 218, optical disk drive 222 and magnetic disk drive 224 may include interfaces or controllers (not shown) coupled between such drives and the system bus 210, as is known by those skilled in the relevant art. The drives 218, 222, 224, and their associated computer-readable media 220, 226, 228, provide nonvolatile storage of computer-readable instructions, data structures, program modules and other data for the image editing system 204. Although the depicted image editing system 204 employs hard disk 220, optical disk 226 and magnetic disk 228, those skilled in the relevant art will appreciate that other types of computer-readable media that can store data accessible by a computer may be employed, such as magnetic cassettes, flash memory cards, Bernoulli cartridges, RAMs, ROMs, smart cards, etc.

Program modules can be stored in the system memory 208, such as an operating system 230, one or more application programs 232, other programs or modules 234, drivers 236 and program data 238.

The application programs 232 may, for example, include asset content object generation logic 232a, authored asset generation logic 232b, and machine learning logic 232c. Such machine learning logic may include, but are not limited to data extraction machine learning to optimize the generation of asset content objects 108 using information 102 and/or asset authoring machine learning to optimize the compilation and generation of authored assets 122. The logic 232a-232c may, for example, be stored as one or more executable instructions. The asset content object generation logic 232a may include processor and/or machine executable logic or instructions to generate asset content objects 108 using data provided in the information 102. The asset content object generation logic 232a may also generate the logical association 150 between the generated asset content objects 108 and at least one component used in an item of manufacture. The authored asset generation logic 232b may include processor and/or machine executable logic or instructions to generate authored assets 122 using asset content objects 108. The authored asset generation logic 232a may also generate the logical association 160 between the generated authored asset 122 and an item of manufacture. The machine learning logic 232c may include processor and/or machine executable logic or instructions useful in improving or optimizing one or more aspects of the asset content objects 108 that are autonomously generated by the asset authoring and delivery system 104 using information 102 supplied by one or more external sources, process, and/or systems. Further, the machine learning logic 232c may include processor and/or machine executable logic or instructions useful in improving or optimizing one or more aspects of the authored assets 122 that are autonomously generated by the asset authoring and delivery system 104 using asset content objects 108. Additionally, the machine learning logic 232c may include processor and/or machine executable logic or instructions useful in improving or optimizing one or more aspects of formatting and/or delivering authored assets 122 to one or more remote devices 118.

The system memory 208 may also include communications programs 240, for example a server and/or a Web client or browser for permitting the asset authoring and delivery system 104 to access and exchange data with other systems such as user computing systems, Web sites on the Internet, corporate intranets, or other networks as described below. The communications programs 240 in the depicted embodiment is markup language based, such as Hypertext Markup Language (HTML), Extensible Markup Language (XML) or Wireless Markup Language (WML), and operates with markup languages that use syntactically delimited characters added to the data of a document to represent the structure of the document. A number of servers and/or Web clients or browsers are commercially available such as those from Mozilla Corporation of California and Microsoft of Washington.

While shown in FIG. 2 as being stored in the system memory 208, the operating system 230, application programs 232, other programs/modules 234, drivers 236, program data 238 and server and/or browser 240 can be stored on the hard disk 220 of the hard disk drive 218, the optical disk 226 of the optical disk drive 222 and/or the magnetic disk 228 of the magnetic disk drive 224. A user can enter commands and information into the image editing system 204 through input devices such as a touch screen or keyboard 242 and/or a pointing device such as a mouse 244. Other input devices can include a microphone, joystick, game pad, tablet, scanner, biometric scanning device, etc. For example, information 102 provided in the form of printed publications may be scanned into the asset authoring and delivery system 104 to create digital versions of the printed publications for incorporating to asset content objects 108. These and other input and/or output devices (i.e., "I/O devices") are connected to the processing unit 206 through an interface 246 such as a universal serial bus ("USB") interface that couples to the system bus 210, although other interfaces such as a parallel port, a game port or a wireless interface or a serial port may be used. A monitor 248 or other display device is coupled to the system bus 210 via a video interface 250, such as a video adapter. Although not shown, the image editing system 204 can include other output devices, such as speakers, printers, etc.

Although not depicted in FIG. 2, in some instances, the asset authoring and delivery system 104 may transmit all or a portion of an authored asset 122 to one or more hardcopy output devices communicably coupled to the interface 246. The one or more hardcopy output devices provide published documents such as owner's guides and maintenance manuals containing some or all of the information in the authored asset 122. Such documents can include, but are not limited to, bound documents such as traditional "glove box" owner's guides and maintenance manuals.

The asset authoring and delivery system 104 operates in a networked environment using one or more of the logical connections to communicate with one or more remote computers, servers and/or devices via one or more communications channels, for example, one or more networks 214a, 214b. These logical connections may facilitate any known method of permitting computers to communicate, such as through one or more LANs and/or WANs, such as the Internet. Such networking environments are well known in wired and wireless enterprise-wide computer networks, intranets, extranets, and the Internet. Other embodiments include other types of communication networks including telecommunications networks, cellular networks, paging networks, and other mobile networks.

In some instances, the nontransitory storage media 111 that stores all or a portion of the generated asset content objects 108 can be remote from the asset authoring and delivery system 104. In such instances, the network 214b can communicably couple the nontransitory storage media 111 to the asset authoring and delivery system 104. In some instances, the nontransitory storage media 111 that stores all or a portion of the generated asset content objects 108 can be local to the asset authoring and delivery system 104.

In some instances, the nontransitory storage media 114 that stores all or a portion of the inventories 116 data can be remote from the asset authoring and delivery system 104. In such instances, the network 214b can communicably couple the nontransitory storage media 114 to the asset authoring and delivery system 104. In some instances, the nontransitory storage media 114 that stores all or a portion of the inventories 116 can be local to the asset authoring and delivery system 104.

In some instances, the nontransitory storage media 115 that stores all or a portion of the generated authored assets 122 can be remote from the asset authoring and delivery system 104. In such instances, the network 214b can communicably couple the nontransitory storage media 115 to the asset authoring and delivery system 104. In some instances, the nontransitory storage media 115 that stores all or a portion of the generated authored assets 122 can be local to the asset authoring and delivery system 104.

When used in a WAN networking environment, the asset authoring and delivery system 104 may include one or more wired or wireless communications interfaces 256 for establishing communications over the WAN, for instance the Internet 214a. The wired or wireless communications interface 256 is shown in FIG. 2 as communicatively linked between the interface 246 and the Internet 214a. Additionally or alternatively, another device, such as a network port communicably coupled to the system bus 210, may be used for establishing communications over the Internet 214a. Further, one or more network interfaces 232a-252d, communicably coupled to the system bus 210, may be used for establishing communications over a LAN 214b. In particular, a sensor interface 222a may provide communications with one or more sensor subsystems (e.g., camera).

In a networked environment, program modules, application programs, or data, or portions thereof, can be stored in a server computing system (not shown). Those skilled in the relevant art will recognize that the network connections shown in FIG. 2 are only some examples of ways of establishing communications between computers, and other connections may be used, including wirelessly.

For convenience, the processing unit 206, system memory 208, network port 256 and interfaces 246, 252a-252c are illustrated as communicably coupled to each other via the system bus 210, thereby providing connectivity between the above-described components. In alternative embodiments of the asset authoring and delivery system 104, the above-described components may be communicably coupled in a different manner than illustrated in FIG. 2. For example, one or more of the above-described components may be directly coupled to other components, or may be coupled to each other, via intermediary components (not shown). In some embodiments, system bus 210 is omitted and the components are coupled directly to each other using suitable connections.

Figure 3A:
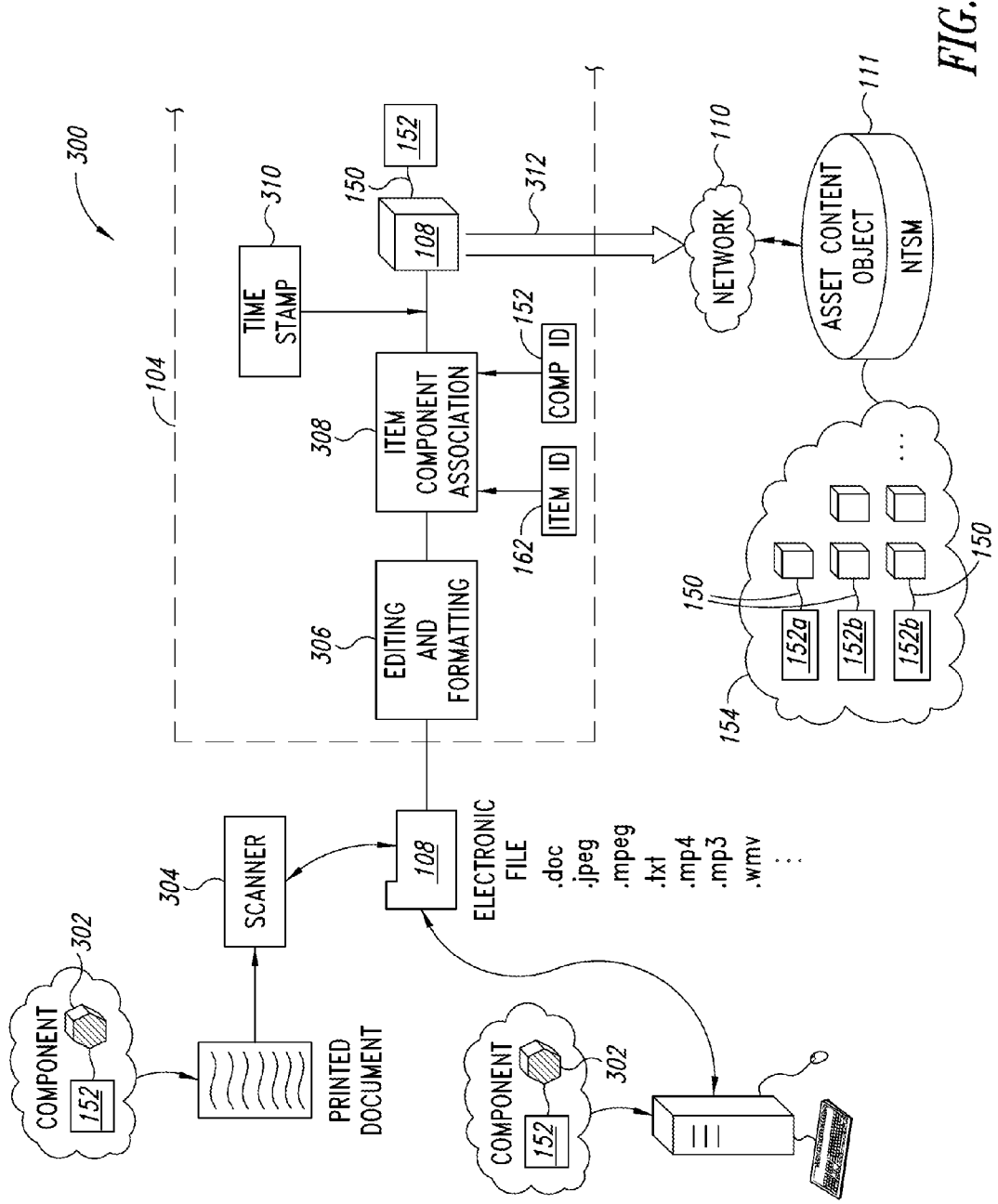
FIG. 3A is a schematic diagram showing the creation of asset content objects using information provided by an original equipment manufacturer ("OEM"), according to one non-limiting illustrated embodiment.

FIG. 3A shows the generation of asset content objects 108 using information 102 supplied by one or more sources. The generated asset content objects 108 are stored in one or more asset content object data stores or databases 154 that are stored or otherwise retained in one or more communicably coupled nontransitory storage media 111. Information 102 related to a component 302 used in an item of manufacture may be provided by the component supplier, the manufacturer of the item, and/or one or more third parties such as users or maintainers of the component 302 and/or item of manufacture. In some instances, users or maintainers of the component 302 or an item of manufacture in which the component 302 is present provide at least a portion of the information 102 (i.e., crowd-sourced information).

Such information 102 takes a variety of forms and/or formats that include, but are not limited to printed documents 102a and electronic files that include data representative of human perceptible information such as printed documents, images, video, audio, or combinations thereof. While in the vast majority of cases, the asset authoring and delivery system 104 receives information 102 in electronic form, the asset authoring and delivery system 104 can accommodate information 102 in legacy printed form. In at least some instances, an optional scanner 304 or similar device converts or otherwise renders printed publications into one or more electronic files containing digital data. In some instances, the optional scanner 304 is local to the asset authoring and delivery system 104 and directly communicably coupled to the asset authoring and delivery system 104. In other instances, the optional scanner 304 is disposed remote from the asset authoring and delivery system 104 and indirectly communicably coupled to the asset authoring and delivery system 104 (e.g., via one or more intervening networks).

The asset authoring and delivery system 104 formats and edits the incoming information 102 via one or more editing and formatting sub-systems 306. In some instances, the one or more editing and formatting sub-systems 306 autonomously perform at least a portion of such formatting and editing on the incoming information 102. In other instances, a human editor provides input to the one or more editing and formatting sub-systems 306 to perform at least a portion of the formatting and editing of the incoming information 102. Editing and formatting the audio, video, and/or written contents of each asset content object 108 advantageously provides a more consistent and uniform audio and visual format as well as a more consistent and uniform writing style and voice. Such consistency provides an easily readable and comprehensible authored asset 122, particularly when combining a number of asset content objects 108. In at least some autonomous editing and formatting sub-systems 306, one or more machine learning algorithms (using, for example, professionally edited asset content objects as training examples) may be employed to improve the consistency and/or quality of audio, visual, or written formatting and/or the consistency and/or quality of audio, visual, or written editing.

The asset authoring and delivery system 104 also associates at least one of a component identifier 152 or an item identifier 162 with each asset content object 108 via one or more item/component association sub-systems 308. In some instances, the one or more item/component association sub-systems 308 autonomously logically associate a component identifier 152 or an item identifier with the asset content object 108. In other instances, a human editor provides input to the one or more item/component association sub-systems 308 that logically associates a component identifier 152 and/or an item identifier 162 with the asset content object 108.

The asset authoring and delivery system 104 also may also associate data representative of a time stamp 310 with the asset content object 108. The inclusion of such time stamp information advantageously provides the ability to associate asset content objects 108 with different evolutionary "versions" of the same component 302 or item. Such permits the asset authoring and delivery system 104 to associate an asset content object 108 with not just a particular component identifier 152 or item identifier 162, but also a timeframe of use for the particular component 302 or item. Such advantageously permits the generation of authored assets 122 for both current and former items of manufacture that may share different versions of a common component 302. In at least some instances, the data indicative of the time stamp associated with the asset content object 108 may take the form of a timer or counter. In other instances, the data indicative of the time stamp associated with the asset content object 108 may take the form of date and time referenced to a recognized local, regional, or international standard (e.g., coordinated universal time or "UTC").

The asset authoring and delivery system 104 communicates the edited and formatted asset content object 108 along with the logically associated 150 component identifier 152 or item identifier 162 and the time stamp data to the nontransitory storage media 111. One or more asset content object data stores or databases 154 on the nontransitory storage media 111 may receive and non-volatily retain the asset content object 108, the logically associated component or item identifier, and the time stamp.

Figure 3B:
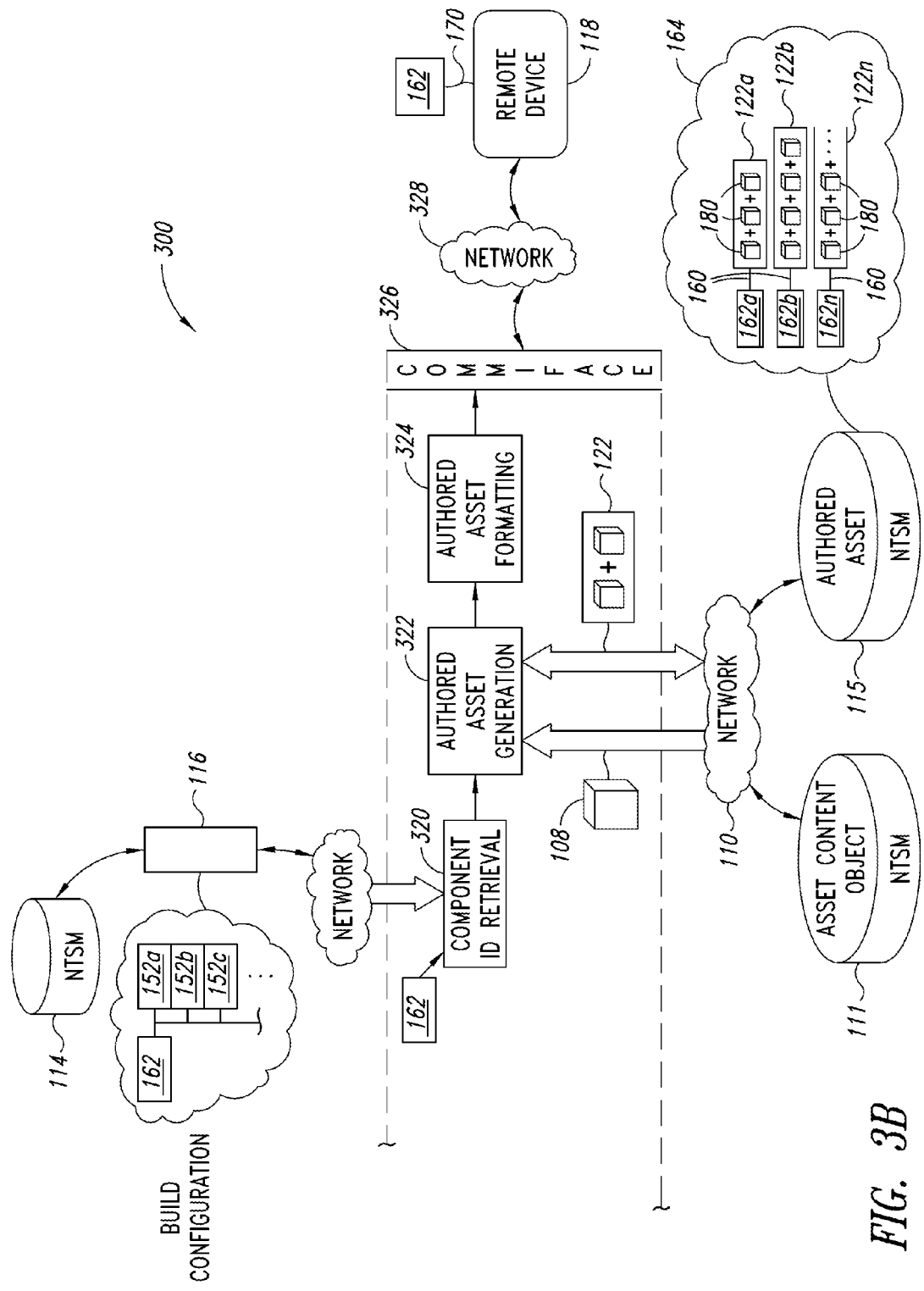
FIG. 3B is a schematic diagram showing the creation of one or more authored assets based on a retrieved build configuration of an item of manufacture, and the subsequent formatting of the one or more authored assets prior to delivery to one or more remote devices, according to one non-limiting illustrated embodiment.

FIG. 3B shows the generation of authored assets 122 by the asset authoring and delivery system 104. In some instances (e.g., the first operating mode), the asset authoring and delivery system 104 can dynamically create one or more authored assets 122 responsive to the receipt of a request for an authored asset 122 from one or more remote devices 118. In other instances (e.g., the second operating mode), the asset authoring and delivery system 104 associates one or more authored assets 122 with an item identifier 162, and upon receipt of a request for an authored asset 122 from one or more remote devices 118 retrieves and communicates the one or more authored assets 122 to the one or more remote devices 118.

Each remote device 118 is associated 170 with one or more item identifiers 162. For example, a remote device in the form of a smartphone 118e may be associated 170 with two item identifiers 162a and 162b in the form of two different vehicle identification numbers or "VINs." In another example, a remote device in the form of a vehicle "head unit" 118a may be associated 170 with an item identifier 162a in the form of the VIN of the vehicle carrying the head unit.

One or more data stores or databases containing data indicative of build configurations 116 that relate item identifiers 162 to the component identifiers 152 of the components 302 used in the manufacture of the item are stored or otherwise retained in a nontransitory storage media 114. The nontransitory storage media 114 is directly or indirectly communicably coupled to the asset authoring and delivery system 104. Responsive to the receipt of an item identifier 162, a component identifier retrieval sub-system 320 retrieves the build configuration 116 associated with the item identifier 162 from the nontransitory storage media 114. Using the retrieved build configuration 116, the component identifier retrieval sub-system 320 forwards the component identifiers 152a-152n associated with the item identifier 162 to an authored asset generation sub-system 322.

The authored asset generation sub-system 322 uses the component identifiers 152a-152n received from the component identifier retrieval sub-system 320 to retrieve the asset content objects 108 logically associated 150 with each of the component identifiers 152a-152n from the nontransitory storage media 111. The authored asset generation sub-system 322 combines the asset content objects 108 to generate an authored asset 122 that is logically associated with the item identifier 162 used by the component identifier retrieval sub-system 320 to retrieve the build configuration 116.

Remote devices 118 have differing processing and rendering capabilities. The asset authoring and delivery system 104 forwards the authored asset 122 to a formatting sub-system 324 where the authored asset 122 is formatted for display on a particular remote device 118. For example, an authored asset 122 containing audio and video content may be provided to a vehicle head unit having the appropriate software and hardware to playback the audio and video content to a user while the same authored asset 122 is provided without audio and video content to a smartphone remote device 118e due to the lack of software or hardware to playback the content. In another example, a font size used to present an authored asset 122 on a tablet computer remote device 118d may be larger than a font size used to present the same authored asset 122 on a smartphone remote device 118e. The formatting sub-system 324 may change the file type or format dependent on the operating system and/or file handling or conversion capabilities of the remote device 118 receiving the authored asset 122.

In some instances, the asset authoring and delivery system 104 dynamically creates the authored asset 122 upon receipt of a request from one or more remote devices 118. In such instances, the asset authoring and delivery system 104 may not retain the authored asset 122 generated responsive to the received request. In other instances, the asset authoring and delivery system 104 creates and stores some or all of the authored assets 122a-122n logically associated 160 with item identifiers 162a-162n. In such instances, the asset authoring and delivery system 104 can store the authored asset 122 and the logically associated 160 item identifier 162 in one or more data stores or databases 164 stored or otherwise retained in a nontransitory storage media 115. The nontransitory storage media 115 is directly or indirectly communicably coupled to the asset authoring and delivery system 104. In such instances, the asset authoring and delivery system 104 upon receipt of an item identifier having one or more logically associated authored assets 122 stored in the nontransitory storage media 115, retrieves the stored authored assets 122.

In some implementations, the asset authoring and delivery system 104 "pushes" one or more authored assets 122 to a remote device. For example, the asset authoring and delivery system 104 may have previously pushed an authored asset 122 in the form of an owner's guide to a remote device 118 in the form of a vehicle head unit. In such instances, all or a portion of the authored asset 122 may be stored in a nontransitory memory communicably coupled to the remote device 118. Updates, upgrades, and patches to mechanical systems, electrical systems, control system software, firmware and/or hardware may result in changes or revisions to some of the asset content objects 108 associated with a particular item of manufacture and included in one or more authored assets associated with the particular item. In such instances, the asset authoring and delivery system 104 can "push" an updated authored asset 122 that includes at least the updated asset content objects 108 to the remote device 118.

For example, a remote device 118 such as a vehicle head unit may provide a user interface for a vehicular climate control system. One or more authored assets 122 stored in a nontransitory memory coupled to the head unit provide instructional text, audio, video, and A/V content on the operation of the climate control system. A firmware update transmitted to the head unit may cause changes in appearance and/or operation of the climate control system. Responsive to the firmware update, the asset authoring and delivery system 104 may update the asset content objects 108 logically associated with the climate control system component identifier 152. In such an instance, the asset authoring and delivery system 104 may push an updated authored asset 122 containing instructions for the operation of the updated climate control system to the head unit. Advantageously, such updates are autonomous and performed in a manner transparent to the vehicle user.

In some implementations, one or more remote devices 118 can "pull" all or a portion of an authored asset 122 from the asset authoring and delivery system 104. Such may occur, for example, in situations where a remote device 118 contains an insufficient quantity of nontransitory memory to store the authored asset. Such may also occur where the user of the remote device does not provide access to sufficient memory within the device to store the authored asset 122. In such instances, the remote device 118 communicates an item identifier 162 to the asset authoring and delivery system 104. Upon receipt of the item identifier 162, the asset authoring and delivery system 104 dynamically creates an authored asset 122 based at least on the received item identifier 162. The asset authoring and delivery system 104 then communicates the generated authored asset 122 to the remote device 118 that generated the request or to another remote device 118 designated in the request.

Figure 4:
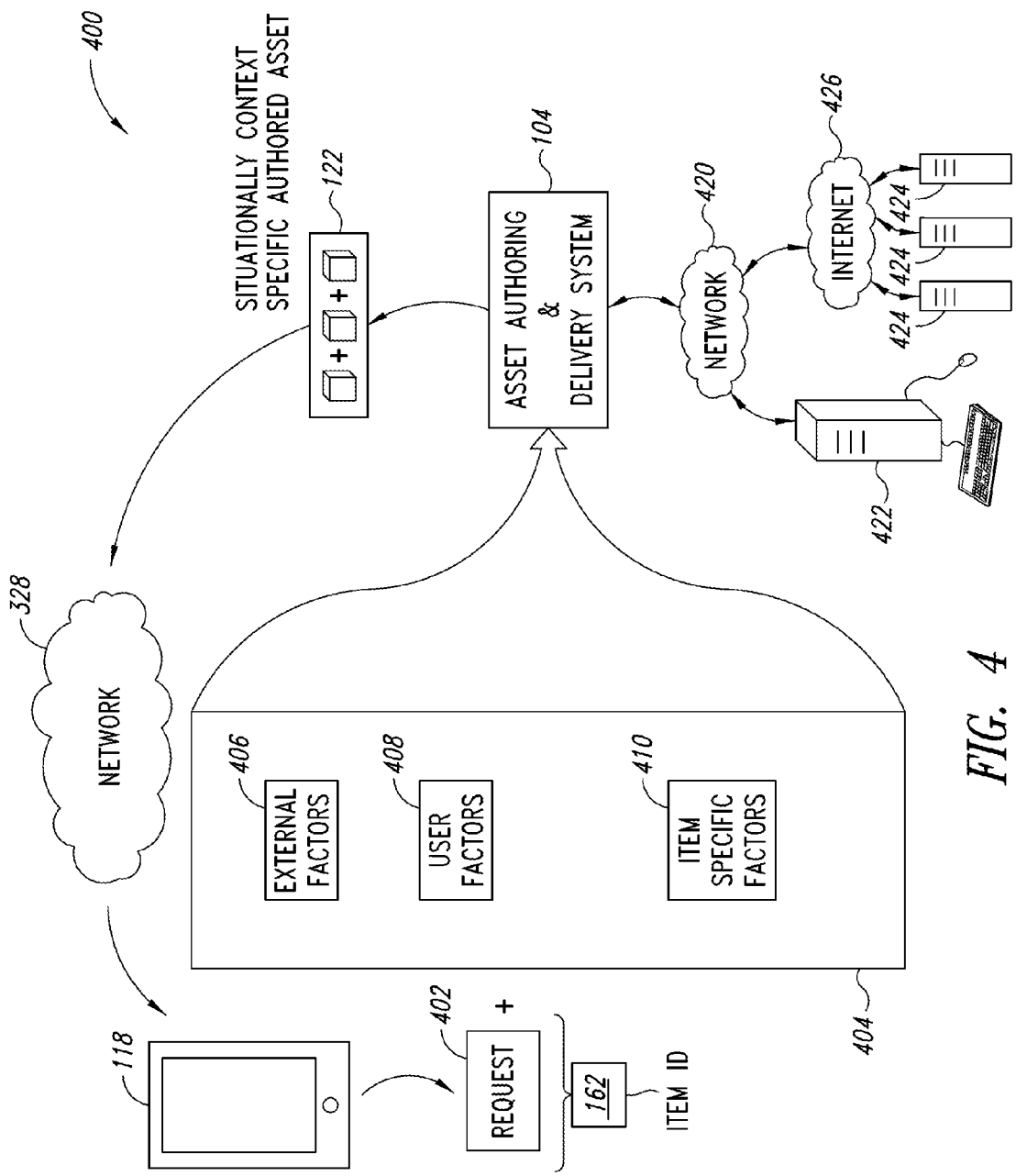
FIG. 4 is a block diagram showing the delivery of authored assets selected that are created by the asset authoring and delivery system based at least in part on received data indicative of a situational context, according to one non-limiting illustrated embodiment.

FIG. 4 shows a remote device 118 generating a request 402 for an authored asset 122. In at least some implementations, the asset authoring and delivery system 104 can generate and provide an authored asset 122 tailored to any number of situational context factors 404 that include, but are not limited to external factors 406, user factors 408, system factors 410, or combinations thereof. In some instances, one or more remote devices 118 collect some or all of the situational context factors 404 and communicate data indicative of the situational context factors to the asset authoring and delivery system 104 as a portion of the request 402. In other instances, the asset authoring and delivery system 104 can poll one or more remote devices 118 to obtain at least some of the situational context factors 404 responsive to the receipt of a request for an authored asset from a remote device 118. Advantageously, the delivery of a dynamically generated authored asset 122 that is tailored to the situational context of the item and/or the user of the item permits the delivery of directly relevant information to one or more remote devices.

For example, a "CHECK ENGINE" indicator in an item of manufacture such as a vehicle may illuminate. Responsive to the illumination of the indicator, the user of the vehicle may use a first remote device 118 such as the vehicle head unit to receive an authored asset 122 such as an owner's manual to determine the appropriate response. In some instances, the request 402 generated by the head unit may include data indicative of situational context factors 404 relevant to the operation of the vehicle in general and specifically relevant to the operation of those systems that may cause the CHECK ENGINE indicator to illuminate. Based on the request and the situational context factors 404, the asset authoring and delivery system 104 can generate an authored asset 122 that includes information on the CHECK ENGINE indicator as well as those systems that may have caused the CHECK ENGINE indicator to illuminate based on the situational context factors included in the request from the head unit.

In some instances, the first remote device 118 can poll one or more communicably coupled items of manufacture to ascertain one or more situational context factors prior to generating the request 404. For example, the user may use a second remote device 118*b* such as a smartphone to generate a request 402 an authored asset 122 such as an owner's manual to determine the appropriate response to the CHECK ENGINE indicator. Prior to generating the request, the smartphone may poll the vehicle, for example via a Bluetooth® or Near Field Communication ("NFC") connection to obtain data indicative of one or more situational context factors 404. The data indicative of the situational context factors can then be included with the request 402 communicated to the asset authoring and delivery system 104.

In some instances, the asset authoring and delivery system 104 can request situational context factors 404 from an item of manufacture responsive to the receipt of a request 404 from a remote device 118. For example, responsive to the receipt of a request for an authored asset 122 such as a vehicle owner's manual from a remote device 118 such as a cell phone, the asset authoring and delivery system 104 can request situational context factors from a head unit in the vehicle. Upon receipt of the situational content factors 404 from the vehicle head unit, the asset authoring and delivery system 104 can generate an authored asset 122 containing asset content objects 108 relevant to the situation of the user, the vehicle or both the user and the vehicle.

The situational context factors 404 can include any number and/or combination of factors related to an operational aspect of an item of manufacture or a user's interaction with an item of manufacture. Such may include one or more external factors 406, one or more user factors 408, and one or more item specific factors 410. The asset authoring and delivery system 104 can use some or all of the situational context factors 404 in selecting asset content objects 108 for inclusion in one or more authored assets 122. For example, in response to a request from a remote device 118 for an authored asset 122 such as a vehicle owner's manual, the asset authoring and delivery system 104 may determine from one or more situational context factors 404 that the air pressure in one tire on the vehicle is below a defined threshold indicative of a flat tire. Based on this situational context factor 404 (e.g., low tire pressure) the asset authoring and delivery system 104 can generate an authored asset 122 including information relevant to changing a tire on the vehicle. Such subject specific authored assets 122 may include links to other owner's guide sections and/or the entire owner's guide.

In at least some implementations, the asset authoring and delivery system 104 can include one or more machine learning algorithms to generate relational matrices linking various situational context factors 404 and combinations of situational context factors 404 with relevant authored assets. For example, a first situational context factor 404*a* indicative of a low tire pressure in combination with a second situational context factor 404*b* indicative of a geolocation on an interstate highway may result in the generation of an authored asset 122 providing information on changing a flat tire. While an identical first situational context factor 404a in combination with a second situational context factor 404c indicative of a geolocation in the Imperial Sand Dunes Recreation Area (where low tire pressures are used to gain traction in soft sand) may result in the generation of a different authored asset 122 such as an authored asset providing information on the nearest highway via an in-vehicle navigation system.

The asset authoring and delivery system 104 can obtain situational context factors 404 from one or more remote devices 118. For example, an item of manufacture such as a vehicle may have sensors, devices, or systems capable of measuring local temperature, geolocation, slope, windspeed, and the like. The asset authoring and delivery system 104 may also obtain situational context factors 404 from systems or devices external to the remote devices 118. For example, the asset authoring and delivery system 104 may obtain a first situational context factor 404 including data indicative location from a global positioning system onboard a vehicle and additional situational context factors 404 such as local time of day, weather, traffic, event information and similar information relevant to the determined geolocation from one or more external sources. Such external sources can include, but are not limited to, one or more network storage devices 422 accessed via a local or wide area network 420 and one or more Web servers 424 or similar remote data providers accessed via the Internet 426.

External situational context factors 406 can include data indicative of any external factors, ambient factors, and/or environmental factors capable of affecting an item of manufacture, a user of an item of manufacture or both. Example external situational context factors 404 can include, but are not limited to, data indicative of: ambient temperature, precipitation, geolocation, traffic, local events, atmospheric activity, weather, local/state/federal government regulations, and the like.

User situational context factors 408 can include data indicative of any factors related to an owner and/or user of an item of manufacture. Example user situational context factors 408 include, but are not limited to data indicative of: a user's age, a user's experience with and/or prior use of the item of manufacture, a user's experience with and/or prior use of similar items of manufacture, a user's familiarity with the item of manufacture, a user's familiarity with similar items of manufacture, one or more measured user biometric parameters, one or more known cultural practices associated with the user, one or more habits associated with the user, the education of the user, the mechanical and/or electrical aptitude of the user, and the like.

Item specific situational context factors 410 can include data indicative of any factors related to an item of manufacture. Example item specific situational context factors 410 include, but are not limited to data indicative of: the operational status of the item (e.g., ON/OFF status); the presence of worn components, systems and/or devices in the item; the presence of out of date components, systems, devices, software, and/or firmware in the item; the presence of failed components, systems, devices, software, and/or firmware in the item; the presence of unknown or unidentified components, systems, devices, software, and/or firmware in the item; and the presence of manufacturer or original equipment manufacturer approved components, systems, devices, software, and/or firmware in the item.

Figure 5:
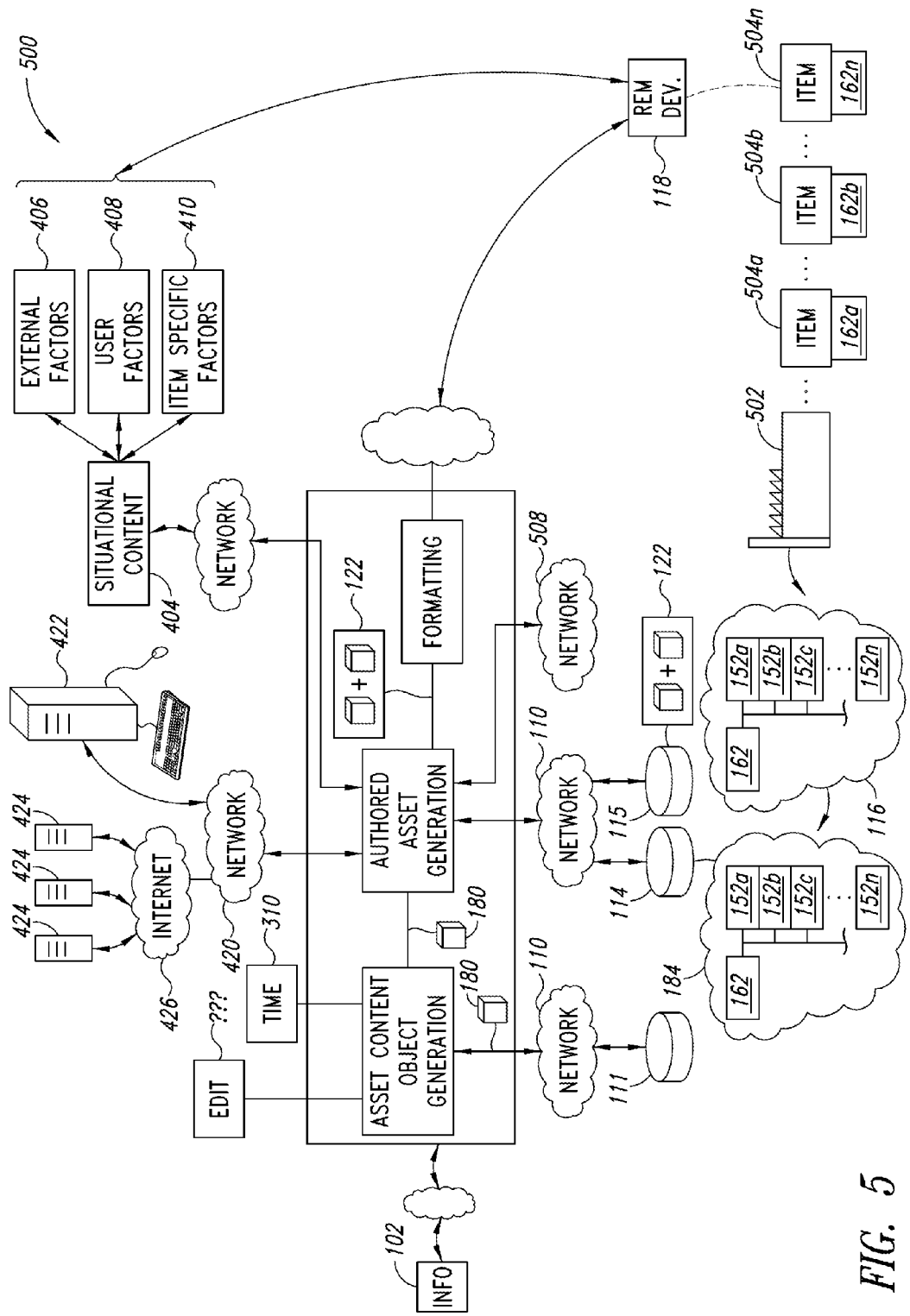
FIG. 5 is a schematic diagram showing an integrated system including an asset authoring and delivery system communicably coupled to a manufacturer producing items of manufacture, according to one non-limiting illustrated embodiment.

FIG. 5 shows an example relationship between an asset authoring and delivery system 104 and a manufacturer 502, according to one embodiment. In such instances, the manufacturer 502 produces a number of items of manufacture 504a-504n (collectively "items 504"). An item identifier 162a-162n is associated with each of the respective items 504. The manufacturer 502 communicates a build configuration 116 for each item of manufacture 504 to the one or more data stores or databases 184 containing build configuration data in which an item identifier 162 is logically associated 182 with any number of component identifiers 152. In at least some implementations, one or more networks 508 communicably couple some or all of the items of manufacture 504 to the asset authoring and delivery system 104. In at least some instances, the one or more networks 508 can include one or more local area networks, one or more wide area networks, and/or one or more worldwide networks such as the Internet.

Figure 6:
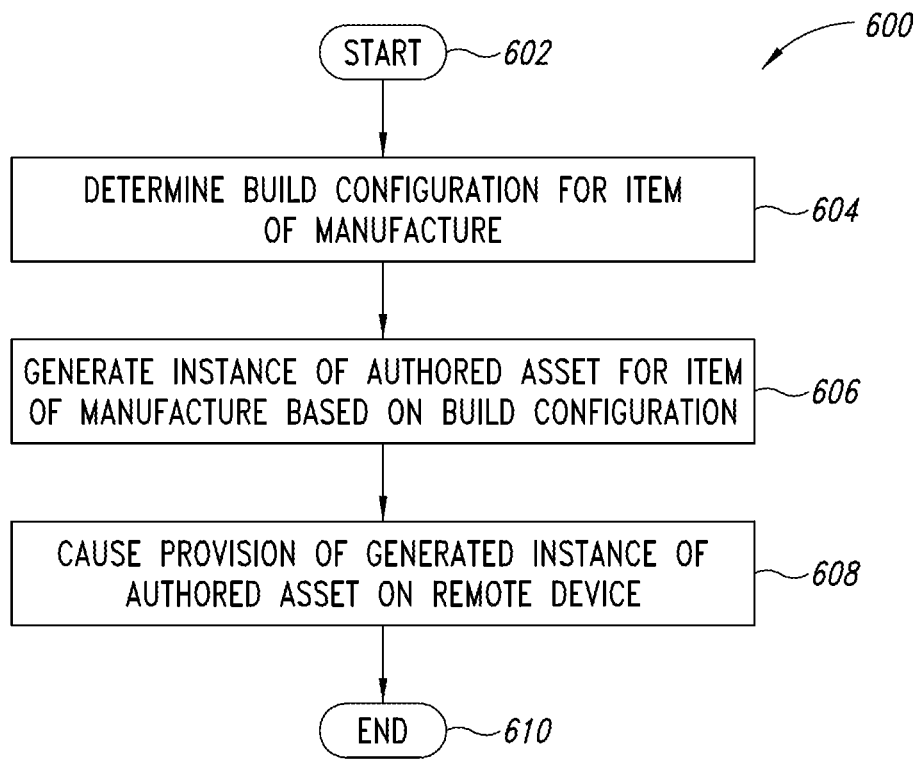
FIG. 6 is a high-level flow diagram of a method of generating an authored asset on a remote device based on a determined build configuration of an item of manufacture, according to one non-limiting illustrated embodiment.

FIG. 6 shows a high level logic diagram 600 of a method implemented by an example authored asset and delivery system such as the system 104 depicted in FIG. 1. The method 600 includes generating one or more authored assets 122 for an item of manufacture 504 based on a determined build configuration 116 of the item 504. Modern manufacturing techniques typically include a manufacturer 502 receiving components, devices, systems and sub-systems 302 from one or more sources, suppliers, distributors, and/or original equipment manufacturers (OEMs). The manufacturer 502 assembles or otherwise constructs each item of manufacture 504 using some or all of these components 302. A specific build configuration 116 may be logically associated with each item of manufacture 504. The build configuration 116 can identify the various components, devices, systems and sub-systems 302 used in the manufacture of the item. Thus while outwardly similar, each item of manufacture represents an assembly of components 302 selected based on a particular build configuration 116 that is logically associated with a particular item 504 or a particular class of items 504a-504n. A manufacturer 502 selects various build configurations 116 based on manufacturer requirements; customer requirements; legal requirements such as safety, energy efficiency, and/or emissions requirements; community standards; or combinations thereof.

In some instances, the number of optional or alternative components available leads to a dizzying array of possible permutations and a large number of different possible build configurations 116. In prior printed publications such as owner's guides and maintenance manuals, passages regarding optional or alternative components was often preceded with the disclaimer "IF EQUIPPED" or "IF PRESENT." While such comprehensive guides and manuals permit a manufacturer to streamline production and supply chain processes by permitting the use of a single guide or manual with all items 504 included in a particular class, make, and/or model, such guides or manuals are often confusing and difficult to use for users and maintainers of the item 504. A manufacturer 502 creates such printed publications by editing and combining information 102 provided by each component supplier into a cogent narrative that covers both the operation and maintenance of the item of manufacture 504 as well as the operation and maintenance of some or all operably connected components 302 included in the item of manufacture 504.

As described by various embodiments contained herein, the one or more sources, suppliers, distributors, and/or original equipment manufacturers (OEMs) supply component information 102 in a number of formats, including printed publications and electronic documents. Printed publications can include text documents, images, drawings, sketches, diagrams, flowcharts, tables, graphs, and the like. Electronic documents typically include machine readable files (e.g., computer files) containing documents, images, drawings, sketches, diagrams, flowcharts, tables, and graphs, as well as video presentations, audio presentations, A/V presentations, animations, interactive content, and the like. In addition, parties other than suppliers, distributors, and/or original equipment manufacturers (OEMs) can provide electronic files relevant to components and/or items of manufacture. For example, individuals such as users or maintainers of various components or items of manufacture 504 may generate and post electronic documents to bulletin boards, chat groups, social networking sites, or content presentation sites such as YouTube®.

As described in detail herein, using this wealth of available printed and electronic information, an asset authoring and delivery system 104 can advantageously generate electronic asset content objects 108 that include edited and formatted asset content objects 108 representative of printed and electronic publications logically associated with a particular component 302, components 302a-302n, and/or an item of manufacture 504. As generated by the asset authoring and delivery system 104, each asset content object 108 contains information edited to focus on a particular operational or maintenance aspect of a component 302, components 302a-302n, and/or an item of manufacture 504. The asset authoring and delivery system 104 advantageously combines asset content objects 108 based at least in part on the build configuration 116 logically associated with a particular item 504. Thus, the manufacturer 502 is able to combine asset content objects 108 using sets of rules to generate authored assets 122 such as "custom" owner's guides and maintenance manuals tailored to an individual item of manufacture 504. The asset authoring and delivery system 104 can dynamically create and deliver such asset content objects 122 to one or more remote devices 118 autonomously (e.g., on a defined, regular, periodic, or intermittent basis) or upon receipt of a request from one or more remote devices 118.

In some instances, the asset authoring and delivery system 104 can autonomously generate and deliver authored assets 122 such as "custom" sets of user guides and manuals tailored to an individual item of manufacture 504 to remote devices 118 for local storage. Such an arrangement advantageously eliminates the need for a "live" connection to the asset authoring and delivery system 104 to receive the authored asset 122. Such an arrangement also permits the manufacturer 502 to periodically or intermittently issue updates, patches, upgrades, and the like to the locally stored authored assets 122. Thus, the time and expense of providing up-to-date owner's guides and maintenance manuals to users is significantly reduced and the reliability of information contained in such authored asset guides and manuals increased. The method of generating authored assets 122 using asset content objects 108 begins at 602.

At 604, the asset authoring and delivery system 104 determines the build configuration 116 of a particular item of manufacture 504. The build configuration 116 includes data indicative of some or all of the components 302 used in an item of manufacture 504. In at least some implementations, an item identifier 162, such as a model number, serial number, model/serial number, vehicle identification number, etc., is logically associated with an item of manufacture 504. In one or more build configuration data stores or databases 118, the item identifier 162 is logically associated with any number of component identifiers 152a-152n logically associated with a corresponding component 302a-302n included in the item of manufacture 504.

In at least some instances, the asset authoring and delivery system 104 can receive an item identifier 162 logically associated with a particular item of manufacture 504. Using the received item identifier 162, the asset authoring and delivery system 104 can retrieve or otherwise obtain the build configuration 116 for an item 504 from one or more build configuration data stores or databases 184. In at least some instances, the asset authoring and delivery system 104 can retrieve or otherwise obtain the build configuration 116 corresponding to a particular item identifier 162 using the item identifier 162 as an index to search the one or more build configuration data stores or databases 184. The one or more build configuration data stores or databases 184 contain data indicative of build configurations 116 for some or all of the items of manufacture 504 produced by the manufacturer 502. For example, an enterprise business system, inventory management system, or supply chain management system may include one or more build configuration data stores or databases 184, each containing build configurations 116 indexed by item identifiers 162. Each of such build configurations 116 can include component identifiers 152a-152n logically associated with corresponding components 302a-302n present in the item of manufacture 504. The build configuration 116 for a particular item of manufacture 504 may include one or more manufacturer supplied components 302a-302n, one or more dealer/retailer/distributor supplied components 302a-302n, one or more aftermarket supplied components 302a-302n, or combinations thereof.

At 606, the asset authoring and delivery system 104 generates one or more authored assets 122 based on the retrieved build configuration 116. In at least some instances, each component identifier 152 is logically associated with a number of asset content objects 108. As previously discussed, the asset content objects 108 can each include information related to the particular component, feature, device, system, or sub-system and obtained from any number of sources. In at least some instances, the asset authoring and delivery system 104 includes one or more asset content object data stores or databases 154. In at least some instances, the asset authoring and delivery system 104 can retrieve or otherwise obtain the asset content objects 108 corresponding to a particular component identifier 152. The asset authoring and delivery system 104 may retrieve such asset content objects 108 using the component identifier 152 as an index to search the one or more asset content object data stores or databases 154. For example, an enterprise business system, inventory management system, or supply chain management system may include one or more asset content object data stores or databases 154, indexed by component identifiers 152 and containing a number of asset content objects 108a-108n logically associated with each of the component identifiers 152.

The asset authoring and delivery system 104 can retrieve some or all of the asset content objects 108a-108n logically associated with some or all of the component identifiers 152a-152n logically associated with a particular item identifier 162. The asset authoring and delivery system 104 can generate one or more authored assets 122 by combining, joining, or otherwise merging and formatting the retrieved asset content objects 108a-108n logically associated with some or all of the component identifiers 152a-152n included in the item 504.

At 608, the asset authoring and delivery system 104 communicates the generated authored asset 122 to one or more remote devices 108. The remote device 108 then generates an instance of the authored asset 122. Remote devices 108 can include display devices included with the item of manufacture (e.g., an LCD display on a washing machine or a vehicular head unit) 118a, personal computers with high resolution displays 118b, wearable computers such as Google Glass® 118c, portable computers such as tablet form factor computers 118d, and portable electronic devices such as smartphones and personal digital assistants 118e. The presentation and display capabilities thus vary from one remote device 118 to another. In at least some implementations, the asset authoring and delivery system 104 can format the authored asset 122 for presentation on one or more particular remote devices 118. For example, the asset authoring and delivery system 104 may provide a content rich authored asset 118 to a remote device having significant computational resources such as a personal computer or vehicular head unit. Conversely, the asset authoring and delivery system 104 may provide a content lean authored asset 118 to a remote device having more limited computational resources such as a smartphone or personal digital assistant. The method 600 concludes at 610.

Figure 7:
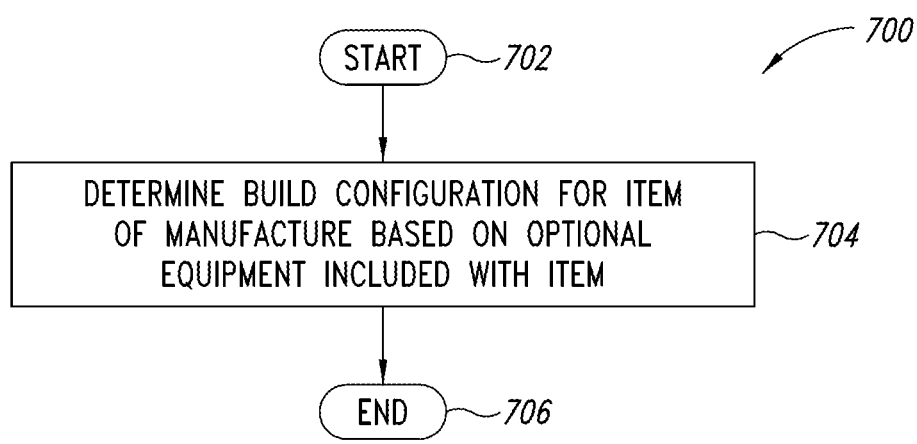
FIG. 7 is a flow diagram of a method of generating an authored asset on a remote device based on a determined build configuration of an item of manufacture equipped with one or more optional components or features, according to one non-limiting illustrated embodiment.

FIG. 7 shows a logic diagram 700 for an example authored asset and delivery system 104 for generating authored assets for an item of manufacture 504 based on a determined build configuration 116 that includes optional components installed on the item 504. The number of components included in an item of manufacture 504 varies widely. For example, motor vehicles are often available as a basic model with few installed options to luxury models that include numerous options, option combinations, custom options, and option packages. The many manufacturers 502 generate build configurations 116 for each item of manufacture 504. These build configurations 116 include standard components, devices, systems, and sub-systems included in a particular item of manufacture 504 as well as any optional components, features, devices, systems, and sub-systems included in the particular item of manufacture 504. The method 700 begins at 702.

At 704, the asset authoring and delivery system 104 determines the build configuration 116 of a particular item of manufacture 504. In at least some instances, data indicative of one or more component identifiers 152 corresponding to one or more optional components 302 included with the item of manufacture 504 may be included in the build configuration 116. The method 700 concludes at 706.

Figure 8:
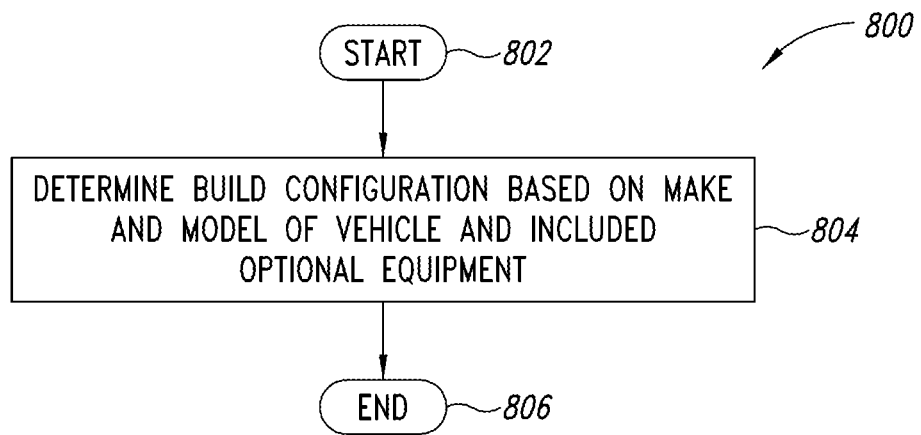
FIG. 8 is a flow diagram of a method of generating an authored asset on a remote device based on the make and model of a vehicle equipped with one or more optional components or features, according to one non-limiting illustrated embodiment.

FIG. 8 shows a logic diagram 800 for an example authored asset and delivery system 104 for generating authored assets for an item of manufacture 504 such as a vehicle using a determined build configuration 116 based on one or more item parameters such as the make and model of the vehicle along with any optional components installed on the item 504. In at least some instances, parameters, such as a vehicle make and model, associated with an item of manufacture 504 identify a number of components, devices, systems, or sub-systems included with all items 504 sharing the parameter (i.e., all vehicles sharing a common make and model). For example, every base Toyota Corolla may share common powertrain, entertainment, climate control, and driver input systems. In such instances, the knowledge of the make and model of the item 504 enables the selection of appropriate asset content objects 108 logically associated with the powertrain, entertainment, climate control, and driver input systems by the asset authoring and delivery system 104. An intermediate level Toyota Corolla LX will share the components, devices, systems, or sub-systems included in the base model Corolla, as well as include several components, features, devices, systems, or sub-systems that are either unavailable or only available as options on the base model Corolla, for example leather seating and air conditioning. Identifying an item 504 as a Toyota Corolla will result in the inclusion of asset content objects 108 associated with components, features, devices, systems, or sub-systems included across the Corolla model line (i.e., included on base models as well as the LX model). Further identifying an item 504 with greater specificity as a Toyota Corolla LX will result in the asset authoring and delivery system 104 generating authored assets 122 that include asset content objects 108 for optional components 302 included on the LX model. The method 800 begins at 802.

At 804, one or more remote devices 118 can communicate the data indicative of the item parameters (e.g., the make and model of the vehicle) to the asset authoring and delivery system 104. In other instances, a system user can provide a data input to the asset authoring and delivery system 104 indicative of the item parameters (e.g., the make and model of the vehicle).

Responsive to the receipt of the data indicative of a vehicle make and model from a remote device 118 or via user input, the asset authoring and delivery system 104 determines the build configuration 116 of an item 504. In at least some instances, the build configuration 116 is at least partially determined using the make and model of the vehicle. Thus, one or more authored assets 122 associated with a base model Toyota Corolla will include asset content objects 108 related to a first set of components, features, devices, systems, or sub-systems included in the base model Toyota Corolla.

In at least some instances, the asset authoring and delivery system 104 additionally includes any optional equipment in the build configuration based on a model designator assigned by the manufacturer 502. One or more authored assets 122 associated with a Toyota Corolla will include asset content objects 108 related to a first set of components, devices, systems, or sub-systems included in the base model Toyota Corolla. Thus, one or more authored assets 122 associated with an LX-model Toyota Corolla will include asset content objects 108 related to the first set of components 302 included in the base model Toyota Corolla as well as asset content objects 108 related to one or more optional components and/or features 302 included with the LX-model Toyota Corolla. The method 800 concludes at 806.

Figure 9:
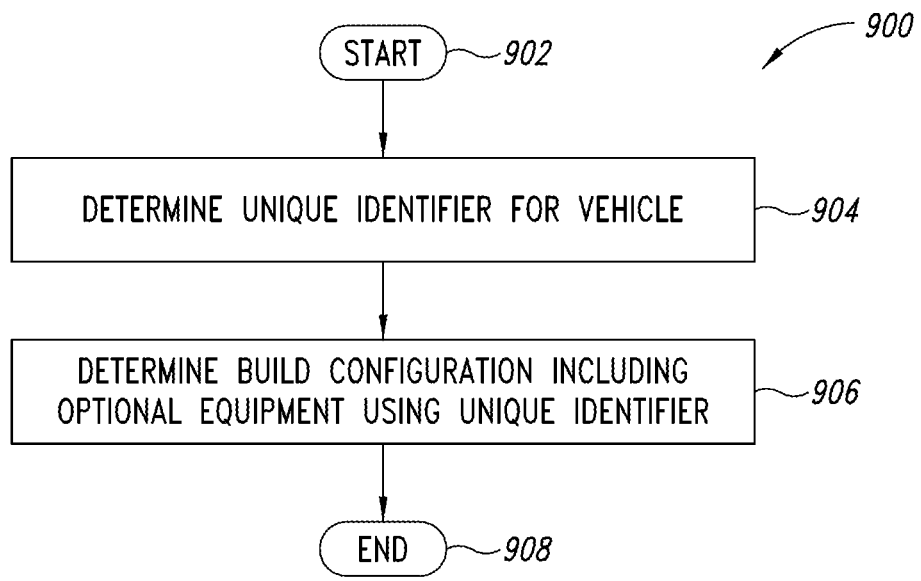
FIG. 9 is a flow diagram of a method of determining a unique identifier associated with a vehicle and determining a build configuration of a vehicle based at least in part on the determined unique vehicle identifier, according to one non-limiting illustrated embodiment.

FIG. 9 shows a logic diagram 900 useful for generating authored assets 122 for an item of manufacture 504 such as a vehicle using a determined build configuration 116 based on an item identifier 162 logically associated with the vehicle. For example, a vehicle manufacturer assigns a vehicle identification number or "VIN" to each vehicle produced. In addition to uniquely identifying a particular vehicle, the VIN provides data indicative of the optional components and/or features 302 included with the particular vehicle. Thus, upon receipt of data indicative of a VIN, the asset authoring and delivery system 104 can look-up or otherwise retrieve the build configuration 116 logically associated with the VIN. The build configuration 116 for a particular vehicle will include a number of component identifiers 152 indicative of the components and/or features 302 included in the vehicle. Using the component identifiers 152, the asset authoring and delivery system 104 can look-up or otherwise retrieve asset content objects 108 logically associated with some or all of the components and/or features 302. The asset authoring and delivery system 104 combines the retrieved asset content objects 108 to generate one or more authored assets 122. The asset authoring and delivery system 104 logically associates the authored assets 122 with the item identifier 162, and communicates some or all of the authored assets 122 to some or all of the remote devices 118 using a compatible format. The method 900 begins at 902.

At 904, the asset authoring and delivery system 104 determines an item identifier 162 that is logically associated with the item of manufacture 504. In some instances, one or more remote devices 118 communicates the item identifier 162 to the asset authoring and delivery system 104 as part of a request for one or more authored assets 122. In some instances, the item of manufacture 504 may communicate the item identifier 162 to the asset authoring and delivery system 104 either directly or indirectly via one or more remote devices 118. In other instances, a user of a remote device may selectively communicate the item identifier 162 to the asset authoring and delivery system 104. Such selective communication of an item identifier by a user may be advantageous when a single user device (e.g., tablet computer, smartphone) is logically associated with more than one item of manufacture 504.

At 906, using the received item identifier 162, the asset authoring and delivery system 104 determines the build configuration 116 of the item 504 logically associated with the item identifier 162. The asset authoring and delivery system 104 can query a build configuration data store or database 184 to look-up or otherwise retrieve the build configuration 116 of the item 504 logically associated with the item identifier 162. Using the build configuration, the asset authoring and delivery system 104 selects the relevant and appropriate asset content objects 108 for inclusion in an authored asset 122 delivered to a remote device 118 logically associated with the supplied item identifier 162. The method 900 concludes at 908.

Figure 10:
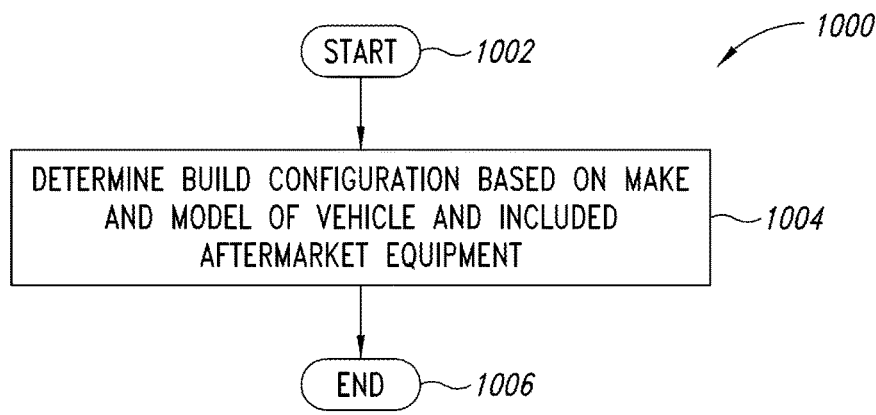
FIG. 10 is a flow diagram of a method of generating an authored asset on a remote device based on the make and model of a vehicle along with any installed aftermarket equipment, according to one non-limiting illustrated embodiment.

FIG. 10 shows a logic diagram 1000 of an example authored asset and delivery system 104 useful for generating authored assets for an item of manufacture 504 based on the make and model of a vehicle as well as aftermarket equipment included with the vehicle. Vehicle owners or operators can install components 302 such as aftermarket equipment after the purchase or delivery of the vehicle. Such aftermarket equipment may, at times, be installed by a dealer, retailer, or distributor affiliated with the manufacturer. In such instances, the dealer, retailer, or distributor may communicate component identifiers 152 corresponding to the installed aftermarket equipment. The manufacturer 502 can logically associate these component identifiers 152 with an item identifier 162 in one or more build configuration data stores or databases 184.

The vehicle owner or vehicle user may install the aftermarket equipment. In some instances, a remote device 118 present on or communicably coupled to the vehicle, such as a smartphone, portable computing device, or vehicle head unit, may detect the aftermarket equipment on the vehicle. In such instances, the remote device 118 can communicate one or more component identifiers 152 including data indicative of the detected aftermarket equipment to the asset authoring and delivery system 104.

At 1004, the asset authoring and delivery system 104 determines the build configuration 116 of a particular vehicle. In at least some instances the build configuration 116 can include component identifiers 152 logically associated with aftermarket equipment included on the vehicle. In at least some implementations, all or a portion of the component identifiers 152 associated with the aftermarket equipment communicated from one or more remote devices 118 logically associated with the vehicle to the asset authoring and delivery system 104. The method 1000 concludes at 1006.

Figure 11:
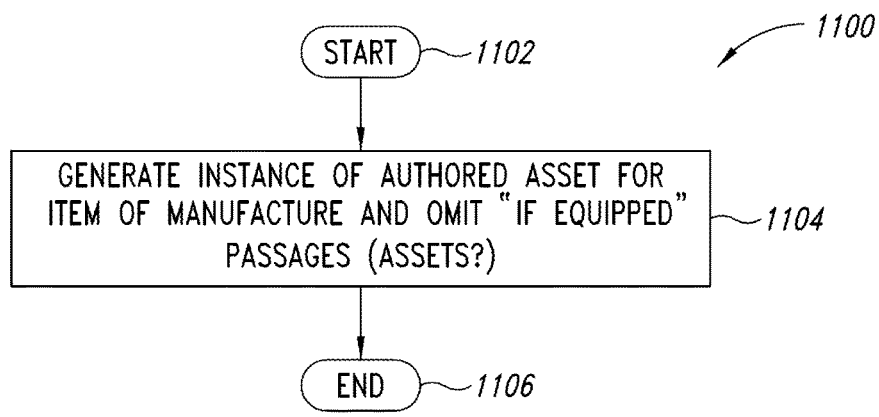
FIG. 11 is a flow diagram of a method of generating an authored asset omitting any "if equipped" passages, according to one non-limiting illustrated embodiment.

FIG. 11 shows a logic diagram 1100 of an example authored asset and delivery system 104 useful for generating a number of authored assets each of which excludes "IF EQUIPPED" or "IF PROVIDED" passages for an item of manufacture 504. As previously discussed, passages for all available optional equipment, regardless of the presence of the optional equipment on the vehicle, were included in traditional printed or published Owner's Guides or Maintenance Manuals. Typically, each of the passages referring to optional equipment were prefaced with a disclaimer such as "IF EQUIPPED" or "IF PRESENT" to distinguish passages related to optional equipment from passages related to standard equipment.

In contrast to the traditional printed or published documentation, the asset authoring and delivery system 104 generates an authored asset 122 based on the components 302 associated with a particular item of manufacture 504. In this regard, each authored asset 122 represents a custom or specialized document generated for and exclusively for a particular item 504. Since authored assets 122 generated by the asset authoring and delivery system 104 contain only asset content objects 108 selected based upon the component identifiers 152 present in a particular item's build configuration 116, optional items not included in a particular build configuration 116 thus will not be present in authored assets 122 generated for the particular item. The method 1100 commences at 1102.

At 1104, the asset authoring and delivery system 104 generates one or more authored assets 122, each of which includes asset content objects 108 logically associated with component identifiers 152 included in the build configuration 116 of the item 504. In such instances, all of the asset content objects 108 included in the one or more authored assets 122 are related to components 302 that are present on or are included in the item 504. Thus, "IF EQUIPPED" passages are rendered unnecessary and are therefore omitted from and do not appear in each authored asset 122. The method 1100 concludes at 1106.

Figure 12:
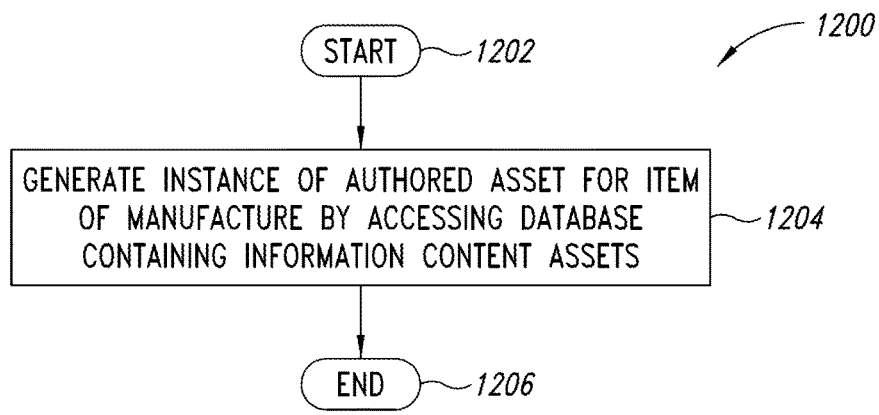
FIG. 12 is a flow diagram of a method of generating an authored asset by the asset authoring and delivery system by accessing one or more asset content object data stores and/or databases, according to one non-limiting illustrated embodiment.

FIG. 12 shows a logic diagram 1200 for an example authored asset and delivery system 104 generating a number of authored assets for an item of manufacture 504 by retrieving a number of asset object content data stores or databases 154. The asset authoring and delivery system 104 receives component information 102 in physical and/or electronic form from suppliers, original equipment manufacturers, and the like. Additionally, the manufacturer 502 may provide information 102 related to the operation and/or maintenance of assembled items of manufacture 504. The information 102 received by the asset authoring and delivery system 104 is edited and formatted to provide electronic asset content objects 108 each of which is logically associable with a particular component 302 and/or item of manufacture 504. The asset authoring and delivery system 104 generates authored assets by collecting those asset content objects logically associated with an item of manufacture 504 and/or some or all of the components 302 included with the item 504. The method 1200 commences at 1202.

At 1204, the asset authoring and delivery system 104 generates one or more authored assets 122 using asset content objects 108 retrieved from one or more asset content object data stores or databases 154. In at least some instances, the authored asset 122 is generated for a particular item of manufacture 504 or a particular class (e.g., make and model) of item of manufacture 504. In at least some instances, the asset authoring and delivery system 104 determines at least some of the components 302 included in the item of manufacture 504 by retrieving or otherwise obtaining a build configuration 116 associated with the item of manufacture 504 from one or more build configuration data stores or databases 184. In other instances, the asset authoring and delivery system 104 receives information indicative of a particular type or class of item of manufacture 504 (e.g., vehicle make and model), using the such type or class information, the asset authoring and delivery system 104 determines at least some of the standard components 302 logically associated with the selected type or class of item 504 from one or more build configuration data stores or databases 184.

In some instances, the one or more asset content object data stores or databases 154 can stored in one or more local nontransitory storage locations 111 communicably coupled to the asset authoring and delivery system 104. In other instances, the one or more asset content object data stores or databases 154 can stored in one or more remote nontransitory storage locations 111 communicably coupled to the asset authoring and delivery system 104 via one or more intervening networks such as one or more local area networks, one or more wide area networks, one or more worldwide networks (i.e., the internet) or combinations thereof.

Using the determined list of components 302, the asset authoring and delivery system 104 retrieves at least some of the asset content objects 108 logically associated with some or all of the components 302 from the one or more asset content object data stores or databases 154. The asset authoring and delivery system 104 assembles the retrieved asset content objects 108 to form the authored asset 122. The method 1200 concludes at 1206.

Figure 13:
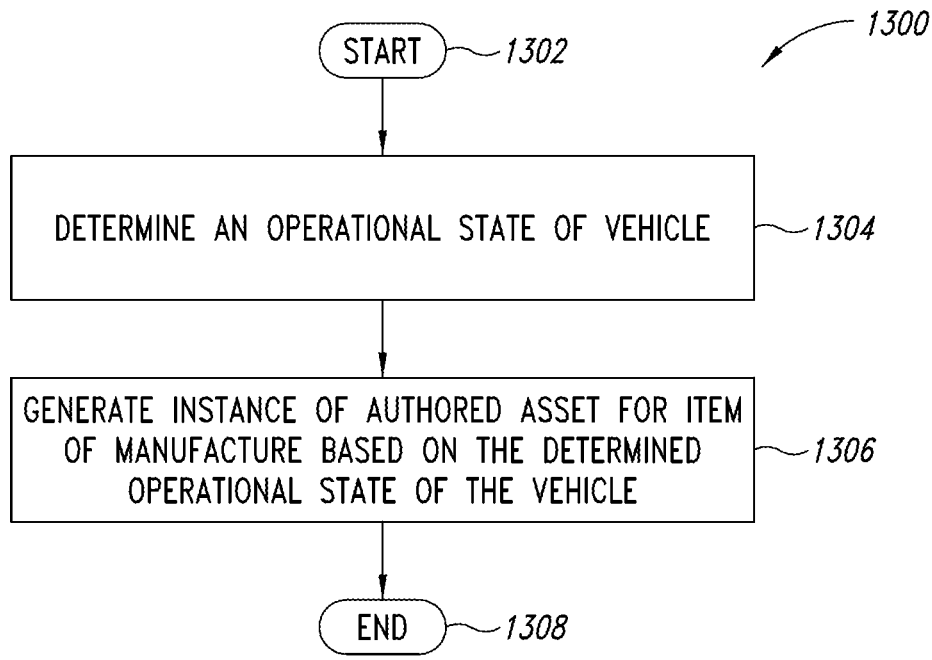
FIG. 13 is a flow diagram of a method of identifying a vehicular operating state and communicating an authored asset based at least in part on the vehicle build configuration and the identified operational state, according to one non-limiting illustrated embodiment.

FIG. 13 shows a logic diagram 1300 for an example authored asset and delivery system 104 that generates a number of authored assets 122 for an item of manufacture 504 by determining the operational state of an item of manufacture 504 and, based at least in part on the determined operational state, retrieving a number of asset object content objects 108 from one or more asset content object data stores or databases 154. In at least some instances, the asset authoring and delivery system 104 receives one or more inputs indicative of one or more item parameters. In some instances, such item parameters may include the operational state of the item 504. Operational states may include whether the item is in an ON state (i.e., active state) or an OFF state (i.e., non-active state). In some instances, the operational state may include one or more active states in which some or all components, devices, systems, and sub-systems are inactive. For example, a vehicle equipped with part-time four-wheel drive capabilities operates in either a first active mode in which four-wheel drive is OFF or a second active mode in which four-wheel drive is ON. In another example, a vehicle equipped with a rear window defogger operates either in a first active mode in which the defogger is ON or a second active mode in which the defogger is OFF. Thus, the operational state of an item may include a simple ON/OFF state determination or a more complex permutation of the operational states of multiple item components, devices, systems, or sub-systems.

In some instances, the item 504 autonomously communicates state information to the asset authoring and delivery system 104 as either a portion of a request for an authored asset 122 or independent of the request for an authored asset 122. In other instances, the item 504 communicates state information to the asset authoring and delivery system 104 upon receipt of a request for such state information. In those instances, either one or more remote devices 118 can generate the request for item state information or the asset authoring and delivery system 104 can generate the request for item state information. The method 1300 commences at 1302.

At 1304, the asset authoring and delivery system 104 receives data representative of state information from the item of manufacture 504. In some instances, based on the received state information, the asset authoring and delivery system 104 determines the operational state of a component and/or feature 302 included in the item of manufacture 504. In other instances, based on the received state information, the asset authoring and delivery system 104 determines the operational state of the item of manufacture 504.

At 1306, based at least in part on the received state information, the asset authoring and delivery system 104 generates an authored asset 122. In at least some implementations, the asset authoring and delivery system 104 can use the received state information to select one or more asset content objects 108 for inclusion in the authored asset 122. For example, a convertible vehicle may require the placement of a hard boot over a lowered convertible top prior to placing the vehicle in gear. If a user has lowered the convertible top but has not installed the hard boot, and requests the Owner's Guide to determine why the vehicle will not move, the asset authoring and delivery system 104 can determine the operational state of the convertible as LOWERED and the operational state of the hard boot as OFF. In such an instance, the asset authoring and delivery system 104 can retrieve those asset content objects 108 related to the operation of the convertible top and generate an authored asset 122 that calls the users attention to the need to install the hard boot before driving the vehicle.

In another example, a researcher may be interested in obtaining information from items of manufacture meeting a certain criteria. For example, a manufacturer 502 may be interested in determining the frequency that a particular combination of components 302 included in a particular class of item of manufacture 504 are placed in defined operating states. The researcher can provide the desired query to the asset authoring and delivery system 104 using one or more input devices (e.g., touchscreen, keyboard, pointer). Responsive to the receipt of the query, the asset authoring and delivery system 104 can poll items 504 falling into the indicated class and return data indicative of the number of items having the indicated combination of component operating states. The authored asset 122 returned in such an instance would include data indicative of the query results as well as the asset content objects 108 logically associated with the particular components 302 and/or items of manufacture 504. The method concludes at 1306.

Figure 14:
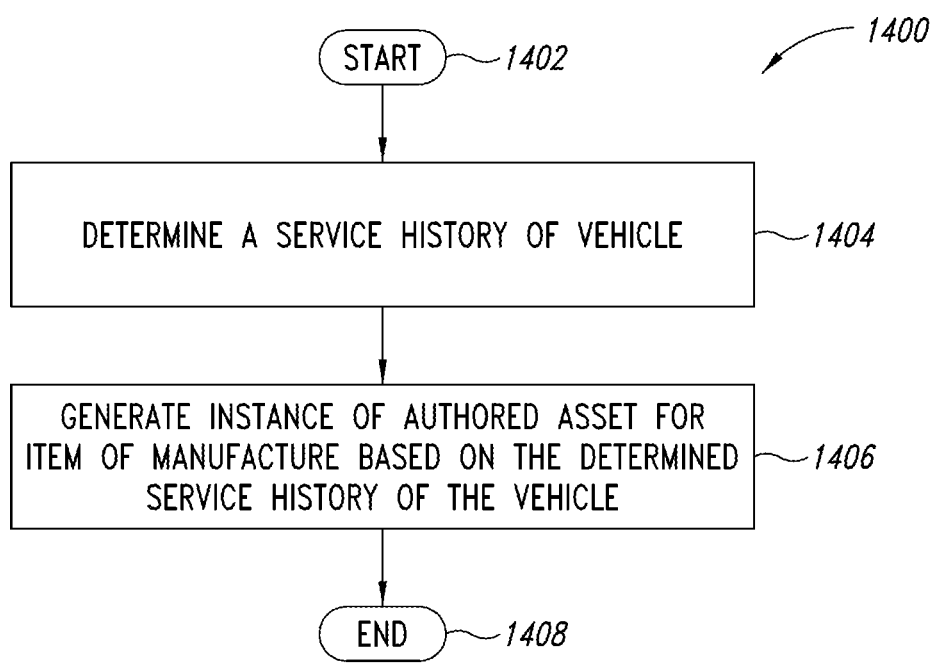
FIG. 14 is a flow diagram of a method of determining a vehicle service history and generating an authored asset based at least in part on the vehicle build configuration and the determined service history, according to one non-limiting illustrated embodiment.

FIG. 14 shows a logic diagram 1400 for an example authored asset and delivery system 104 that generates a number of authored assets for an item of manufacture 504 by determining the service history of an item of manufacture 504 and, based at least in part on the determined service history, retrieving a number of asset object content data stores or databases 154. In at least some instances, the asset authoring and delivery system 104 receives one or more inputs indicative of one or more item parameters. In some instances, the item parameter may include the service history of the item 504. The service history of the item 504 can include data indicative of services, repairs, routine maintenance, and the like performed on the item 504. The service history of the item 504 can include data indicative of various upgrades, updates, patches, performance improvements, and the like performed on the item 504. In at least some instances, data indicative of the services, repairs, routine maintenance, and the like performed on the item 504 are associated with the item identifier 162 and added to one or more data stores or databases communicably coupled to the asset authoring and delivery system 104. Such data stores or databases may include the build configuration database 184 or one or more other data stores or databases that contain data indicative of items of manufacture 504 such as one or more enterprise business systems. The communication of such information to the asset authoring and delivery system 104 advantageously permits the generation of authored assets 122 by the asset authoring and delivery system 104 reflective of the service history of the item. The method 1400 commences at 1402.

At 1404, the asset authoring and delivery system 104 receives data indicative of the service history of an item of manufacture 504. In some instances, the item of manufacture 504 may autonomously provide data indicative of service history information to the asset authoring and delivery system 104. In such instances, the item of manufacture 504 may communicate such data to one or more remote devices 118 for subsequent communication to the asset authoring and delivery system 104. In other instances, the item 504 can communicate some or all of the data indicative of service history information to the asset authoring and delivery system 104. In at least some instances, the asset authoring and delivery system 104 stores the received data indicative of service history of an item 504 in one or more data stores or databases. In at least some instances, the asset authoring and delivery system 104 can logically associate the received data indicative of service history with an item identifier 162 and store the data and associated identifier in one or more local and/or remote data stores or databases.

At 1406, the asset authoring and delivery system 104 generates an authored asset 122 for an item 504 based at least in part on the data indicative of the service history of the item 504. For example, a vehicle owner can request an authored asset 122 including an owner's guide using a remote device 118 such as the vehicle head unit. In responding to the request the asset authoring and delivery system 104 may determine the vehicle has outstanding service due or has unresolved recall issues. Thus, in addition to generating and communicating the requested authored asset 122 to the head unit, the asset authoring and delivery system 104 can generate and communicate an authored asset 122 that includes one or more asset content objects 108 containing information on the overdue service. Such asset content objects 108 may include information on the required service work, the estimated time required to complete the work, the urgency of the work, and a description of potential consequences if the work is not completed. Furthermore, the asset authoring and delivery system 104 can generate and communicate an authored asset 122 that includes asset content objects 108 containing information on the outstanding recall issues. Such asset content objects 108 may include information on the recall, the estimated time required to complete the recall service, the urgency of the recall service, and a description of potential consequences if the recall service work is not completed.

In another example, a researcher may be interested in obtaining information from items of manufacture regarding the service history of the item 504. For example, a manufacturer 502 may be interested in determining the frequency that a particular service procedure on a particular component 302 (e.g., Li-ion battery maintenance) is performed in a particular class of item of manufacture 504. The researcher can provide the desired query to the asset authoring and delivery system 104 using one or more input devices (e.g., touchscreen, keyboard, pointer). Responsive to the receipt of the query, the asset authoring and delivery system 104 can poll items 504 falling into the indicated class and return data indicative of the service history related to the specified component 302. The authored asset 122 returned in such an instance would include data indicative of the query results as well as the asset content objects 108 logically associated with the particular components 302 and/or items of manufacture 504. The method 1400 concludes at 1406.

Figure 15:
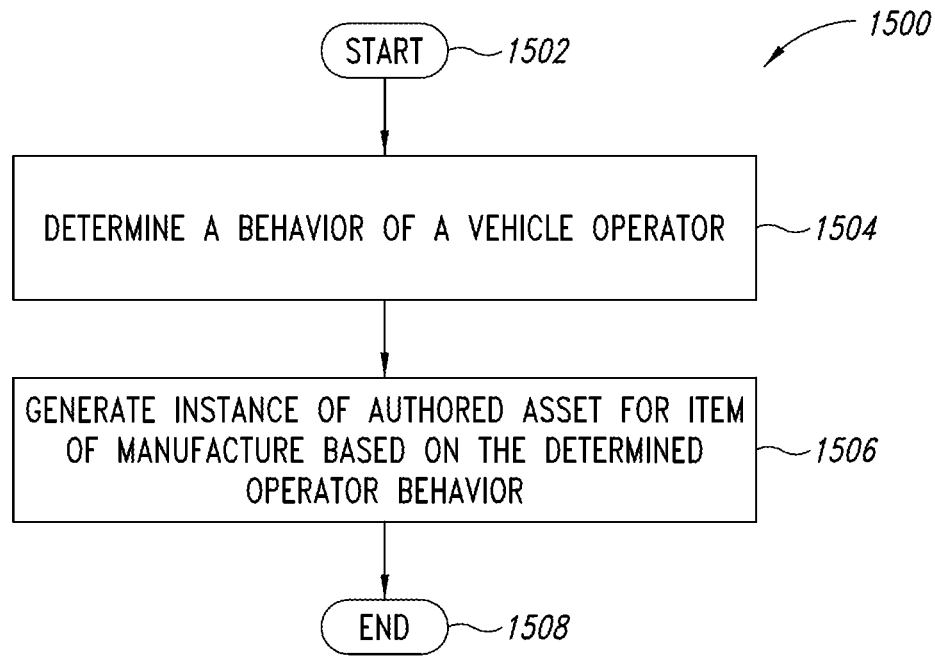
FIG. 15 is a flow diagram of a method of determining vehicle operator behavior and generating an authored asset based at least in part on the vehicle build configuration and the determined vehicle operator behavior, according to one non-limiting illustrated embodiment.

FIG. 15 shows a logic diagram 1500 for an example authored asset and delivery system 104 that generates a number of authored assets for an item of manufacture 504 by determining the behavior of a user of an item of manufacture 504 and, based at least in part on the determined user behavior, retrieving a number of asset object content data stores or databases 154. In at least some instances, the asset authoring and delivery system 104 receives one or more inputs indicative of one or more item parameters. In some instances, the item parameter may include data indicative of the behavior of the user of the item 504. The user behavior can include data indicative time of use of the item, conditions of use of the item, one or more item parameters during use, or the like. In at least some instances, data indicative of the behavior of the user of the item 504 are associated with the item identifier 162 and added to one or more data stores or databases communicably coupled to the asset authoring and delivery system 104. Such data stores or databases may include the build configuration database 184 or one or more other data stores or databases that retain data indicative of items of manufacture 504 such as one or more enterprise business systems. The communication of such information to the asset authoring and delivery system 104 advantageously permits the generation of authored assets 122 by the asset authoring and delivery system 104 reflective of the user's behavior while using the item 504. The method 1500 commences at 1502.

At 1504, the asset authoring and delivery system 104 receives data indicative of the behavior of the user of the item of manufacture 504. In some instances, the item of manufacture 504 may autonomously provide data indicative of such user behavior to the asset authoring and delivery system 104. In such instances the item of manufacture 504 may communicate such data to one or more remote devices 118 for subsequent communication to the asset authoring and delivery system 104. In other instances, the item 504 communicates some or all of the data indicative of the behavior of the user of the item 504 to the asset authoring and delivery system 104. In at least some instances, the asset authoring and delivery system 104 stores the received data indicative of the behavior of the user of the item 504 in one or more data stores or databases. In at least some instances, the asset authoring and delivery system 104 can logically associate the received data indicative of the behavior of the user of the item 504 with an item identifier 162 logically associated with the item 504 and store the data and associated identifier in one or more local and/or remote data stores or databases. For example, the vehicle may log data indicative of speed, throttle position, braking, and lateral acceleration among other dynamic variables influenced by user (i.e., driver) behavior. In at least some implementations, all or a portion of the data indicative of the behavior of the user of the item 504 may be stored and/or redundantly stored in one or more local nontransitory storage devices (i.e., one or more "black boxes") communicably coupled to the item 504. In some instances, all or a portion of the data indicative of user behavior may be provided by one or more devices communicably coupled to one or more remote devices 118.

For example, Bluetooth® or near field communication ("NFC") may communicably couple a remote data collection and/or acquisition unit such as an accelerometer to a remote device 118 such as a vehicle head unit. In other instances, one or more sensors or data collection and/or acquisition devices in a remote device 118 (e.g., an accelerometer in a smart phone logically associated with the item) may provide all or a portion of the data.

At 1506, the asset authoring and delivery system 104 generates an authored asset for an item based at least in part on the data indicative of the behavior of the user of the item 504 and the build configuration 116 of the item 504. For example, a vehicle owner can request an authored asset 122 including an Owner's Guide using a remote device 118 such as the vehicle head unit. In responding to the request the asset authoring and delivery system 104 may retrieve data indicative of the behavior of the user of the item 504 indicative of frequent full-throttle (i.e., "jack rabbit") starts by the user. Thus, in addition to generating and communicating the requested authored asset 122 to the head unit, the asset authoring and delivery system 104 can generate and communicate an authored asset 122 that includes information on the full-throttle starts. Such an authored asset may include information on the impact of such starts on vehicle service life, the impact of such starts on fuel economy, the impact of such costs on vehicle maintenance, etc. In another example, a driver may routinely ignore an illuminated BATTERY indicator. In responding to the request the asset authoring and delivery system 104 may retrieve data indicative of the behavior of the user of the item 504 indicative of the ignored BATTERY indicator. Thus, in addition to generating and communicating the requested authored asset 122 to the head unit, the asset authoring and delivery system 104 can generate and communicate an authored asset 122 that includes information on the reason the BATTERY indicator is illuminated and the possible consequences of ignoring the indicator for an extended period.

In another example, a researcher may be interested in obtaining information from items of manufacture regarding the real-world usage of the item. For example, a manufacturer 502 may be interested in determining the frequency that a particular make and model of vehicle (i.e., a particular item) is driven at high levels of lateral acceleration. The researcher can provide the desired query to the asset authoring and delivery system 104 using one or more input devices (e.g., touchscreen, keyboard, pointer). Responsive to the receipt of the query, the asset authoring and delivery system 104 can poll vehicles 504 falling into the indicated item class and return data indicative of the driver behavior, in particular data indicative of the frequency and/or duration of high lateral acceleration of the vehicle, to the asset authoring and delivery system 104. The authored asset 122 returned in such an instance may include asset content objects 108 logically associated with the particular components 302 and/or items of manufacture 504 as well as data indicative of the query results. The method 1500 concludes at 1508.

Figure 16:
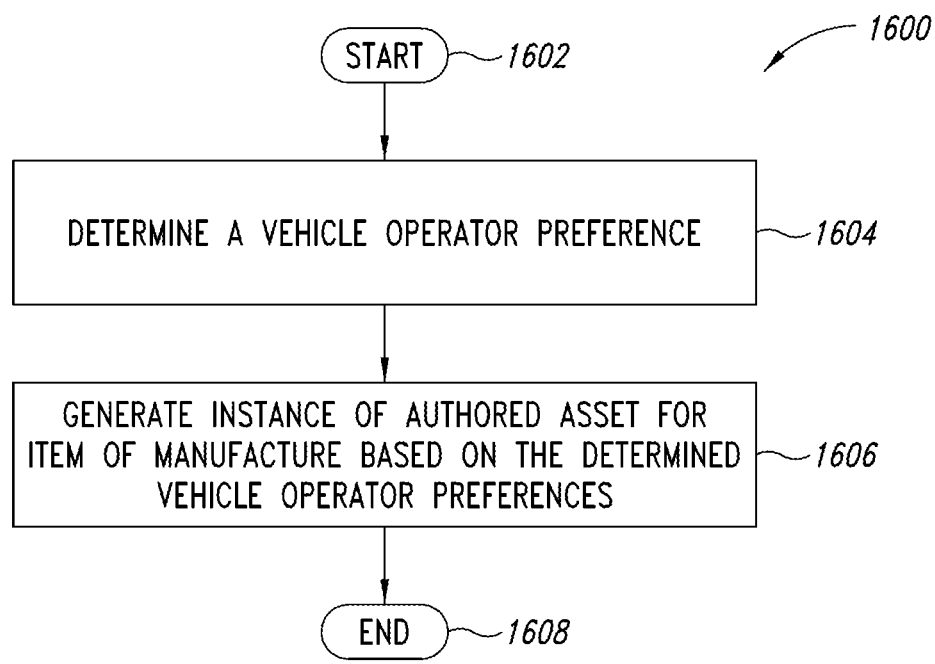
FIG. 16 is a flow diagram of a method of determining vehicle operator preferences and generating an authored asset based at least in part on the vehicle build configuration and the determined vehicle operator preferences, according to one non-limiting illustrated embodiment.

FIG. 16 shows a logic diagram 1600 for an example authored asset and delivery system 104 that generates a number of authored assets for an item of manufacture 504 by determining the user preferences associated with the item of manufacture 504 and, based at least in part on the determined user preferences, retrieving a number of asset object content data stores or databases 154. In at least some instances, the asset authoring and delivery system 104 receives one or more inputs indicative of one or more user preferences. The user preference data can include data indicative the type of asset content objects 108 included in the authored asset 122, the level of detail in the asset content objects 108 included in the authored asset 122, the format of the asset content objects 108 included in the authored asset 122, the remote devices to receive the asset content objects 108 included in the authored asset 122, combinations thereof, and the like. The method 1600 commences at 1602.

At 1604, the asset authoring and delivery system 104 receives data indicative of the preferences of the user of the item of manufacture 504. In some instances, the item of manufacture 504 may autonomously provide data indicative of such user preferences to the asset authoring and delivery system 104. In such instances the item of manufacture 504 may communicate such data to one or more remote devices 118 for subsequent communication to the asset authoring and delivery system 104. In other instances, the item 504 communicates some or all of the data indicative of user preferences to the asset authoring and delivery system 104. In at least some instances, the asset authoring and delivery system 104 stores the received data indicative of the received user preferences in one or more data stores or databases. In at least some instances, the asset authoring and delivery system 104 can logically associate the received data indicative user preferences with an item identifier 162 logically associated with each of one or more items 504 and store the data and associated identifier in one or more local and/or remote data stores or databases. For example, the vehicle head unit may log data indicative of a user's preference for text only authored assets 122 delivered to a smartphone remote device 118e.

At 1606, the asset authoring and delivery system 104 generates an authored asset for an item 504 based at least in part on the received data indicative of the user preferences and the build configuration 116 of the item 504. The method 1600 concludes at 1608.

Figure 17:
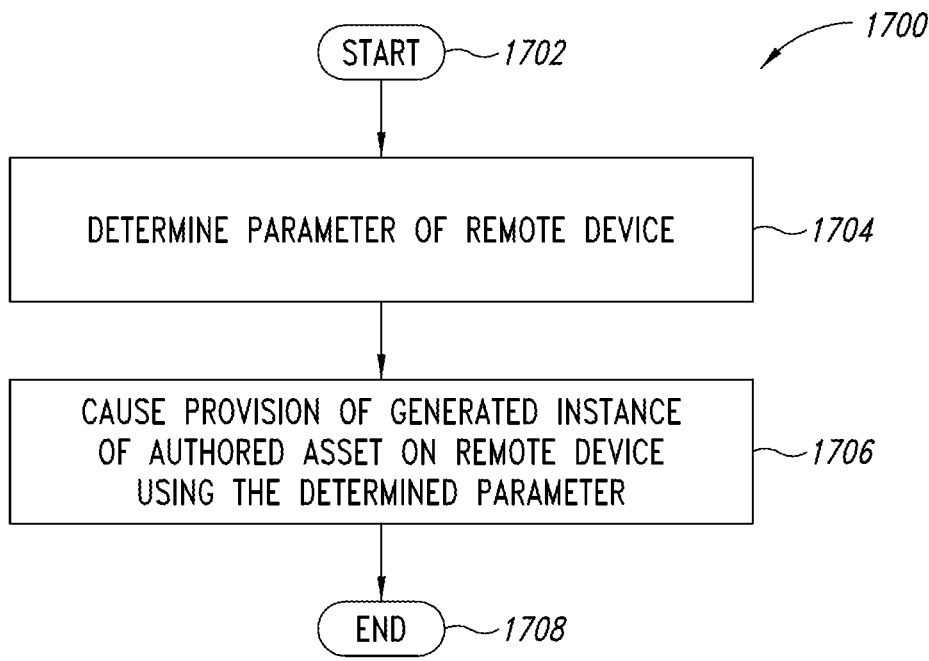
FIG. 17 is a flow diagram of a method of determining one or more remote device parameters and generating an authored asset based at least in part on the vehicle build configuration and the determined remote device parameters, according to one non-limiting illustrated embodiment.

FIG. 17 shows a logic diagram 1700 for an example authored asset and delivery system 104 that generates a number of authored assets for an item of manufacture 504 and determines one or more remote device parameters prior to communicating the authored asset 122 to the remote device 118. In at least some instances, the asset authoring and delivery system 104 receives one or more inputs indicative of one or more remote device parameters. The data indicative of one or more remote device parameters can include data indicative the computational resources available on the remote device 118, one or more audio output capability parameters (e.g., mono or stereo output) of the remote device 118, one or more video output capability parameters (e.g., screen resolution, screen type) of the remote device 118, the nontransitory storage capacity of the remote device 118, the social networking parameters of the user of the remote device 118, combinations thereof and the like. Based on one or more determined remote device parameters the asset authoring and delivery system 104 can generate one or more authored assets 122 and format the one or more authored assets 122 for delivery on the one or more remote devices 118 for which parametric data was determined. The method 1700 commences at 1702.

At 1704, the asset authoring and delivery system 104 receives data indicative of one or more parameters of one or more remote devices 118. In some instances, the item of manufacture 504 may autonomously provide data indicative of such remote device parameters to the asset authoring and delivery system 104. In such instances, the item of manufacture 504 may communicate such data to one or more remote devices 118 for subsequent communication to the asset authoring and delivery system 104. In other instances, the item 504 communicates some or all of the data indicative of remote device parameters directly to the asset authoring and delivery system 104. In yet other instances, the remote device 118 communicates one or more parameters to the asset authoring and delivery system 104. For example, the remote device 118 may communicate data in the form of metadata or similar along with one or more requests for an authored asset 122.

In at least some instances, the asset authoring and delivery system 104 stores the received data indicative of the remote device parameters in one or more data stores or databases. In at least some instances, the asset authoring and delivery system 104 can logically associate the received data indicative remote device parameters with an item identifier 162 and/or a remote device identifier that is logically associated with each of one or more items 504 and store the data and associated item identifier 162 in one or more local and/or remote data stores or databases. For example, the vehicle head unit may log data indicative of a user's remote device parameters.

At 1706, the asset authoring and delivery system 104 generates an authored asset 122 for an item 504 based at least in part on the build configuration 116 of the item 504. The asset authoring and delivery system 104 formats the generated authored asset 122 using the one or more remote device parameters and communicates the formatted authored asset 122 to the remote device 118. By formatting the authored asset 122 for the remote device 118, the asset authoring and delivery system 104 unloads at least a portion of the computational resource requirements placed upon the remote device 118. The method 1700 concludes at 1708.

Figure 18:
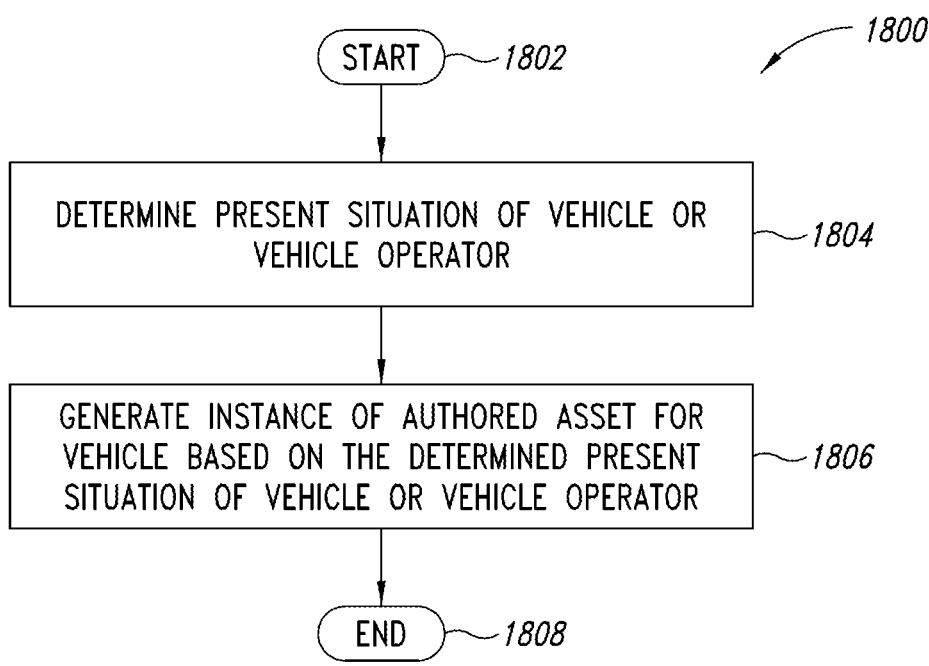
FIG. 18 is a flow diagram of a method of determining a present situation of a vehicle and/or vehicle operator and generating an authored asset based at least in part on the vehicle build configuration and the determined situation of the vehicle and/or vehicle operator, according to one non-limiting illustrated embodiment.

FIG. 18 shows a logic diagram 1800 for an example authored asset and delivery system 104 that generates a number of authored assets for an item of manufacture 504 after determining at least one of: a present situation of the item 504 or a present situation of a user of the item 504. In at least some instances, the asset authoring and delivery system 104 receives one or more inputs indicative of the present situation of the item 504 and/or the present situation of the user of the item 504. Data indicative of the situation of the item 504 can include: data representative of one or more operational aspects of the item 504, data representative of the operational status of one or more components 302, devices, systems, or sub-systems; data representative of the error state or error status of one or more components 302, devices, systems, or sub-systems; data indicative of a software or firmware version, update, upgrade, and/or patch; and the like. Data indicative of the situation of the user of the item 504 can include: data representative of the location of the user; data representative of the location of the user with respect to the item 504; data representative of a physical condition of the user; data representative of the mental or emotional state of the user; data representative of the location of the user with regard to users of other items 504; and the like.

Based on at least one of the determined situation of the item 504 and/or the determined situation of the user of the item 504, the asset authoring and delivery system 104 can generate one or more authored assets 122 reflective of the situational context of the item 504 and/or the user of the item 504 for delivery to the one or more remote devices 118. The method 1800 commences at 1802.

At 1804, the asset authoring and delivery system 104 receives data indicative of at least one of the present situation of the item 504 and the present situation of the user of the item 504. In some instances, the item of manufacture 504 may autonomously provide data indicative of the present situation of the item 504 and/or the user of the item to the asset authoring and delivery system 104. The asset authoring and delivery system 104 can use the data indicative of the present situation of the item 504 and/or present situation of the user of the item 504 to generate one or more authored assets 122 that include asset content objects 108 relevant to the determined situational context. In at least some instances, the situational context of the item and/or user of the item may advantageously provide insight into the most relevant asset content objects.

In at least some instances, the asset authoring and delivery system 104 may implement one or more machine learning algorithms to improve the selection accuracy of relevant asset content objects 108 based on the present situation of the item 504 and/or the present situation of the user of the item 504. In at least some instances, crowd-sourced information including historical situational context data for the same or similar items of manufacture 504 provided by the same or different manufacturers 502 may be provided to the asset authoring and delivery system 104 as machine learning training examples.

At 1806, the asset authoring and delivery system 104 generates an authored asset for an item 504 based at least in part on the build configuration 116 of the item 504 and based at least in part on the present situation of the item 504 and/or the present situation of the user of the item 504.

For example, if a user of a vehicle requests an authored asset such as an Owner's Guide, the asset authoring and delivery system 104 may generate a query to obtain information indicative of the present situation of the vehicle and the user. The asset authoring and delivery system 104 may determine the present situation of the vehicle is: LF TIRE PRESSURE=0 psi; ENGINE=ON; SPEED=0 MPH; and a geolocation corresponding to a rural highway in Kansas. The asset authoring and delivery system 104 may further determine the location of the user is OUTSIDE of the vehicle and the remote device 118 is a SMARTPHONE. In response to the request for delivery of an authored asset 122, the asset authoring and delivery system 104 may determine the user is outside of the vehicle and in the process of changing the flat left front tire. Thus, the asset authoring and delivery system 104 may generate an authored asset 122 that includes asset content objects relevant to changing the tire on the vehicle. The method 1800 concludes at 1808.

Figure 19:
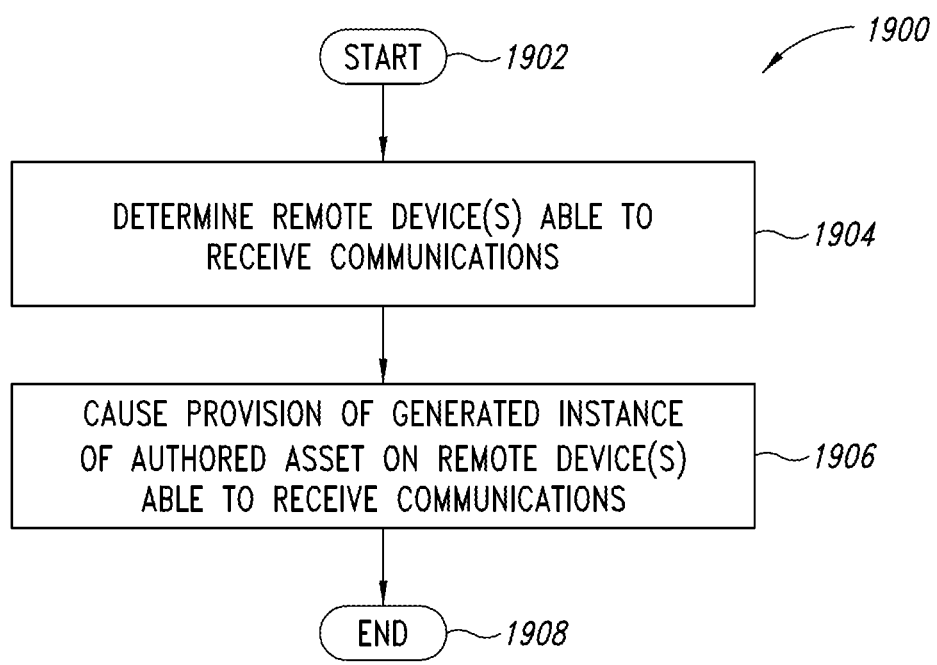
FIG. 19 is a flow diagram of a method of determining one or more remote devices able to receive communications and generating an authored asset on a remote device based on the determined remote device able to receive communications, according to one non-limiting illustrated embodiment.

FIG. 19 shows a logic diagram 1900 for an example authored asset and delivery system 104 that generates a number of authored assets 122 for an item of manufacture 504, determines the remote devices able to receive communications and communicates the number of authored assets 122 to one or more of the remote devices 118 able to receive communications. In at least some instances, the asset authoring and delivery system 104 receives one or more inputs indicative of one or more remote devices 118 able to receive communications from the asset authoring and delivery system 104. Any number of remote devices 118 may be logically associated with a particular item of manufacture 504. Additionally, any number of items of manufacture 504 may be logically associated with a particular remote device 118. At any given time, one or more remote devices 118 logically associated with a particular item of manufacture 504 may be powered OFF, in a remote location unable to receive communications, or selected by a user as not receptive to communications from the asset authoring and delivery system 104. In at least some instances, a user of a remote device 118 may communicate to the asset authoring and delivery system 104 data indicative of preferred remote devices 118 for receipt of authored assets 122.

In some instances, the asset authoring and delivery system 104 can autonomously determine the status of each of the remote devices 118 logically associated with a particular item 504. In other instances, the asset authoring and delivery system 104 can poll, "ping," or otherwise determine the status of all or a portion of the remote devices 118 logically associated with an item of manufacture 504. Based on the remote devices able to receive communications, the asset authoring and delivery system 104 can generate one or more authored assets 122 for delivery to the one or more remote devices 118. The method 1900 commences at 1902.

At 1904, the asset authoring and delivery system 104 receives data indicative of at any number of remote devices logically associated with a particular item of manufacture 504 that are able to receive authored assets 122. In some instances, some or all of the remote devices 118 may autonomously provide data indicative of those remote devices 118 able to receive authored assets from the asset authoring and delivery system 104. The asset authoring and delivery system 104 can use the data indicative of those remote devices able to receive authored assets 122 to generate the one or more authored assets 122 and format the generated authored assets 122 for consumption by a user on a remote device 118.

At 1906, the asset authoring and delivery system 104 generates an authored asset for an item 504 based at least in part on the build configuration 116 of the item 504. The asset authoring and delivery system 104 then communicates the generated authored assets 122 to some or all of the remote devices able to receive communications. The method 1900 concludes at 1908.

Figure 20:
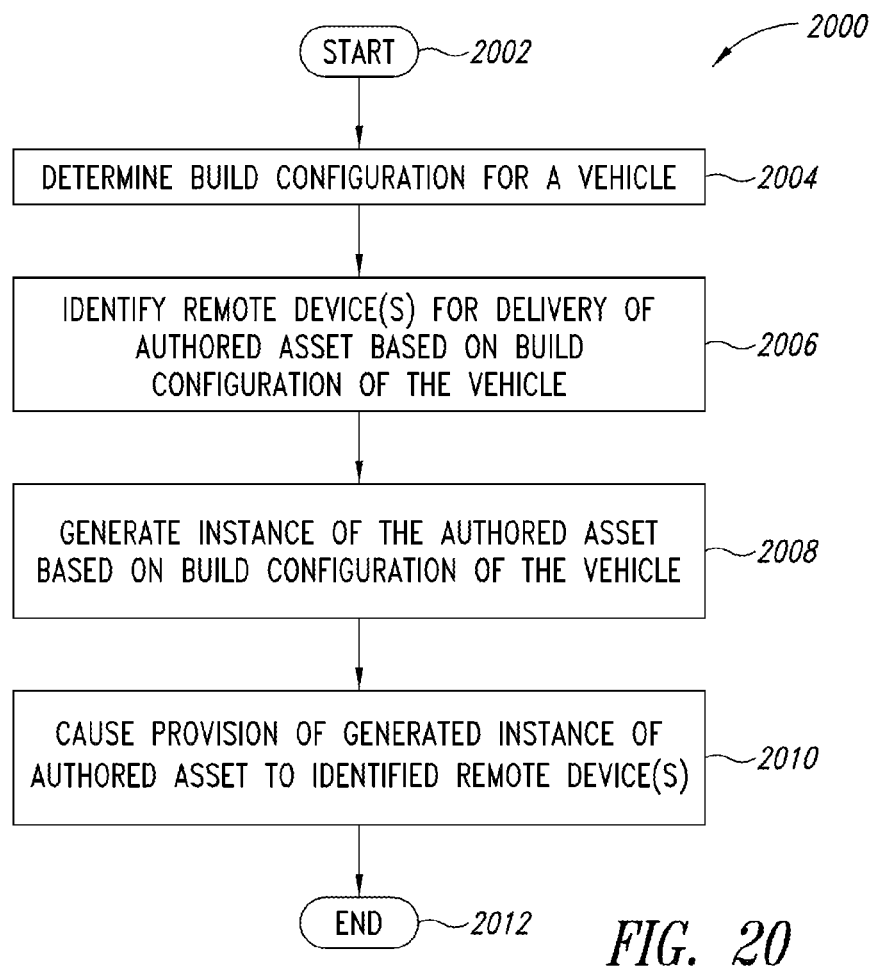
FIG. 20 is a high-level flow diagram of a method of identifying remote devices for delivery of an authored asset and generating the authored asset on one or more identified remote devices based on a build configuration of a vehicle, according to one non-limiting illustrated embodiment.

FIG. 20 shows a high level logic diagram 2000 for an example authored asset and delivery system such as the system 104 depicted in FIG. 1 for generating authored assets 122 for an item of manufacture 504 based on a determined build configuration 116 of the item 504. Modern manufacturing techniques typically include a manufacturer 502 receiving a number of components 302, devices, systems and sub-systems from one or more sources, suppliers, distributors, and/or original equipment manufacturers (OEMs). The manufacturer 502 then assembles each item of manufacture 504 using some or all of these components 302. Each item of manufacture 504 has a specific build configuration 116 that identifies components, features, devices, systems and sub-systems used in the manufacture of the item 504. Thus, each item of manufacture 504, while similar, may be considered an assembly of components selected based on the build configuration 116 associated with the item 504. Such build configurations 116 may be selected based on manufacturer requirements; customer requirements; legal requirements such as safety, energy efficiency, and/or emissions requirements; community standards; or combinations thereof.

In some instances, the number of available optional or alternative components 302 leads to a large number of possible permutations and a large number of different possible build configurations. Printed product documentation offered by manufacturers typically includes all available options such that a single owner's guide or a single maintenance manual would cover all possible build configurations of a specific make and/or model of an item. Passages regarding optional or alternative components is often preceded with the disclaimer "IF EQUIPPED" or "IF PRESENT." While such comprehensive guides and manuals permit a manufacturer to streamline by enabling the use of a single guide or manual for all of a particular class, make, and/or model of an item, such guides or manuals are often confusing and difficult to use for users and maintainers of the item 504. A manufacturer 502 creates such printed publications by editing and combining information provided by each component supplier into a cogent narrative that covers both the operation and maintenance of the components as well as the operation and maintenance of some or all operably connected components 302 included in the item of manufacture 504.

As described by various embodiments contained herein, the one or more sources, suppliers, distributors, and/or original equipment manufacturers (OEMs) supply component information in a number of formats, including printed publications and electronic documents. Printed publications can include text documents, images, drawings, sketches, diagrams, flowcharts, tables, graphs, and the like. Electronic documents typically include machine readable files (e.g., computer files) containing documents, images, drawings, sketches, diagrams, flowcharts, tables, and graphs, as well as video presentations, audio presentations, A/V presentations, animations, interactive content, and the like. In addition, parties other than suppliers, distributors, and/or original equipment manufacturers (OEMs) can provide electronic files relevant to components and/or items of manufacture. For example, individuals such as users or maintainers of various components or items of manufacture may generate and post electronic documents to bulletin boards, chat groups, social networking sites, or content presentation sites such as YouTube®.

As described in detail herein, an asset authoring and delivery system 104, using this wealth of available printed and electronic information 102, can advantageously generate electronic asset content objects 108 that include edited and formatted data representative of printed and electronic publications logically associated with a particular component 302, components 302a-302n, and/or an item of manufacture 504. As generated by the asset authoring and delivery system 104, each asset content object contains information edited to focus on a particular operational or maintenance aspect of a component 302, components 302a-302n, and/or an item of manufacture 504. The asset authoring and delivery system 104 advantageously combines these asset content objects 108 using the build configuration associated with a particular item 504. Thus, the manufacturer is able to combined asset content objects 108 according to logical rules to generate authored assets 122 such as "custom" sets of user guides and manuals tailored to an individual item of manufacture 504. The asset authoring and delivery system 104 can dynamically create and deliver such asset content objects 122 to one or more remote devices 118 autonomously (e.g., on a defined, regular, periodic, or intermittent basis) or upon receipt of a request from one or more remote devices 118.

In some instances, the asset authoring and delivery system 104 can autonomously generate and deliver authored assets 122 such as "custom" sets of Owner's Guides and Maintenance Manuals tailored to an individual item of manufacture 504 to remote devices 118 for local storage. Such an arrangement advantageously eliminates the need for a "live" connection to the asset authoring and delivery system 104 to receive the authored asset 122. Such an arrangement also permits the manufacturer 502 to periodically or intermittently issue updates, patches, upgrades, and the like to the locally stored authored assets 122. Thus, the time and expense of providing up-to-date authored assets 122 in the form of owner's guides and maintenance manuals is significantly reduced and the reliability of information contained therein increased.

One or more remote devices 118 can be logically associated with each item of manufacture 504. One or more items of manufacture 504 can be logically associated with a single remote device 118. In some implementations, an owner and/or user of the item of manufacture 504 logically associates the one or more remote devices with a particular item 504. In other implementations, asset authoring and delivery system 104 forms the logical association between a particular remote device 118 and a particular item of manufacture 504 (e.g., a head unit in a vehicle). In at least some implementations, a remote device 118 can communicate or otherwise forward all or a portion of the authored asset to another device, for example a device logically associated with the recipient remote device 118 through one or more relationships external to the asset authoring and delivery system 104 (e.g., a Facebook "friend"). The asset authoring and delivery system 104 can store data indicative of the logical association between a particular item of manufacture 504 and one or more remote devices 118 in one or more communicably coupled data stores or data bases. The method of generating authored assets 122 using asset content objects 108 commences at 2002.

At 2004, the asset authoring and delivery system 104 determines the build configuration 116 logically associated with a particular item of manufacture 504. The build configuration 116 includes data indicative of some or all of the components 302 included in an item of manufacture 504. In at least some implementations, an item identifier 162, such as a model number, serial number, model/serial number, vehicle identification number, etc., is logically associated an item of manufacture 504. In one or more build configuration data stores or databases 118, the item identifier 162 is logically associated with any number of component identifiers 152a-152n logically associated with a corresponding number of components 302a-302n included in the item of manufacture 504.

In at least some instances, the asset authoring and delivery system 104 can receive an item identifier 162 logically associated with a particular item of manufacture 504. Using the received item identifier 162, the asset authoring and delivery system 104 can retrieve or otherwise obtain the build configuration 116 for an item 504 from one or more build configuration data stores or databases 184. In at least some instances, the asset authoring and delivery system 104 can retrieve or otherwise obtain the build configuration 116 corresponding to a particular item identifier 162 using the item identifier 162 as an index to search the one or more build configuration data stores or databases 184. The one or more build configuration data stores or databases 184 contain data indicative of build configurations for some or all of the items of manufacture 504 produced by the manufacturer 502. For example, an enterprise business system, inventory management system, or supply chain management system may include one or more build configuration data stores or databases 184, each containing build configurations 116 indexed by item identifiers 162. Each of such build configurations 116 can include component identifiers 152a-152n logically associated with corresponding components 302a-302n included in the item of manufacture 504. The build configuration 116 for a particular item of manufacture 504 may include one or more manufacturer supplied components 302a-302n, one or more dealer/retailer/distributor supplied components 302a-302n, one or more aftermarket supplied components 302a-302n, or combinations thereof.

At 2006, the asset authoring and delivery system 104 identifies one or more remote devices 118 for delivery of one or more authored assets 122 related to an item of manufacture 504 such as a vehicle. In at least some instances, the asset authoring and delivery system 104 identifies one or more remote devices 118 using a list of preferred remote devices previously provided to the asset authoring and delivery system 104 by a user such as a vehicle owner or vehicle operator. For example, a parent (vehicle owner) of a teenage driver (vehicle operator) may provide data indicative of a preferred delivery of authored assets 122 to a portable computer such as a tablet computer carried by the parent as well as to a head unit in the vehicle.

In other instances, the asset authoring and delivery system 104 identifies one or more remote devices 118 based on the availability of a particular remote device 116 to receive one or more authored assets 122. For example, responsive to determining a first remote device 118 (e.g., a tablet computer) is in an OFF operational state and unable to receive an authored asset 122, the asset authoring and delivery system 104 can communicate the authored asset to a second remote device (e.g., a vehicle head unit).

At 2008, the asset authoring and delivery system 104 generates one or more authored assets 122 based on the retrieved build configuration 116. In at least some instances, each component identifier 152 is logically associated with a number of asset content objects 108. As previously discussed, each asset content object 108 can include information related to the particular component, feature, device, system, or sub-system and obtained from any number of sources. In at least some instances, the asset authoring and delivery system 104 includes one or more asset content object data stores or databases 154. In at least some instances, the asset authoring and delivery system 104 can retrieve or otherwise obtain the asset content objects 108 corresponding to a particular component identifier 152. The asset authoring and delivery system 104 may retrieve such asset content objects 108 using the component identifier 152 as an index to search the one or more asset content object data stores or databases 154. For example, an enterprise business system, inventory management system, or supply chain management system may include one or more asset content object data stores or databases 154, indexed by component identifiers 152 and containing a number of asset content objects 108a-108n logically associated with each of the component identifiers 152.

The asset authoring and delivery system 104 can retrieve some or all of the asset content objects 108a-108n logically associated with some or all of the component identifiers 152a-152n logically associated with a particular item identifier 162. The asset authoring and delivery system 104 can generate one or more authored assets 122 by combining, joining, or otherwise merging and formatting the retrieved asset content objects 108a-108n logically associated with some or all of the component identifiers 152a-152n corresponding to one or more components 302 included in the item 504.

At 2010, the asset authoring and delivery system 104 communicates the generated authored asset 122 to one or more recipient remote devices 108 identified at 2006. The determined recipient remote device 108 then generates an instance of the authored asset 122 using the data communicated by the asset authoring and delivery system 104. Remote devices 108 can include display devices included with the item of manufacture (e.g., an LCD display on a washing machine or a vehicular head unit) 118a, personal computers with high resolution displays 118b, wearable computers such as Google Glass® 118c, portable computers such as tablet form factor computers 118d, and portable electronic devices such as smartphones and personal digital assistants 118e. The presentation and display capabilities thus vary from one remote device 118 to another. In at least some implementations, the asset authoring and delivery system 104 can format the authored asset 122 for presentation on one or more particular remote devices 118. For example, the asset authoring and delivery system 104 may provide a content rich authored asset 118 to a remote device having significant computational resources such as a personal computer or vehicular head unit. Conversely, the asset authoring and delivery system 104 may provide a content lean authored asset 118 to a remote device having more limited computational resources such as a smartphone, wearable computer, or personal digital assistant. The method 2000 concludes at 2012.

Figure 21:
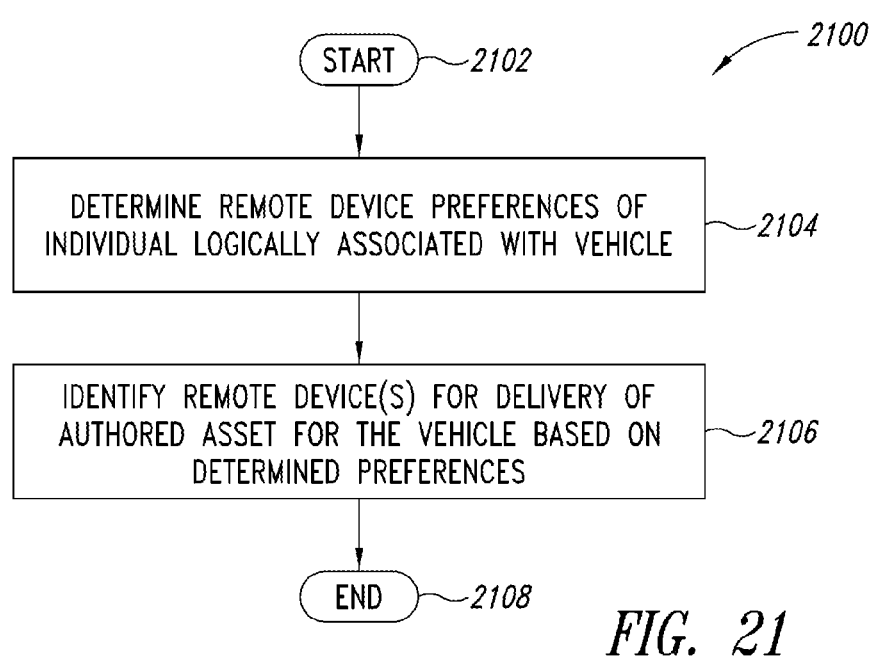
FIG. 21 is a flow diagram of a method of determining remote device preferences for an individual logically associated with the vehicle and identifying remote devices for delivery of an authored asset based at least in part on the determined preferences, according to one non-limiting illustrated embodiment.

FIG. 21 shows a logic diagram 2100 for an example authored asset and delivery system 104 that generates a number of authored assets 122 for an item of manufacture 504, determines an individual's remote device preferences, and identifies remote devices 118 to receive the one or more authored assets 122. A user may logically associate multiple remote devices 118 with a particular item of manufacture 504.

For example, a user may associate remote devices 118a-118c corresponding to a smartphone, a portable computer, and a head unit with an item of manufacture 504 such as a motor vehicle. The user may provide data indicative of personal delivery preferences to the asset authoring and delivery system 104 via a user interface such as an interface program executed by the portable computer or an application (i.e., "app") executed on the smartphone. Such personal delivery preferences may provide the asset authoring and delivery system 104 with instructions to deliver authored assets 122 first to the head unit when the user is located proximate the vehicle, second to the portable computer when the portable computer is in an ON state, and third to the smartphone as a default. In such an instance, the asset authoring and delivery system 104 will first determine whether the user is located proximate the vehicle, and if so deliver the authored asset 122 to the head unit. If the asset authoring and delivery system 104 determines the individual is not proximate the vehicle, the asset authoring and delivery system 104 next determines whether the portable computer is in an ON state. If the asset authoring and delivery system 104 determines the portable computer is not in an ON state, the asset authoring and delivery system 104 delivers the authored asset 122 to the smartphone. The method 2100 commences at 2102.

At 2104, the asset authoring and delivery system 104 receives data indicative of one or more user remote device preferences for delivery of authored assets 122. Data indicative of such preferences may be provided by the user to the asset authoring and delivery system 104 using a graphical or textual user interface on one or more remote devices or one or more computing devices communicably coupled to one or more remote devices 118. In at least some instances, one or more remote device parameters (e.g., audio and video presentation capabilities, processor type and speed, onboard memory) are communicated from some or all of the remote devices 118 to the asset authoring and delivery system 104. Based on the user supplied preferences, the asset authoring and delivery system 104 determines the one or more remote devices 118 to receive the authored asset 122.

At 2106, the asset authoring and delivery system 104 identifies one or more recipient remote devices 118 for receipt of one or more authored assets and generates the one or more authored assets for an item 504 based at least in part on the build configuration 116 of the item 504. The asset authoring and delivery system 104 then communicates the one or more generated authored assets 122 to some or all of the remote devices 118 based on the user supplied preferences. The method 2100 concludes at 2108.

Figure 22:
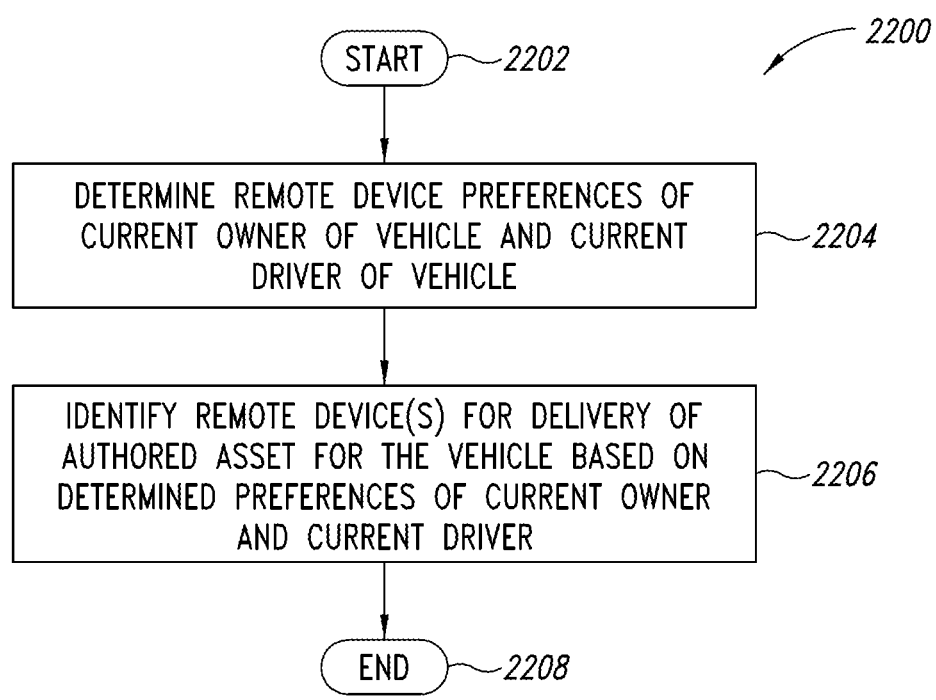
FIG. 22 is a flow diagram of a method of determining remote device preferences for a current vehicle owner and a current vehicle driver and identifying remote devices for delivery of an authored asset based at least in part on the determined remote device preferences, according to one non-limiting illustrated embodiment.

FIG. 22 shows a logic diagram 2200 for an example authored asset and delivery system 104 that determines an vehicle owner's remote device preferences logically associated with the item of manufacture 504 and a vehicle operator's remote device preferences logically associated with the item of manufacture 504. The vehicle owner and/or vehicle user may logically associate multiple remote devices 118 with a particular item of manufacture 504. The asset authoring and delivery system 104 then generates a number of authored assets 122 for an item of manufacture 504 and identifies any number of remote devices 118 to receive the one or more authored assets 122 based on the vehicle owner and/or vehicle driver preferences.

For example, a vehicle owner may associate a first smartphone, a first portable computer, and a head unit with an item of manufacture 504 such as a motor vehicle. A vehicle operator may associate a second smartphone, a second portable computer, and a head unit with the same motor vehicle. The vehicle owner and/or vehicle operator may provide data indicative of personal delivery preferences to the asset authoring and delivery system 104 via a user interface such as an interface program executed by the portable computer or an application (i.e., "app") executed on the smartphone. Such personal delivery preferences may provide the asset authoring and delivery system 104 with instructions to deliver authored assets 122 first to the head unit when the vehicle owner is located proximate the vehicle, second to the first portable computer when the first portable computer is in an ON state, and third to the first smartphone as a default. Such personal delivery preferences may provide the asset authoring and delivery system 104 with instructions to deliver authored assets 122 first to the head unit when the vehicle operator is located proximate the vehicle, second to the second portable computer when the first portable computer is in an ON state, and third to the second smartphone as a default.

In such an instance, the asset authoring and delivery system 104 will first determine whether the vehicle owner is located proximate the vehicle, and if so deliver the authored asset 122 to the head unit. If the asset authoring and delivery system 104 determines the vehicle owner is not proximate the vehicle, the asset authoring and delivery system 104 next determines whether the first portable computer is in an ON state. If the asset authoring and delivery system 104 determines the first portable computer is not in an ON state, the asset authoring and delivery system 104 delivers the authored asset 122 to the first smartphone. Further, the asset authoring and delivery system 104 will first determine whether the vehicle operator is located proximate the vehicle, and if so deliver the authored asset 122 to the head unit. If the asset authoring and delivery system 104 determines the vehicle operator is not proximate the vehicle, the asset authoring and delivery system 104 next determines whether the second portable computer is in an ON state. If the asset authoring and delivery system 104 determines the second portable computer is not in an ON state, the asset authoring and delivery system 104 delivers the authored asset 122 to the second smartphone. The method 2200 commences at 2202.

At 2204, the asset authoring and delivery system 104 receives data indicative of one or more vehicle owner remote device preferences for delivery of authored assets 122 and one or more vehicle operator remote device preferences for delivery of authored assets 122. Data indicative of such preferences may be provided by the vehicle owner and/or vehicle operator to the asset authoring and delivery system 104 using a graphical or textual user interface on one or more remote devices or one or more computing devices communicably coupled to one or more remote devices 118. In at least some instances, some or all of the remote devices 118 communicate parameters (e.g., audio and video presentation capabilities, processor type and speed, onboard memory) to the asset authoring and delivery system 104. Based on the vehicle owner and/or vehicle operator supplied preferences, the asset authoring and delivery system 104 determines the one or more remote devices 118 to receive the authored asset 122.

At 2206, the asset authoring and delivery system 104 identifies one or more vehicle owner recipient remote devices 118 for receipt of one or more authored assets and generates the one or more authored assets for an item 504 based at least in part on the build configuration 116 of the item 504. Additionally, the asset authoring and delivery system 104 identifies one or more vehicle operator recipient remote devices 118 for receipt of one or more authored assets and generates the one or more authored assets for an item 504 based at least in part on the build configuration 116 of the item 504. The asset authoring and delivery system 104 then communicates the one or more generated authored assets 122 to some or all of the remote devices 118 based on the vehicle owner and/or vehicle operator supplied preferences. The method 2200 concludes at 2208.

Figure 23:
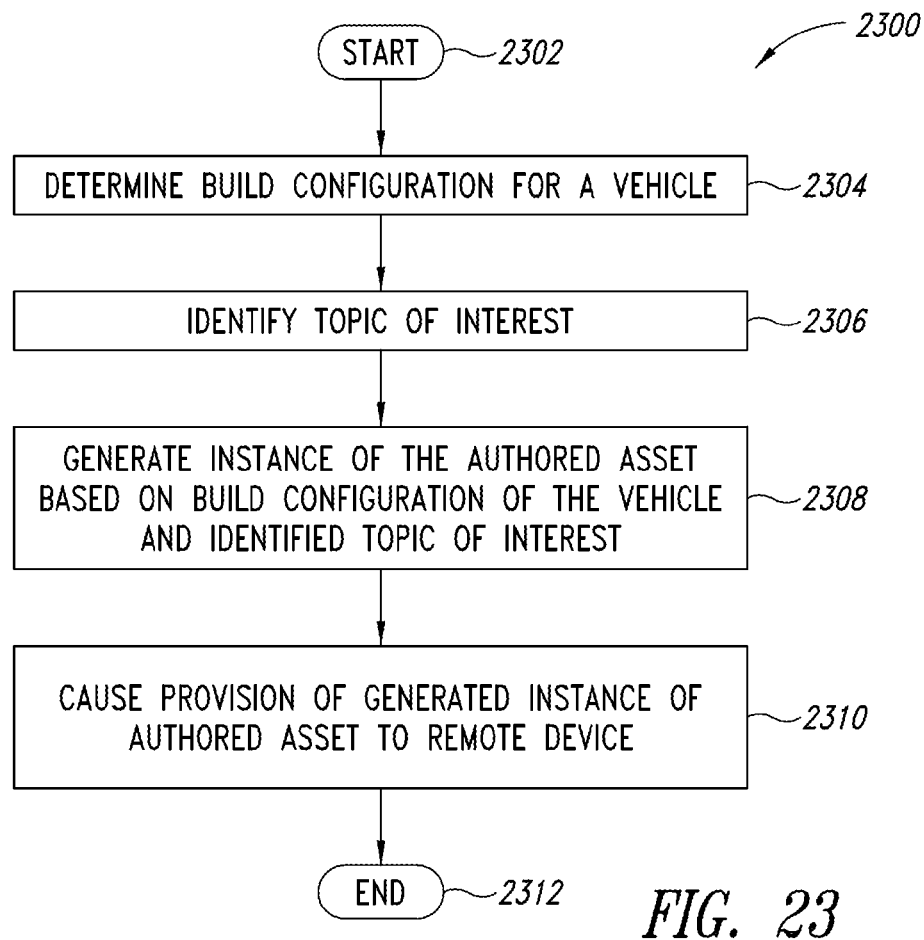
FIG. 23 is a high-level flow diagram of a method of identifying a topic of interest and generating an instance of the authored asset on a remote device based on the identified topic of interest, according to one non-limiting illustrated embodiment.

FIG. 23 shows a high level logic diagram 2300 for an example authored asset and delivery system such as the system 104 depicted in FIG. 1 for generating authored assets 122 on one or more identified topics of interest for an item of manufacture 504. Modern manufacturing techniques typically include a manufacturer 502 receiving a number of components 302, devices, systems and sub-systems from one or more sources, suppliers, distributors, and/or original equipment manufacturers (OEMs). The manufacturer 502 then assembles each item of manufacture 504 using some or all of these components. Each item of manufacture 504 has a specific build configuration 116 that identifies components 302, devices, systems and sub-systems used in the manufacture of the item 504. Thus, each item of manufacture 504, while similar, may be considered an assembly of components selected based on the build configuration 116 associated with the item 504. Such build configurations 116 may be selected based on manufacturer requirements; customer requirements; legal requirements such as safety, energy efficiency, and/or emissions requirements; community standards; or combinations thereof.

In some instances, the number of available optional or alternative components 302 leads to a large number of possible permutations and a large number of different possible build configurations. Printed product documentation offered by manufacturers typically includes all available options such that a single Owner's Guide or a single Maintenance Manual would cover all possible build configurations of a specific make and/or model of an item. Passages regarding optional or alternative components is often preceded with the disclaimer "IF EQUIPPED" or "IF PRESENT." While such comprehensive guides and manuals permit a manufacturer to streamline by enabling the use of a single guide or manual for all of a particular class, make, and/or model of an item, such guides or manuals are often confusing and difficult to use for users and maintainers of the item 504. A manufacturer creates such printed publications by editing and combining information provided by each component supplier into a cogent narrative that covers both the operation and maintenance of the components as well as the operation and maintenance of some or all operably connected components 302 included in the item of manufacture 504.

As described by various embodiments contained herein, the one or more sources, suppliers, distributors, and/or original equipment manufacturers (OEMs) supply component information in a number of formats, including printed publications and electronic documents. Printed publications can include text documents, images, drawings, sketches, diagrams, flowcharts, tables, graphs, and the like. Electronic documents typically include machine readable files (e.g., computer files) containing documents, images, drawings, sketches, diagrams, flowcharts, tables, and graphs, as well as video presentations, audio presentations, A/V presentations, animations, interactive content, and the like. In addition, parties other than suppliers, distributors, and/or original equipment manufacturers (OEMs) can provide electronic files relevant to components and/or items of manufacture. For example, individuals such as users or maintainers of various components or items of manufacture may generate and post electronic documents to bulletin boards, chat groups, social networking sites, or content presentation sites such as YouTube®.

As described in detail herein, an asset authoring and delivery system 104 can use printed and electronic information 102 to advantageously generate electronic asset content objects 108 that include edited and formatted data representative of printed and electronic publications logically associated with a particular component 302, components 302a-302n, and/or an item of manufacture 504. As generated by the asset authoring and delivery system 104, each asset content object contains information edited to focus on a particular operational or maintenance aspect of a component 302, components 302a-302n, and/or an item of manufacture 504. The asset authoring and delivery system 104 advantageously combines these asset content objects 108 using the build configuration associated with a particular item 504. Thus, the manufacturer is able to combined asset content objects 108 according to logical rules to generate authored assets 122 such as "custom" sets of user guides and manuals tailored to an individual item of manufacture 504. The asset authoring and delivery system 104 can dynamically create and deliver such asset content objects 122 to one or more remote devices 118 autonomously (e.g., on a defined, regular, periodic, or intermittent basis) or upon receipt of a request from one or more remote devices 118.

In some instances, the asset authoring and delivery system 104 can autonomously generate and deliver authored assets 122 such as "custom" sets of Owner's Guides and Maintenance Manuals tailored to an individual item of manufacture 504 to remote devices 118 for local storage. Such an arrangement advantageously eliminates the need for a "live" connection to the asset authoring and delivery system 104 to receive the authored asset 122. Such an arrangement also permits the manufacturer 502 to periodically or intermittently issue updates, patches, upgrades, and the like to the locally stored authored assets 122. Thus, the time and expense of providing up-to-date authored assets 122 in the form of Owner's Guides and Maintenance Manuals is significantly reduced and the reliability of information contained therein increased.

One or more remote devices 118 can be logically associated with each item of manufacture 504. One or more items of manufacture 504 can be logically associated with a single remote device 118. In some implementations, an owner and/or user of the item of manufacture 504 logically associates the one or more remote devices with a particular item 504. In other implementations, asset authoring and delivery system 104 forms the logical association between a particular remote device 118 and a particular item of manufacture 504 (e.g., a head unit in a vehicle). In at least some implementations, a remote device 118 can communicate or otherwise forward all or a portion of the authored asset to another device, for example a device logically associated with the recipient remote device 118 through one or more relationships external to the asset authoring and delivery system 104 (e.g., a Facebook "friend"). The asset authoring and delivery system 104 can store data indicative of the logical association between a particular item of manufacture 504 and one or more remote devices 118 in one or more communicably coupled data stores or data bases.

Authored assets 122 can include comprehensive documents such as Owner's Guides and Maintenance Manuals associated with a particular make and model of item of manufacture 504 or a specific item of manufacture 504. However, authored assets 122 may also be directed to specific topics such as a particular maintenance or operating procedure. For example, a vehicle operator may be interested in using the vehicle entertainment system and requests the Owner's Guide on the head unit in the vehicle. Responsive to the request and based on received data indicative of the vehicle operator's interaction with the entertainment system, the asset authoring and delivery system 104 may generate, format, and transmit an authored asset 122 including asset content objects 108 logically related to only entertainment system components rather than asset content objects 108 related to the entire Owner's Guide. The method of generating authored assets 122 using only asset content objects 108 on identified topics of interest begins at 2302.

At 2304, the asset authoring and delivery system 104 determines the build configuration 116 of a particular item of manufacture 504. The build configuration 116 includes data indicative of some or all of the components 302 used in an item of manufacture 504. In at least some implementations, an item identifier 162, such as a model number, serial number, model/serial number, vehicle identification number, etc., is logically associated an item of manufacture 504. In one or more build configuration data stores or databases 118, the item identifier 162 is logically associated with any number of component identifiers 152a-152n logically associated with a corresponding component 302a-302n included in the item of manufacture 504.

In at least some instances, the asset authoring and delivery system 104 can receive an item identifier 162 logically associated with a particular item of manufacture 504. Using the received item identifier 162, the asset authoring and delivery system 104 can retrieve or otherwise obtain the build configuration 116 for an item 504 from one or more build configuration data stores or databases 184. In at least some instances, the asset authoring and delivery system 104 can retrieve or otherwise obtain the build configuration 116 corresponding to a particular item identifier 162 using the item identifier 162 as an index to search the one or more build configuration data stores or databases 184. The one or more build configuration data stores or databases 184 contain data indicative of build configurations for some or all of the items of manufacture 504 produced by the manufacturer 502. For example, an enterprise business system, inventory management system, or supply chain management system may include one or more build configuration data stores or databases 184, each containing build configurations 116 indexed by item identifiers 162. Each of such build configurations 116 can include component identifiers 152a-152n logically associated with corresponding components 302a-302n present in the item of manufacture 504. The build configuration 116 for a particular item of manufacture 504 may include one or more manufacturer supplied components 302a-302n, one or more dealer/retailer/distributor supplied components 302a-302n, one or more aftermarket supplied components 302a-302n, or combinations thereof.

At 2306, the asset authoring and delivery system 104 identifies one or more topics of interest. In at least some instances, the asset authoring and delivery system 104 identifies one or more topics of interest based upon data communicated to the asset authoring and delivery system 104 from one or more remote devices 118 and/or one or more items of manufacture 504. In some instances, a topic of interest may be identified by a user of an item of manufacture such as a vehicle operator. In other instances, the asset authoring and delivery system 104 identifies a topic of interest based upon received data indicative of a user's interaction with an item of manufacture 504. In yet other instances, the asset authoring and delivery system 104 identifies a topic of interest based upon the situational context or present situation of the item 504, the user of the item 504, or both the item and the user of the item.

At 2308, the asset authoring and delivery system 104 generates one or more authored assets 122 based at least in part on the retrieved build configuration 116 of an item of manufacture 504 and based at least in part on one or more topics of interest identified at 2304. In at least some instances, each component identifier 152 is logically associated with a number of asset content objects 108. As previously discussed, the asset content objects 108 can each include information related to the particular component, feature, device, system, or sub-system logically associated with the topic of interest. In at least some instances, the asset authoring and delivery system 104 includes one or more asset content object data stores or databases 154. In at least some instances, the asset authoring and delivery system 104 can retrieve or otherwise obtain the asset content objects 108 corresponding to a particular component identifier 152 logically associated with the identified topic of interest. The asset authoring and delivery system 104 may retrieve such asset content objects 108 using the component identifier 152 as an index to search the one or more asset content object data stores or databases 154. For example, an enterprise business system, inventory management system, or supply chain management system may include one or more asset content object data stores or databases 154, indexed by component identifiers 152 and containing a number of asset content objects 108a-108n logically associated with each of the component identifiers 152 logically associated with the identified topic of interest.

The asset authoring and delivery system 104 can retrieve some or all of the asset content objects 108a-108n logically associated with some or all of the component identifiers 152a-152n logically associated with a particular item identifier 162 and/or logically associated with the identified topic of interest. The asset authoring and delivery system 104 can generate one or more authored assets 122 by combining, joining, or otherwise merging and formatting the retrieved asset content objects 108a-108n logically associated with some or all of the component identifiers 152a-152n included in the item 504 and the one or more topics of interest identified at 2306.

At 2310, the asset authoring and delivery system 104 communicates the generated authored asset 122 including asset content objects 108 logically associated with only the topic of interest identified to 2306 to one or more recipient remote devices 108. The determined recipient remote device 108 then generates an instance of the authored asset 122 using the data communicated by the asset authoring and delivery system 104. The presentation and display capabilities can vary from one remote device 118 to another. In at least some implementations, the asset authoring and delivery system 104 can format the authored asset 122 for presentation on one or more particular remote devices 118. For example, the asset authoring and delivery system 104 may provide a content rich authored asset 118 to a remote device having significant computational resources such as a personal computer or vehicular head unit. Conversely, the asset authoring and delivery system 104 may provide a content lean authored asset 118 to a remote device having more limited computational resources such as a smartphone, wearable computer, or personal digital assistant. The method 2300 concludes at 2312.

Figure 24:
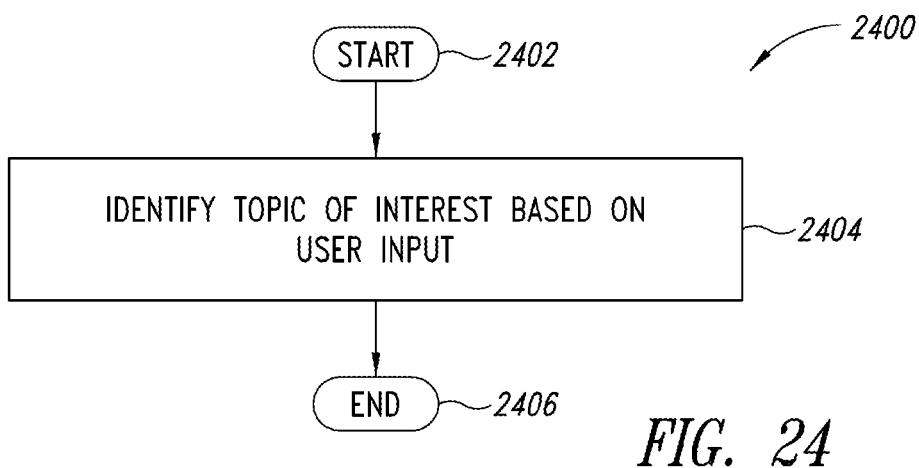
FIG. 24 is a flow diagram of a method of generating an authored asset on a remote device based using a topic of interest based on user input, according to one non-limiting illustrated embodiment.

FIG. 24 shows a logic diagram 2400 for an example authored asset and delivery system 104 that generates a number of authored assets 122 including asset content objects 108 logically associated with a user identified topic of interest. In at least some instances, the asset authoring and delivery system 104 receives one or more user inputs indicative of one or more topics of interest. Such user input may be provided to the asset authoring and delivery system 104 via one or more remote devices 118, via an item of manufacture 504, or via one or more electronic devices communicably coupled to both the one or more remote devices 118 and item of manufacture 504. The user can provide data indicative of one or more topics of interest to the asset authoring and delivery system 104 via a user interface, via voice commands, via one or more gestures, or any other system or device capable of providing an input to the asset authoring and delivery system 104 indicative of a topic of interest.

Responsive to the receipt of data indicative of the topic of interest from the user, the asset authoring and delivery system 104 generates one or more authored assets 122 using asset content objects 108 selected based at least in part upon the build configuration 116 of the item of manufacture and based at least in part on the user identified topic of interest. The asset authoring and delivery system 104 formats the generated authored asset 122 prior to delivery to the one or more remote devices 118. The method of generating authored assets 122 using asset content objects 108 selected based on the build configuration 116 of the item and one or more user identified topics of interest commences at 2402.

At 2404, the asset authoring and delivery system 104 receives a user input that includes data indicative of one or more topics of interest. The user provides the data indicative of one or more topics of interest to the asset authoring and delivery system 104 via one or more remote devices 118, via an item of manufacture 504, both a remote device 118 and the item of manufacture 504, or via an external electronic device that is communicably coupled to at least one of a remote device 118 and/or the item of manufacture 504.

Responsive to the receipt of the identified topic of interest, the asset authoring and delivery system 104 generates an authored asset for an item 504 based at least in part on the build configuration 116 of the item 504 and the topic of interest identified at 2404. The asset authoring and delivery system 104 selects asset content objects 108 for inclusion in the one or more authored assets based at least in part on the build configuration 116 of the item 504 and the identified topic of interest provided by the user at. The asset authoring and delivery system 104 then formats and communicates the generated authored assets 122 to some or all of the remote devices 118. The method of generating authored assets 122 using asset content objects 108 selected based on the build configuration 116 of the item and one or more user identified topics of interest concludes at 2406.

FIG. 25 shows a logic diagram 2500 for an example authored asset and delivery system 104 that generates a number of authored assets 122 including asset content objects 108 logically associated with a topic of interest identified at least in part using an operational condition of an item of manufacture 504. In at least some instances, the asset authoring and delivery system 104 receives one or more inputs indicative of one or more topics of interest based at least in part on the operational condition of an item of manufacture 504. Such an operational condition input may be provided to the asset authoring and delivery system 104 via one or more remote devices 118, via the item of manufacture 504, or via one or more electronic devices communicably coupled to both the one or more remote devices 118 and item of manufacture 504. For example, responsive to the receipt of data indicative of a fuel delivery issue to a vehicle's engine, the asset authoring and delivery system 104 may autonomously generate and deliver to the head unit in the vehicle an authored asset 122 that includes only asset content objects 108 logically related to the vehicle fuel system.

Responsive to the receipt of data indicative of the topic of interest from the user, the asset authoring and delivery system 104 generates one or more authored assets 122 using asset content objects 108 selected based at least in part upon the build configuration 116 of the item of manufacture and based at least in part on the topic of interest identified based on vehicle operational condition. The asset authoring and delivery system 104 formats the generated authored asset 122 prior to delivery to the one or more remote devices 118. The method of generating authored assets 122 using asset content objects 108 selected based on the build configuration 116 of the item and one or more topics of interest identified based on vehicle operational condition commences at 2502.

At 2504, the asset authoring and delivery system 104 receives at least one input that includes data indicative of one or more topics of interest based in whole or in part on one or more vehicle operational conditions. Responsive to the receipt of the topic of interest, the asset authoring and delivery system 104 selects asset content objects 108 logically related to the identified topic of interest. The asset authoring and delivery system 104 generates one or more authored assets 122 using the selected asset content objects 108. In at least some instances, such asset content objects 108 may include data indicative of sales, special offers, coupons, promotional offers and the like associated with the identified topic of interest. For example, if the ignition system of a vehicle precludes starting of the vehicle, a remote device such as a smartphone that is logically associated with the vehicle may transmit a request for an authored asset 122 to the asset authoring and delivery system 104.

Responsive to the receipt of the request, the asset authoring and delivery system 104 may poll or otherwise query the vehicle to determine the operational condition of the vehicle. Based on the determined operational condition, the asset authoring and delivery system 104 identifies the vehicle ignition system as a topic of interest, selects asset content objects 108 related to the vehicle ignition system, generates one or more authored assets 122 logically associated with the vehicle ignition system, formats the authored assets 122 for display on a smartphone and communicates the authored assets to the smartphone. The method of generating authored assets 122 using asset content objects 108 selected based on the build configuration 116 of the item and one or more topics of interest identified based on the operational condition of the vehicle concludes at 2506.

FIG. 26 shows a logic diagram 2600 for an example authored asset and delivery system 104 that generates a number of authored assets 122 including asset content objects 108 logically associated with a topic of interest identified at least in part using a service history associated with an item of manufacture 504. In at least some instances, the asset authoring and delivery system 104 receives one or more inputs indicative of one or more topics of interest based at least in part on the service history associated with an item of manufacture 504. Such a service history input may be provided to the asset authoring and delivery system 104 via one or more remote devices 118, via the item of manufacture 504, or via one or more electronic devices communicably coupled to at least one of the one or more remote devices 118 and/or item of manufacture 504 and/or one or more external electronic devices communicably coupled to the asset authoring and delivery system 104. In at least some instances, the asset authoring and delivery system 104 generates asset content objects 122 based on the build configuration of the item 504 and the service history of the item 504.

For example, a service history stored on a dealership enterprise data system indicates brake pads on a particular vehicle have historically been replaced every 25,000 miles (e.g., at 25,000 miles and at 50,000 miles). At 70,000 miles, the asset authoring and delivery system 104 may autonomously generate an authored asset containing asset content objects related to the upcoming brake pad replacement. Such authored assets 122 may include asset content objects in the form of brake pad coupons or offers provided by the dealership in addition to asset content objects related to the braking system of the vehicle.

In another example, a vehicle operator may ignore manufacturer recommended oil change intervals (e.g., once every 7,500 miles). At 8,500 miles (i.e., 1,000 miles after the recommended change interval) the asset authoring and delivery system 104 may autonomously generate an authored asset 122 containing asset content objects 108 related to the overdue oil change. Such authored assets 122 may include asset content objects 108 in the form of oil change coupons or offers provided by the dealership in addition to asset content objects related to the lubrication of the vehicle. In other instances, the asset authoring and delivery system 104 can provide asset content objects 108 related to the oil change process, asset content objects 108 that explain the steps involved in changing oil, and asset content objects 108 that discuss the consequences of not performing oil changes in accordance with manufacturer's recommendations. The method of generating authored assets 122 using asset content objects 108 selected based on the build configuration 116 of the item and one or more topics of interest identified based on vehicle service history commences at 2602.

At 2604, the asset authoring and delivery system 104 receives at least one input that includes data indicative of one or more topics of interest based in whole or in part on the service history of an item of manufacture 504. Responsive to the receipt of the topic of interest, the asset authoring and delivery system 104 selects asset content objects 108 logically related to the identified topic of interest. The asset authoring and delivery system 104 generates one or more authored assets 122 using the selected asset content objects 108. In at least some instances, such asset content objects 108 may include data indicative of sales, special offers, coupons, promotional offers and the like logically associated with or related to the identified topic of interest. The method of generating authored assets 122 using asset content objects 108 selected based on the build configuration 116 of the item and one or more topics of interest identified based on the service history of the vehicle concludes at 2606.

FIG. 27 shows a logic diagram 2700 for an example authored asset and delivery system 104 that generates a number of authored assets 122 including asset content objects 108 logically associated with a topic of interest identified at least in part using a recall campaign history associated with an item of manufacture 504. In at least some instances, the asset authoring and delivery system 104 receives one or more inputs indicative of one or more topics of interest based at least in part on the recall campaign history associated with an item of manufacture 504. Such a recall campaign history input may be provided to the asset authoring and delivery system 104 via one or more remote devices 118; via the item of manufacture 504; via one or more electronic devices communicably coupled to at least one of the one or more remote devices 118 and/or item of manufacture 504; or via one or more external electronic devices communicably coupled to the asset authoring and delivery system 104. In at least some instances, the asset authoring and delivery system 104 generates asset content objects 122 based on the build configuration of the item 504 and the recall campaign history of the item 504.

For example, a recall campaign history stored on a dealership enterprise data system indicates a safety recall campaign involving seat belts has not been reported as performed on particular vehicle. At defined intervals, the asset authoring and delivery system 104 may autonomously generate one or more authored assets 122 containing asset content objects 108 logically associated with the recall campaign and the safety restraint systems in the vehicle. Such authored assets 122 may include asset content objects in the form of incentives or promotional offers provided by the dealership in addition to asset content objects 108 related to the safety restraint systems in the vehicle.

In another example, a vehicle upon which a recall service has been provided may not be performing properly after the recall service. The head unit in the vehicle receives data indicative of the improper performance and communicates such data to the asset authoring and delivery system 104. Responsive to the receipt of the communication from the head unit, the asset authoring and delivery system 104 may autonomously generate an authored asset 122 containing asset content objects 108 related to the issues detected by the head unit. Such authored assets 122 may include asset content objects 108 related to the detected issues, asset content objects 108 that explain the steps involved in repairing the detected issues, and asset content objects 108 that discuss the consequences of not remedying the detected issues. The method of generating authored assets 122 using asset content objects 108 selected based on the build configuration 116 of the item and one or more topics of interest identified based on vehicle recall campaign history commences at 2702.

At 2704, the asset authoring and delivery system 104 receives at least one input that includes data indicative of one or more topics of interest based in whole or in part on the recall campaign history of an item of manufacture 504. Responsive to the receipt of the topic of interest, the asset authoring and delivery system 104 selects asset content objects 108 logically related to the identified topic of interest. The asset authoring and delivery system 104 generates one or more authored assets 122 using the selected asset content objects 108. In at least some instances, such asset content objects 108 may include data indicative of sales, special offers, coupons, promotional offers and the like logically associated with or related to the identified topic of interest. The method of generating authored assets 122 using asset content objects 108 selected based on the build configuration 116 of the item and one or more topics of interest identified based on the recall campaign history of the vehicle concludes at 2706.

FIG. 28 shows a logic diagram 2800 for an example authored asset and delivery system 104 that generates a number of authored assets 122 including asset content objects 108 logically associated with a topic of interest identified at least in part using a change in one or more operational parameters associated with an item of manufacture 504. In at least some instances, the asset authoring and delivery system 104 receives one or more inputs indicative of one or more topics of interest based at least in part on a change in one or more operational parameters associated with an item of manufacture 504. Such change in operational parameters input may be provided to the asset authoring and delivery system 104 via one or more remote devices 118; via the item of manufacture 504; via one or more electronic devices communicably coupled to at least one of the one or more remote devices 118 and/or item of manufacture 504; or via one or more external electronic devices communicably coupled to the asset authoring and delivery system 104. In at least some instances, the asset authoring and delivery system 104 generates asset content objects 122 based on the build configuration of the item 504 and the change in one or more operational parameters associated with an item of manufacture 504.

Such operational changes in operational parameters can include, but are not limited to, changes in one or more mechanical systems, changes in one or more electrical systems, changes in one or more control systems, or combinations thereof. For example, a change in engine performance associated with a faulty exhaust gas recirculation ("EGR") valve may be detected by one or more vehicular systems. In some instances, the one or more vehicular systems can provide data to a communicably coupled remote device 118 such as a vehicle head unit that, in turn, communicates the detected change in performance to the asset authoring and delivery system 104. In other instances, the one or more vehicular system may communicate data indicative of the detected change in performance to the asset authoring and delivery system 104. Responsive to the receipt of the data indicative of the change in engine performance, the asset authoring and delivery system 104 can select asset content objects 108 logically associated with the engine and/or exhaust system of the vehicle. The selected asset content objects 108 can be used by the asset authoring and delivery system 104 to generate one or more authored assets 122 for communication to one or more remote devices 108.

In another example an onboard data acquisition system may detect a change in performance or one or more operational parameters (e.g., a change in an air bag activation circuit rendering the circuit inoperable in a collision) that is otherwise imperceptible to a vehicle operator. The data acquisition system can provide data to a communicably coupled remote device 118 such as a vehicle head unit that, in turn, communicates the detected change to the asset authoring and delivery system 104. In other instances, the one or more vehicular system may communicate data indicative of the detected change to the asset authoring and delivery system 104. Responsive to the receipt of the data indicative of the change in engine performance, the asset authoring and delivery system 104 can select asset content objects 108 logically associated with the air bag system in the vehicle. The selected asset content objects 108 can be used by the asset authoring and delivery system 104 to generate one or more authored assets 122 for communication to one or more remote devices 108. In at least some instances, such authored assets 122 may include asset content objects 108 providing information on the consequences of delaying repair of the detected condition. The method of generating authored assets 122 using asset content objects 108 selected based on the build configuration 116 of the item and one or more topics of interest identified based on changes in one or more operational parameters commences at 2802.

At 2804, the asset authoring and delivery system 104 receives at least one input that includes data indicative of one or more topics of interest based in whole or in part on detected changes in one or more operational parameters associated with an item of manufacture 504. Responsive to the receipt of the topic of interest, the asset authoring and delivery system 104 selects asset content objects 108 logically related to the identified topic of interest. The asset authoring and delivery system 104 generates one or more authored assets 122 using the selected asset content objects 108. In at least some instances, such asset content objects 108 may include data indicative of sales, special offers, coupons, promotional offers and the like logically associated with or related to the identified topic of interest. In at least some instances, such asset content objects 108 may be collected using social media from one or more other users of similar or identical items 504 experiencing similar or identical changes in one or more operational parameters. One or more remote devices 118 logically associated with the item of manufacture 504, the item of manufacture 504, and/or the asset authoring and delivery system 104 may provide the data indicative of changes in operational performance of the item 504. The method of generating authored assets 122 using asset content objects 108 selected based on the build configuration 116 of the item and one or more topics of interest identified based on changes in one or more operational parameters of the vehicle 504 concludes at 2806.

Figure 29:
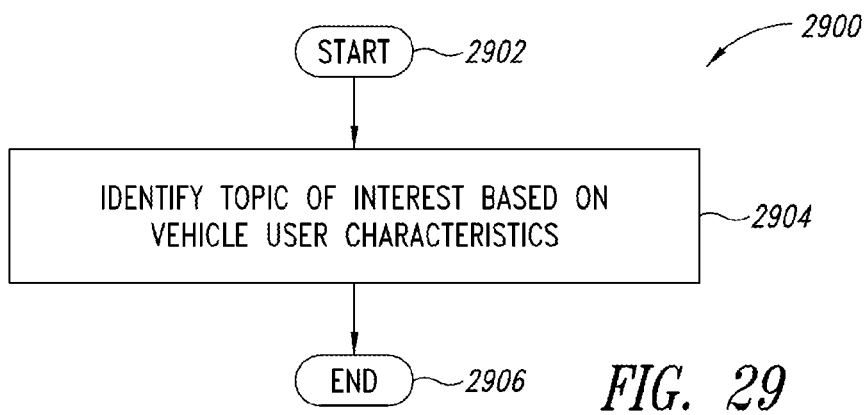
FIG. 29 is a flow diagram of a method of generating an authored asset on a remote device based using a topic of interest based on one or more identified vehicle user characteristics, according to one non-limiting illustrated embodiment.

FIG. 29 shows a logic diagram 2900 for an example authored asset and delivery system 104 that generates a number of authored assets 122 including asset content objects 108 logically associated with a topic of interest identified at least in part using one or more item user characteristics associated with an item of manufacture 504. In at least some instances, the asset authoring and delivery system 104 receives one or more inputs indicative of one or more topics of interest based at least in part on one or more vehicle user characteristics associated with an item of manufacture 504. Such data indicative of item user characteristics may be provided to the asset authoring and delivery system 104 via one or more remote devices 118; via the item of manufacture 504; via one or more electronic devices communicably coupled to at least one of the one or more remote devices 118 and/or item of manufacture 504; or via one or more external electronic devices communicably coupled to the asset authoring and delivery system 104. In at least some instances, the asset authoring and delivery system 104 generates asset content objects 122 based on the build configuration of the item 504 and the one or more item user characteristics associated with an item of manufacture 504.

Such item user characteristics can include, but are not limited to, the user's level of education, the user's mechanical aptitude, the user's electrical aptitude, the user's cultural background, the user's location, or combinations thereof. For example, an item user may have an extensive background in the arts, but little experience in mechanical or electrical work. In at least some implementations data indicative of the background of the user may be provided to the asset authoring and delivery system 104. In some instances, the one or more vehicular systems can provide data to a communicably coupled remote device 118 such as a vehicle head unit that, in turn, communicates the detected item user characteristics to the asset authoring and delivery system 104. In other instances, the one or more vehicular system may communicate data indicative of the detected item user characteristics to the asset authoring and delivery system 104. Responsive to the receipt of the data indicative of the change in engine performance, the asset authoring and delivery system 104 can select asset content objects 108 logically associated with an informational approach that represents the degree of technical sophistication of the item user. The selected asset content objects 108 can be used by the asset authoring and delivery system 104 to generate one or more authored assets 122 for communication to one or more remote devices 108. The method of generating authored assets 122 using asset content objects 108 selected based on the build configuration 116 of the item and one or more topics of interest identified based on one or more item user characteristics commences at 2902.

At 2904, the asset authoring and delivery system 104 receives at least one input that includes data indicative of one or more topics of interest based in whole or in part on one or more item user characteristics associated with an item of manufacture 504. Responsive to the receipt of the topic of interest, the asset authoring and delivery system 104 selects asset content objects 108 logically related to the identified topic of interest. The asset authoring and delivery system 104 generates one or more authored assets 122 using the selected asset content objects 108. In at least some instances, such asset content objects 108 may include data indicative of sales, special offers, coupons, promotional offers and the like logically associated with or related to the identified topic of interest. In some instances, the asset authoring and delivery system 104 may select asset content objects 108 that include instructional materials to improve the level of technical knowledge of the user. In at least some instances, such asset content objects 108 may be collected using social media from one or more other users of similar or identical items 504 experiencing similar or identical changes in one or more operational parameters. For example, one asset content object may include a crowd-sourced informational or instructional video produced by an individual with a similar level of technical expertise to the item user. One or more remote devices 118 logically associated with the item of manufacture 504, the item of manufacture 504, and/or the asset authoring and delivery system 104 may provide the data indicative of one or more item user characteristics. The method of generating authored assets 122 using asset content objects 108 selected based on the build configuration 116 of the item and one or more topics of interest identified using one or more item user characteristics concludes at 2906.

Figure 30:
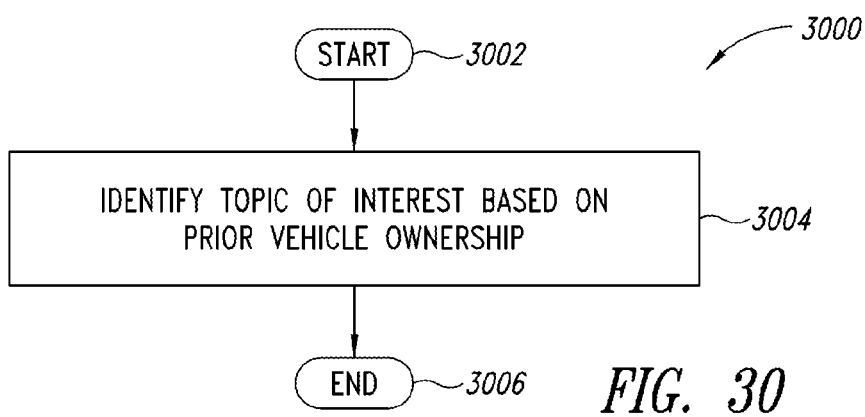
FIG. 30 is a flow diagram of a method of generating an authored asset on a remote device based using a topic of interest based on identified prior vehicle ownership, according to one non-limiting illustrated embodiment.

FIG. 30 shows a logic diagram 3000 for an example authored asset and delivery system 104 that generates a number of authored assets 122 including asset content objects 108 logically associated with a topic of interest identified at least in part using data indicative of prior items owned by the user of an item of manufacture 504. In at least some instances, the asset authoring and delivery system 104 receives one or more inputs indicative of one or more topics of interest based at least in part on prior items 504 owned by the user of an item of manufacture 504. Such data indicative of prior items owned by the user of an item of manufacture 504 may be provided to the asset authoring and delivery system 104 via one or more remote devices 118; via the item of manufacture 504; via one or more electronic devices communicably coupled to at least one of the one or more remote devices 118 and/or item of manufacture 504; or via one or more external electronic devices communicably coupled to the asset authoring and delivery system 104. In at least some instances, the asset authoring and delivery system 104 generates asset content objects 122 based at least in part on the build configuration of the item 504 and based at least in part on and prior items owned by or otherwise associated with the user.

Prior items owned by or otherwise associated with a user of an item of manufacture 504 can provide an indication of the level of knowledge, experience, and/o item familiarity the user may possess. With an indication of the level of knowledge, experience, and/or familiarity of the user of the item 504, the asset authoring and delivery system 104 can generate authored assets 122 that include asset content objects reflective of the user's level of knowledge and experience.

For example, the user of an item of manufacture 504 may have extensive ownership and/or maintenance experience with Toyota products. Data indicative of the user's level of knowledge and experience with Toyota products may be provided to the asset authoring and delivery system 104 via one or more remote devices 118, one or more items of manufacture, one or more enterprise business systems operated by the same or a different manufacturer or some combination thereof. Based on the user's level of familiarity with Toyota products, the asset authoring and delivery system 104 may select Lexus asset content objects 108 intended for a user having an intermediate level of knowledge and experience with a parent corporation's products.

Responsive to the receipt of the data indicative of a user's prior ownership of one or more items 504, the asset authoring and delivery system 104 can select asset content objects 108 logically associated with an informational approach that represents the degree of familiarity of the item user with a particular item 504 or class of items 504. The selected asset content objects 108 can be used by the asset authoring and delivery system 104 to generate one or more authored assets 122 for communication to one or more remote devices 108. The method of generating authored assets 122 using asset content objects 108 selected based on the build configuration 116 of the item and one or more topics of interest identified based on the prior item ownership history of the user of the item 504 commences at 3002.

At 3004, the asset authoring and delivery system 104 receives at least one input that includes data indicative of one or more topics of interest based in whole or in part on build configuration of a particular item 504 or class of items 504 and a determined prior item ownership history of the user. Responsive to the receipt of the topic of interest, the asset authoring and delivery system 104 selects asset content objects 108 logically related to the identified topic of interest.

For example, vehicular climate controls are often similar across a manufacturer's product line. Thus, a first user familiar with the climate controls in a Toyota Corolla will have a degree of familiarity with the climate controls upon moving to a Toyota Camry. In contrast, a second user moving from a Ford F-150 pickup truck to Camry would not be as familiar with the climate controls. The asset authoring and delivery system 104 can select a first set of asset content objects 108 for inclusion in an authored asset 122 intended for the first user based on the first user's assumed familiarity with Toyota products. The asset authoring and delivery system 104 can select a second set of asset content objects 108 for inclusion in an authored asset 122 intended for the second user based on the second user's assumed lack of familiarity with Toyota products. Such a system advantageously provides users with authored assets 122 reflective of the presumed knowledge and/or familiarity of the user with an item 504 based at least in part on those items previously owned by the user.

The asset authoring and delivery system 104 generates one or more authored assets 122 using asset content objects 108 selected at least in part based on the build configuration 116 associated with a particular item or class of items and based at least in part on data indicative of the user's item ownership history. In at least some instances, such asset content objects 108 may include data indicative of sales, special offers, coupons, promotional offers and the like logically associated with or related to the identified topic of interest. In some instances, the asset authoring and delivery system 104 may select asset content objects 108 that include instructional materials, training documents, and the like. In at least some instances, the asset authoring and delivery system 104 can use social media data acquired from one or more other users of similar or identical items 504 to select such asset content objects 108. For example, one asset content object may include a crowd-sourced informational or instructional video produced by an individual sharing a similar level of item ownership experience with the item user. The method of generating authored assets 122 using asset content objects 108 selected based on the build configuration 116 of the item and one or more topics of interest identified using the prior item ownership history of the user concludes at 3006.

Figure 31:
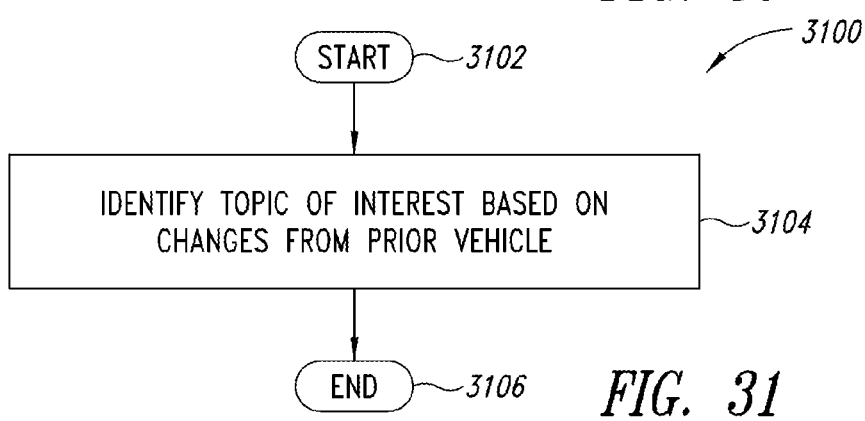
FIG. 31 is a flow diagram of a method of generating an authored asset on a remote device based using a topic of interest based on one or more identified changes from a prior vehicle, according to one non-limiting illustrated embodiment.

FIG. 31 shows a logic diagram 3100 for an example authored asset and delivery system 104 capable of generating a number of authored assets 122 logically associated with a topic of interest identified at least in part using data indicative of changes the current item 504 and one or more prior items owned by the user. In at least some instances, the asset authoring and delivery system 104 receives one or more inputs indicative of one or more topics of interest based at least in part on differences or changes between the current item 504 and one or more prior items 504 owned by the user. Data indicative of such changes between items may be provided to the asset authoring and delivery system 104 via one or more remote devices 118; via the item of manufacture 504; via one or more electronic devices communicably coupled to at least one of the one or more remote devices 118 and/or item of manufacture 504; or via one or more external electronic devices communicably coupled to the asset authoring and delivery system 104. In at least some instances, the asset authoring and delivery system 104 generates asset content objects 122 based at least in part on the build configuration of the item 504 and based at least in part on changes or differences existent between the current item 504 and prior items owned by or otherwise associated with the user.

Identifying changes between the current item or class of items and one or more prior items owned by the user of an item of manufacture 504 provides an indication of the level of knowledge, experience, and/or familiarity the user may possess. With a knowledge of the changes existent between the current item 504 or class of items 504 and one or more prior items owned by the user, the asset authoring and delivery system 104 can generate authored assets 122 that include asset content objects reflective of the user's level of knowledge, experience, and/or familiarity with the components 302, devices, systems, and sub-systems included in the current item of manufacture 504.

For example, the user of an item of manufacture may have extensive ownership and/or maintenance experience with the 2008-2013 line of Nissan Altima products. Data indicative of the user's level of knowledge and experience specific to 2008-2013 Nissan Altima products may be provided to the asset authoring and delivery system 104 via one or more remote devices 118, one or more items of manufacture, one or more enterprise business systems operated by the same manufacturer 502, a different manufacturer, or some combination thereof. The asset authoring and delivery system 104 determines the differences between 2008-2013 Nissan Altima products and the 2014 Nissan Altima. Based on the user's level of familiarity with Nissan Altima products and the changes that have occurred in Nissan Altima products between 2008-2013 and 2014, the asset authoring and delivery system 104 generates one or more authored assets 122 each of which includes asset content objects 108 logically associated with those components 302, devices, systems, and/or sub-systems that have changed between the 2008-2013 Altima model years and the 2014 Altima model year.

The method of generating authored assets 122 using asset content objects 108 selected based on the build configuration 116 of the item and changes between the current item or class of items and one or more prior items owned by the user of an item of manufacture 504 commences at 3102.

At 3104, the asset authoring and delivery system 104 receives at least one input that includes data indicative of one or more topics of interest based in whole or in part on changes between the current item or class of items and one or more prior items owned by the user of an item of manufacture 504.

Responsive to the receipt of the topic of interest, the asset authoring and delivery system 104 selects asset content objects 108 logically related to the identified topic of interest for inclusion in one or more authored assets 122. Such asset content objects 108 may highlight, discuss, or otherwise elaborate on the changes that exist between prior items of manufacture 504 and the current item of manufacture 504. Such an approach advantageously permits a user who is familiar with the item overall and interested in viewing information related to changes made between item models or between item model years to review one or more concise authored assets 122 that each include information relevant to the changes in components, devices, systems, and subsystems between model years.

From example, a user of a 2008 model year vehicle with conventional entertainment and climate control system controls (i.e., button and slide controls) has purchased a 2013 model year vehicle that is identical except for a head unit that includes a touchscreen user interface that provides entertainment and climate control system controls. The asset authoring and delivery system 104 can autonomously determine the differences between the 2008 and 2013 model year vehicles and can generate one or more authored assets 122 discussing these differences. In this instance, the asset authoring and delivery system 104 can select asset content objects 108, which may include audio, video, or A/V content explaining the differences between the manual controls in the 2008 model year vehicle and the 2013 model year vehicle.

The asset authoring and delivery system 104 generates one or more authored assets 122 using asset content objects 108 selected at least in part based on the build configuration 116 associated with a particular item or class of items and based at least in part on data indicative of changes existent between prior items of manufacture 504 and the current item of manufacture 504. In some instances, the asset authoring and delivery system 104 may select asset content objects 108 that include instructional materials, training documents, and the like. In at least some instances, the asset authoring and delivery system 104 can use social media data acquired from one or more other users of similar or identical items 504 or former owners of one or more prior items of manufacture 504 to select such asset content objects 108. For example, one asset content object may include a crowd-sourced informational or instructional video produced by an individual sharing a similar level of item ownership experience with the item user. The method of generating authored assets 122 using asset content objects 108 selected based at least in part on the build configuration 116 of the item and based at least in part on one or more topics of interest identified using the changes that exist between prior items of manufacture 504 and the current item of manufacture 504 concludes at 3106.

Figure 32:
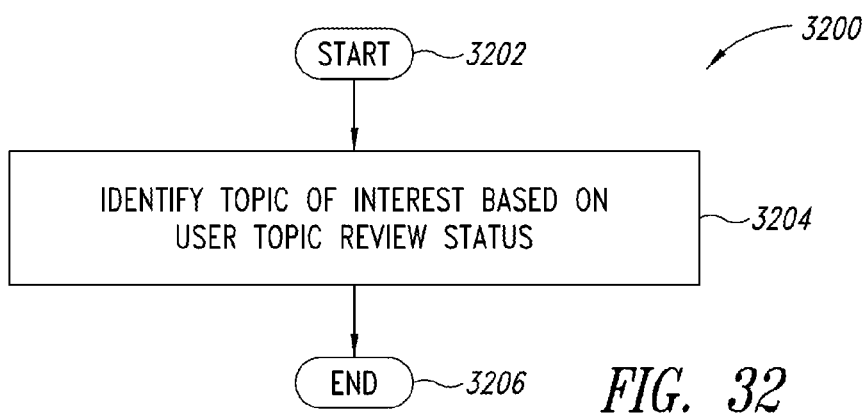
FIG. 32 is a flow diagram of a method of generating an authored asset on a remote device based using a topic of interest based on an identified user topic review status, according to one non-limiting illustrated embodiment.

FIG. 32 shows a logic diagram 3200 for an example authored asset and delivery system 104 capable of generating a number of authored assets 122 logically associated with a topic of interest identified at least in part using data indicative of prior authored assets 122 reviewed by the user of the item of manufacture 504. In at least some instances, the asset authoring and delivery system 104 receives one or more inputs indicative of one or more topics of interest based at least in part on prior authored asset topics reviewed by the user of the item of manufacture 504. In at least some instances, the asset authoring and delivery system 104 can track those authored assets 122 and/or asset content objects 108 reviewed by a particular user. In such instances, the asset authoring and delivery system 104 may store data indicative of the authored assets 122 and/or asset content objects 108 reviewed by a user. Thus, if a user reviews the first and second authored assets 122 related to a vehicle Owner's Guide, the asset authoring and delivery system 104 may optionally begin delivering the third authored asset 122 (i.e., skipping the completed first and second authored assets 122) upon receiving a request from the user for access to the Owner's Guide. The method of generating authored assets 122 using asset content objects 108 selected based on the build configuration 116 of the item and based at least on prior authored assets 122 reviewed by the user of the item of manufacture 504 commences at 3202.

At 3204, the asset authoring and delivery system 104 receives at least one input that includes data indicative of one or more topics of interest based in whole or in part on prior authored assets 122 that may have been presented but were not reviewed by the user of the item of manufacture 504. Responsive to the receipt of the topic of interest, the asset authoring and delivery system 104 selects unreviewed asset content objects 108 logically related to the identified topic of interest for inclusion in one or more authored assets 122. Such an approach advantageously eliminates the need for a user to "flip through" previously reviewed authored assets 122 and/or asset content objects 108 to access those authored assets 122 and/or asset content objects 108 that have not yet been viewed by the user of an item of manufacture 504.

The asset authoring and delivery system 104 generates one or more authored assets 122 using asset content objects 108 selected at least in part based on the build configuration 116 associated with a particular item or class of items and based at least in part on data indicative authored assets 122 and/or asset content objects 108 previously viewed by the user. In some instances, the asset authoring and delivery system 104 may select asset content objects 108 that include instructional materials, training documents, interactive training materials, and the like. In at least some instances, the asset authoring and delivery system 104 can select additional asset content objects 108 or generate additional authored assets 122 based on the recommendations or other data provided by other users of the item of manufacture 504. The method of generating authored assets 122 using asset content objects 108 selected based at least in part on one or more topics of interest identified using authored assets 122 and/or asset content objects 108 that have not yet been reviewed by the owner of an item of manufacture 504 concludes at 3206.

Figure 33:
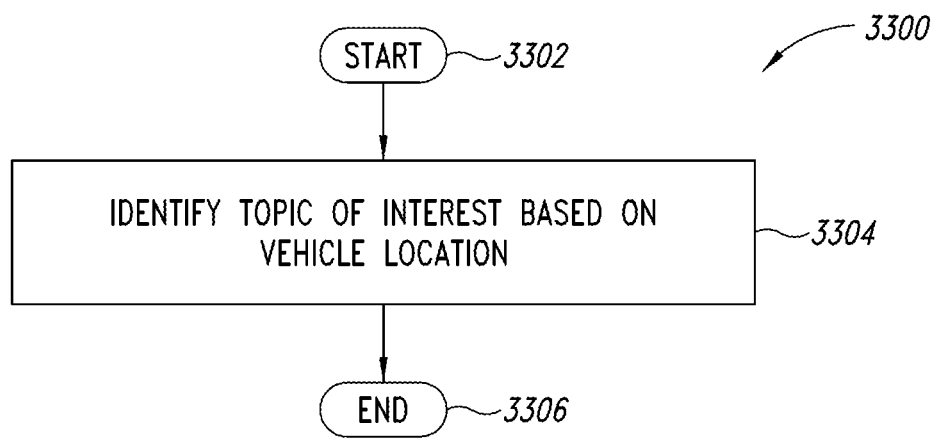
FIG. 33 is a flow diagram of a method of generating an authored asset on a remote device based using a topic of interest based on an identified vehicle location, according to one non-limiting illustrated embodiment.

FIG. 33 shows a logic diagram 3300 for an example authored asset and delivery system 104 capable of generating a number of authored assets 122 logically associated with a topic of interest identified at least in part using data indicative of the physical location and/or geophysical location, of the item of manufacture 504. In at least some instances, the asset authoring and delivery system 104 receives one or more inputs indicative of one or more topics of interest based at least in part on the location of the item of manufacture 504. In some instances, such item location data may be obtained via terrestrial triangulation (e.g., using cell phone triangulation), via geolocation (e.g., via global positioning system or "GPS" data), or similar location identification systems. The asset authoring and delivery system 104 can select asset content objects 108 for inclusion in authored assets 122 based at least in part on the data indicative of the location of an item of manufacture. The asset authoring and delivery system 104 may receive such location data directly from the item of manufacture 504, indirectly via one or more remote devices 118, or via the user of the item 504 or remote device 118.

For example, responsive to receiving data indicative of an illuminated BATTERY indicator lamp in a vehicle and receiving data indicative of a location in rural Utah, the asset authoring and delivery system 104 selects a number of asset content objects 108 to generate an authored asset explaining the BATTERY indicator to the vehicle operator, and instructing the vehicle operator to keep the vehicle running until reaching a dealership. The asset authoring and delivery system 104 may also provide additional asset content objects 108 that include real time or near real-time data relevant to the closest dealership or service center, telephone numbers, contact information, estimated battery replacement wait times, battery stock levels, and the like.

In another example, responsive to receiving data indicative of an illuminated CHECK ENGINE indicator lamp in a vehicle and receiving data indicative of a location corresponding to rural Wyoming, the asset authoring and delivery system 104 can poll a remote device such as a head unit communicably coupled to the vehicle to obtain additional data regarding the vehicle. Responsive to the received vehicle data and the location in rural Wyoming, the asset authoring and delivery system 104 selects a number of asset content objects 108 to generate an authored asset explaining the CHECK ENGINE indicator to the vehicle operator. Based on the nature of the issue as determined by the data returned to the asset authoring and delivery system 104 by the vehicle, the asset authoring and delivery system 104 may instruct the vehicle operator to stop immediately to avoid further damage to the vehicle. In such an instance, the asset authoring and delivery system 104 may provide one or more authored assets to the head unit in the vehicle that indicates the closest dealership or service center, a proposed scheduled appointment time, and a proposed towing company. In other instances, the asset authoring and delivery system 104 provide an authored asset 122 providing directions to the nearest dealership or service center where the issue can be addressed along with a proposed scheduled appointment time.

The method of generating authored assets 122 using asset content objects 108 selected based on the build configuration 116 of the item and the location of the item of manufacture 504 commences at 3302.

At 3304, the asset authoring and delivery system 104 receives at least one input that includes data indicative of one or more topics of interest based in whole or in part on the location of an item of manufacture 504. Responsive to the receipt of the topic of interest, the asset authoring and delivery system 104 selects asset content objects 108 logically related to the identified topic of interest for inclusion in one or more authored assets 122.

The asset authoring and delivery system 104 generates one or more authored assets 122 using asset content objects 108 selected at least in part based on the location of the item of manufacture 504. In at least some instances, the asset authoring and delivery system 104 can use social media data acquired from one or more other users to identify users of similar or identical items of manufacture who may be in a location proximate the user. The method of generating authored assets 122 using asset content objects 108 selected based at least in part on the build configuration 116 of the item and based at least in part on the location of the item of manufacture 504 concludes at 3306.

Figure 34:
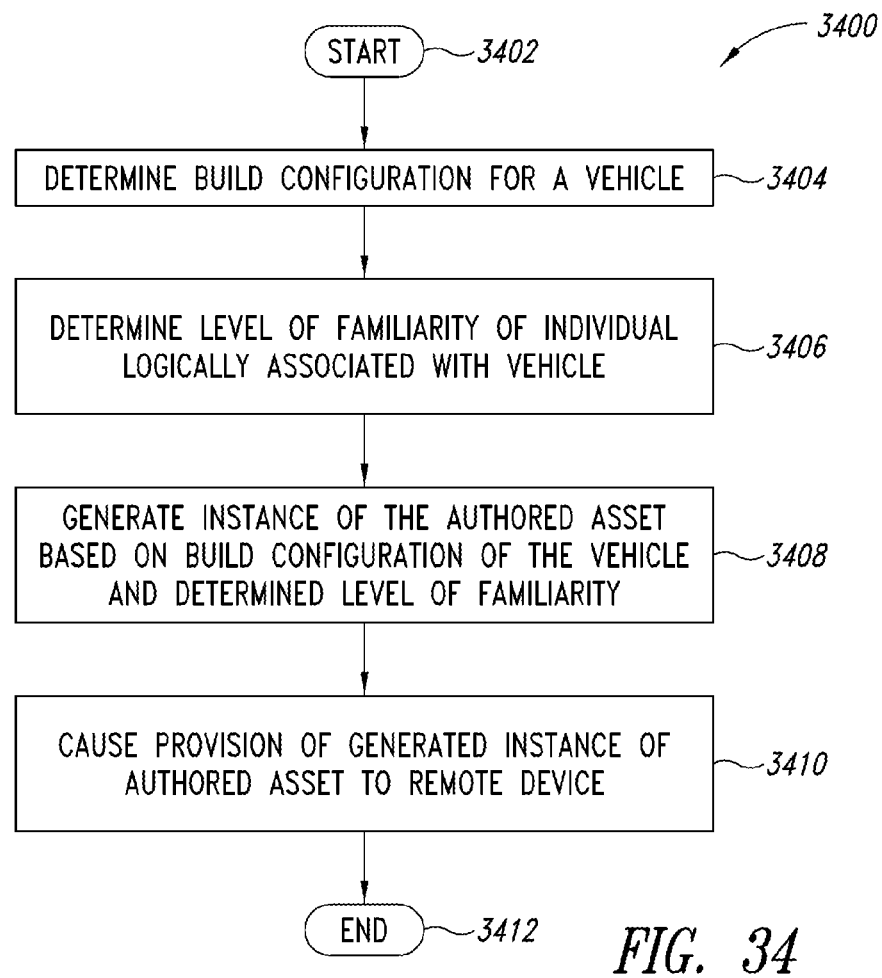
FIG. 34 is a high-level flow diagram of a method of identifying an individual's level of familiarity of with a vehicle and generating an instance of the authored asset on a remote device based on the identified level of familiarity, according to one non-limiting illustrated embodiment.

FIG. 34 shows a high level logic diagram 3400 for an example authored asset and delivery system such as the system 104 depicted in FIG. 1 useful for generating authored assets 122 based at least in part on an individual's level of familiarity with an item of manufacture 504. In at least some instances, an individual may obtain a degree of knowledge and/or familiarity with one or more items of manufacture 504. Such knowledge and/or familiarity may be based on interaction between the individual and the item of manufacture 504 in an industrial or commercial setting. Such knowledge and/or familiarity may be based on a personal interest in the item of manufacture on the part of the individual.

As described in detail herein, an asset authoring and delivery system 104, can advantageously generate electronic asset content objects 108 that include edited and formatted data representative of printed and electronic publications logically associated with a particular component 302, components 302a-302n, and/or an item of manufacture 504. As generated by the asset authoring and delivery system 104, each asset content object 108 contains information edited to focus on a particular operational or maintenance aspect of a component 302, components 302a-302n, and/or an item of manufacture 504. The asset authoring and delivery system 104 advantageously combines these asset content objects 108 using the build configuration associated with a particular item 504. Thus, the manufacturer is able to combined asset content objects 108 according to logical rules to generate authored assets 122 such as "custom" sets of user guides and manuals tailored to an individual item of manufacture 504. The asset authoring and delivery system 104 can dynamically create and deliver such asset content objects 122 to one or more remote devices 118 autonomously (e.g., on a defined, regular, periodic, or intermittent basis) or upon receipt of a request from one or more remote devices 118.

In some instances, the asset authoring and delivery system 104 can autonomously generate and deliver authored assets 122 such as "custom" sets of Owner's Guides and Maintenance Manuals custom assembled for and logically associated with an individual item of manufacture 504 to remote devices 118 for local storage. Such an arrangement advantageously eliminates the need for a "live" connection to the asset authoring and delivery system 104 to receive the authored asset 122. Such an arrangement also permits the manufacturer 502 to periodically or intermittently issue updates, patches, upgrades, and the like to the locally stored authored assets 122. Thus, the time and expense of providing up-to-date authored assets 122 in the form of Owner's Guides and Maintenance Manuals is significantly reduced and the reliability of information contained therein increased.

One or more remote devices 118 can be logically associated with each item of manufacture 504. One or more items of manufacture 504 can be logically associated with a single remote device 118. In some implementations, an owner and/or user of the item of manufacture 504 logically associates the one or more remote devices with a particular item 504. In other implementations, asset authoring and delivery system 104 forms the logical association between a particular remote device 118 and a particular item of manufacture 504 (e.g., a head unit in a vehicle). In at least some implementations, a remote device 118 can communicate or otherwise forward all or a portion of the authored asset to another device, for example a device logically associated with the recipient remote device 118 through one or more relationships external to the asset authoring and delivery system 104 (e.g., a Facebook "friend"). The asset authoring and delivery system 104 can store data indicative of the logical association between a particular item of manufacture 504 and one or more remote devices 118 in one or more communicably coupled data stores or data bases.

Authored assets 122 can include comprehensive documents such as Owner's Guides and Maintenance Manuals associated with a particular make and model of item of manufacture 504 or a specific item of manufacture 504. However, authored assets 122 may also be directed to specific topics such as a particular maintenance or operating procedure. For example, a vehicle operator may be interested in using the vehicle entertainment system and requests the Owner's Guide on the head unit in the vehicle. Responsive to the request and based on received data indicative of the vehicle operator's interaction with the entertainment system, the asset authoring and delivery system 104 may generate, format, and transmit an authored asset 122 including asset content objects 108 logically related to only entertainment system components rather than asset content objects 108 related to the entire Owner's Guide.

In at least some implementations, the asset authoring and delivery system 104 can generate one or more authored assets 122 based at least in part on a determined level of user familiarity with the item of manufacture 504. In some such instances, the authored asset 122 may contain a greater level of detail to satisfy the user's thirst for knowledge on the item of manufacture 504. In other such instances, the authored asset may contain a lesser level of detail in which basic information of which the asset authoring and delivery system 104 suppresses or otherwise omits information of which the user is already aware. The method of generating authored assets 122 using asset content objects 108 selected based upon the user's level of knowledge and/or familiarity with the item of manufacture begins at 3402.

At 3404, the asset authoring and delivery system 104 determines the build configuration 116 of a particular item of manufacture 504. The build configuration 116 includes data indicative of some or all of the components 302 used in an item of manufacture 504. In at least some implementations, an item identifier 162, such as a model number, serial number, model/serial number, vehicle identification number, etc., is logically associated an item of manufacture 504. In one or more build configuration data stores or databases 118, the item identifier 162 is logically associated with any number of component identifiers 152a-152n logically associated with a corresponding component 302a-302n included in the item of manufacture 504.

In at least some instances, the asset authoring and delivery system 104 can receive an item identifier 162 logically associated with a particular item of manufacture 504. Using the received item identifier 162, the asset authoring and delivery system 104 can retrieve or otherwise obtain the build configuration 116 for an item 504 from one or more build configuration data stores or databases 184. In at least some instances, the asset authoring and delivery system 104 can retrieve or otherwise obtain the build configuration 116 corresponding to a particular item identifier 162 using the item identifier 162 as an index to search the one or more build configuration data stores or databases 184. The one or more build configuration data stores or databases 184 contain data indicative of build configurations 116 for some or all of the items of manufacture 504 produced by the manufacturer 502. For example, an enterprise business system, inventory management system, or supply chain management system may include one or more build configuration data stores or databases 184, each containing build configurations 116 indexed by item identifiers 162. Each of such build configurations 116 can include component identifiers 152a-152n logically associated with corresponding components 302a-302n included in the item of manufacture 504. The build configuration 116 for a particular item of manufacture 504 may include one or more manufacturer supplied components 302a-302n, one or more dealer/retailer/distributor supplied components 302a-302n, one or more aftermarket supplied components 302a-302n, or combinations thereof.

At 3406, the asset authoring and delivery system 104 determines a level of user familiarity with an item of manufacture 504. In at least some instances, the asset authoring and delivery system 104 can determine the level of a user's familiarity with an item of manufacture 504 using data supplied by the user of the item 504 via at least one of: the item of manufacture 504, one or more remote devices 118, one or more electronic devices communicably coupled to the item of manufacture 504 and/or remote device 118, or combinations thereof. In some instances, the asset authoring and delivery system 104 may provide an authored asset 122 in the form of an assessment to the user to determine the level of a user's familiarity with the item of manufacture 504. In other instances, one or more external system or devices such as an enterprise management system operated by the manufacturer 502 or another manufacturer or academic institution (e.g., a technical college that provides training on the item of manufacture 504) can provide data indicative of the user's level of familiarity with the item of manufacture 504.

At 3408, the asset authoring and delivery system 104 generates one or more authored assets 122 based at least in part on the retrieved build configuration 116 of an item of manufacture 504 and based at least in part on the determined level of user familiarity with the item of manufacture 504 identified at 3406. In at least some instances, each component identifier 152 is logically associated with a number of asset content objects 108. As previously discussed, the asset content objects 108 can each include information related to a particular component, feature, device, system, or sub-system included with a particular item of manufacture 504 or a particular class of item of manufacture 504. In at least some instances, the asset authoring and delivery system 104 includes one or more asset content object data stores or databases 154. In at least some instances, the asset authoring and delivery system 104 can retrieve or otherwise obtain the asset content objects 108 corresponding to a particular component identifier 152 logically related to the particular component, feature, device, system, or sub-system included with a particular item 504 or a particular class of items 504. The asset authoring and delivery system 104 may retrieve such asset content objects 108 using the component identifier 152 as an index to search the one or more asset content object data stores or databases 154. For example, an enterprise business system, inventory management system, or supply chain management system may include one or more asset content object data stores or databases 154, indexed by component identifiers 152 and containing a number of asset content objects 108a-108n logically associated with each of the component identifiers.

The asset authoring and delivery system 104 generates one or more authored assets 122 that each contain a number of asset content objects 108 logically associated with one or more components, devices, systems, or sub-systems included in the build configuration 116 that is logically associated with the particular item 504 or with the particular class of items 504. Additionally, the asset authoring and delivery system 104 can include in the one or more authored assets 122 a number of asset content objects 108 that are selected based at least in part on the determined level of user familiarity with the particular item 504 or the particular class of items 504. For example, an asset content object 108 intended for first individual having an ADVANCED level of familiarity with a particular vehicle or automotive system may be included in an authored asset 122 communicated to a remote device associated with the first individual, but would not be included in an authored asset 122 communicated to a second individual having a BEGINNER level of familiarity with the particular vehicle or automotive system.

At 3410, the asset authoring and delivery system 104 communicates the generated authored asset 122 including asset content objects 108 selected based at least in part on the user's familiarity with the item of manufacture 504 to one or more recipient remote devices 118. The determined recipient remote device 108 then generates an instance of the authored asset 122 using the data communicated by the asset authoring and delivery system 104. The presentation and display capabilities can vary from one remote device 118 to another. In at least some implementations, the asset authoring and delivery system 104 can format the authored asset 122 for presentation on one or more particular remote devices 118. For example, the asset authoring and delivery system 104 may provide a content rich authored asset 118 to a remote device having significant computational resources such as a personal computer or vehicular head unit. Conversely, the asset authoring and delivery system 104 may provide a content lean authored asset 118 to a remote device having more limited computational resources such as a smartphone, wearable computer, or personal digital assistant. The method 3400 concludes at 3412.

Figure 35:
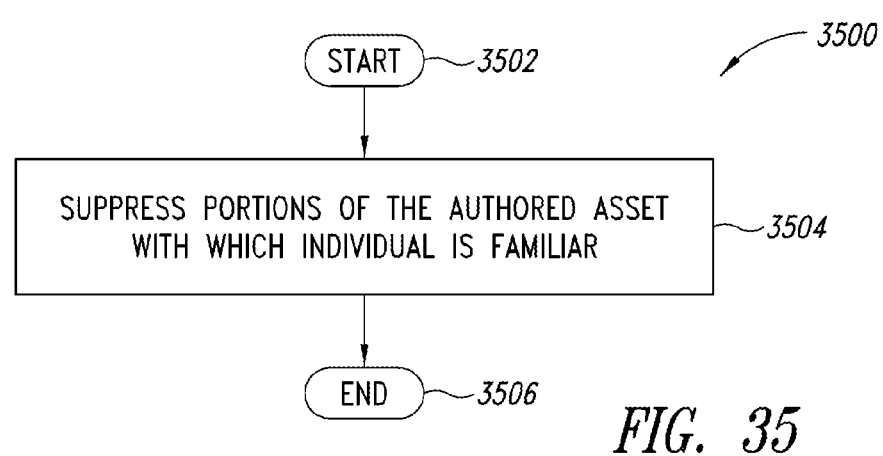
FIG. 35 is a flow diagram of a method of generating an authored asset on a remote device based using the individual's determined level of familiarity of the individual based on suppressing those portions of the authored asset with which an individual is familiar, according to one non-limiting illustrated embodiment.

FIG. 35 shows a logic diagram 3500 for an example authored asset and delivery system 104 capable of generating a number of authored assets 122 that includes asset content objects 108 selected based at least in part on a user's determined level of familiarity with an item of manufacture 504. In at least some instances, the asset authoring and delivery system 104 receives one or more inputs including data indicative of a particular user's level of familiarity with one or more aspects of a particular item of manufacture 504 or a particular class of item of manufacture 504. Based on the build configuration 116 and the determined level of familiarity with the particular item of manufacture 504 or a particular class of item of manufacture 504, the asset authoring and delivery system 104 can select asset content objects 108 for inclusion in authored assets 122. Further, the asset authoring and delivery system 104 can suppress or omit the inclusion of all or a portion of one or more asset content objects 108 in one or more authored assets 122 based on the determined level of familiarity with the particular item of manufacture 504 or a particular class of item of manufacture 504.

For example, responsive to receiving data indicative of a first user's high degree of familiarity with fueling a vehicle, the asset authoring and delivery system 104 may suppress the inclusion of all or a portion of one or more asset content objects 108 related to fueling the vehicle from one or more authored assets 122 delivered to one or more remote devices 118 associated with the first user. However, if federal law requires user's be notified of the health and safety risks of gasoline, the asset authoring and delivery system 104 can include at least a portion of at least one asset content object 108 containing such health and safety information with the authored asset 122 delivered to one or more remote devices 118 associated with the first user even though information on fueling the vehicle is suppressed or omitted.

The method of generating authored assets 122 in which the asset authoring and delivery system 104 suppresses or otherwise omits at least a portion of one or more asset content objects 108 that are determined familiar to the item user commences at 3502.

At 3504, the asset authoring and delivery system 104 suppresses or otherwise alters all or a portion of one or more authored assets 122 based at least in part on a determined user familiarity with the suppressed or omitted portions. The asset authoring and delivery system 104 can format the altered authored asset 122 for display on one or more remote devices 118 associated with the user and communicate the formatted altered authored asset to the one or more remote devices 118. The method of generating authored assets 122 in which portions of the authored asset 122 are suppress or otherwise altered based at least in part on a determined user familiarity with the item of manufacture 504 concludes at 3506.

Figure 36:
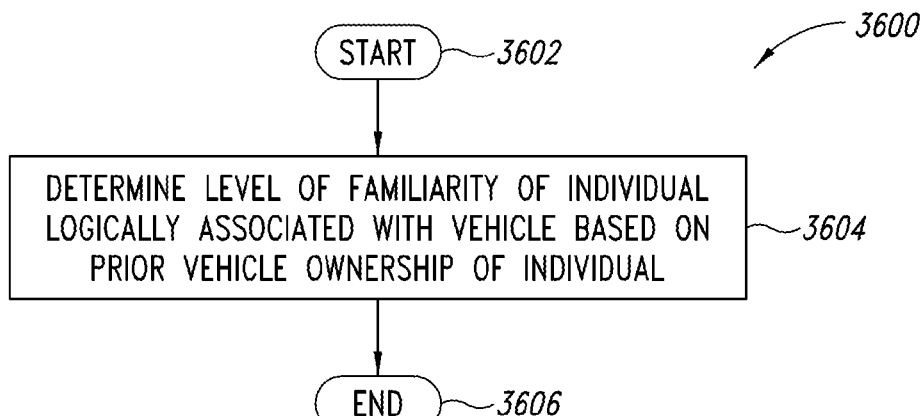
FIG. 36 is a flow diagram of a method of generating an authored asset on a remote device based using the determined level of familiarity of the individual based on prior vehicle ownership of an individual, according to one non-limiting illustrated embodiment.

FIG. 36 shows a logic diagram 3600 for an example authored asset and delivery system 104 that generates a number of authored assets 122 containing asset content objects 108 selected at least in part using data indicative of prior items owned by the user of an item of manufacture 504. In at least some instances, the asset authoring and delivery system 104 receives one or more inputs indicative prior items 504 owned by the user of an item of manufacture 504. Such data indicative of prior items owned by the user of an item of manufacture 504 may be provided to the asset authoring and delivery system 104 via one or more remote devices 118; via the item of manufacture 504; via one or more electronic devices communicably coupled to at least one of the one or more remote devices 118 and/or item of manufacture 504; or via one or more external electronic devices communicably coupled to the asset authoring and delivery system 104. In at least some instances, the asset authoring and delivery system 104 generates asset content objects 122 based at least in part on the build configuration of the item 504 and based at least in part on and prior items 504 owned by or otherwise associated with the user.

Prior items owned by or otherwise associated with a user of an item of manufacture 504 can provide an indication of the level of knowledge, experience, and/o item familiarity the user may possess. With an indication of the level of knowledge, experience, and/or familiarity of the user of the item 504, the asset authoring and delivery system 104 can generate authored assets 122 that include asset content objects reflective of the user's level of knowledge and experience. Responsive to the receipt of the data indicative of a user's prior ownership of one or more items 504, the asset authoring and delivery system 104 can select asset content objects 108 based at least in part on the determined degree of familiarity of the item user with a particular item 504 or class of items 504. The asset authoring and delivery system 104 can generate one or more authored assets 122 using the selected asset content objects 108 and communicate the generated authored assets 122 to one or more remote devices 108 logically associated with the user. The method of generating authored assets 122 using asset content objects 108 selected based on the build configuration 116 of the item and based on the prior item ownership history of the user of the item 504 commences at 3602.

At 3604, the asset authoring and delivery system 104 receives at least one input containing data indicative of a determined prior item ownership history associated with a particular user of the item of manufacture 504. The asset authoring and delivery system 104 generates one or more authored assets 122 using asset content objects 108 selected at least in part based on the build configuration 116 associated with a particular item 504 or class of items 504 and based at least in part on the received data indicative of the user's item ownership history. In at least some instances, such asset content objects 108 may include data indicative of sales, special offers, coupons, promotional offers and the like logically associated with or related to the identified topic of interest. In some instances, the asset authoring and delivery system 104 may select asset content objects 108 that include instructional materials, training documents, and the like. In at least some instances, the asset authoring and delivery system 104 can use social media data acquired from one or more other users of similar or identical items 504 to select such asset content objects 108. For example, one asset content object may include a crowd-sourced informational or instructional video produced by an individual sharing a similar level of item ownership experience with the item user. The method of generating authored assets 122 using asset content objects 108 selected based on the build configuration 116 of the item and the prior item ownership history of the user concludes at 3606.

Figure 37:
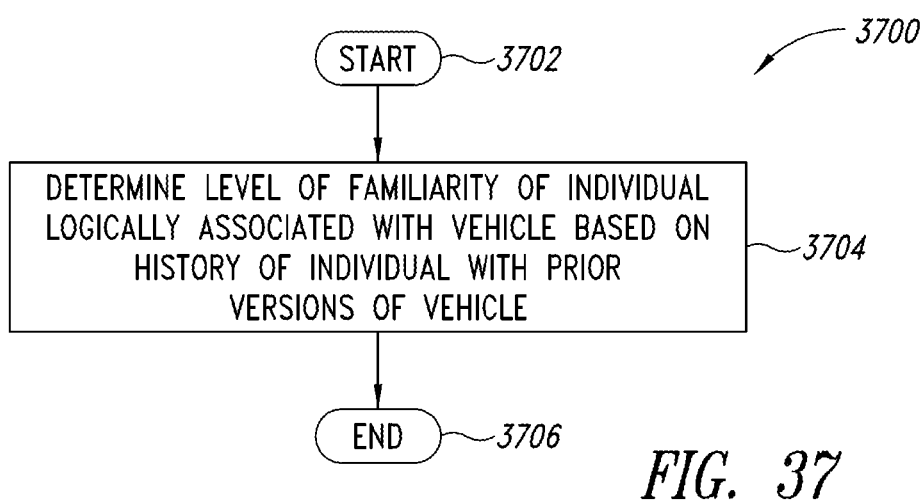
FIG. 37 is a flow diagram of a method of generating an authored asset on a remote device based using the determined level of familiarity of the individual based on the history of the individual with prior versions of the same vehicle, according to one non-limiting illustrated embodiment.

FIG. 37 shows a logic diagram 3700 for an example authored asset and delivery system 104 capable of generating a number of authored assets 122 based at least in part on differences or changes between the current item 504 and one or more prior versions of the same item owned by or associated with the user. In at least some instances, the asset authoring and delivery system 104 receives one or more inputs indicative of differences or changes between the current item 504 and one or more prior versions of the same item owned by or associated with the user. Data indicative of such evolutionary changes between items may be provided to the asset authoring and delivery system 104 via one or more remote devices 118; via the item of manufacture 504; via one or more electronic devices communicably coupled to at least one of the one or more remote devices 118 and/or item of manufacture 504; or via one or more external electronic devices communicably coupled to the asset authoring and delivery system 104. In at least some instances, the asset authoring and delivery system 104 generates asset content objects 122 based at least in part on the build configuration of the item 504 and based at least in part on differences or changes between the current item 504 and one or more prior versions of the same item owned by or associated with the user.

Identifying differences or changes between the current item 504 and one or more prior versions of the same item owned by or associated with the user provides an indication of the level of knowledge, experience, and/or familiarity with the item possessed by the user. With a knowledge of the changes existent between the current item 504 an prior versions of the same item owned by or associated with the user, the asset authoring and delivery system 104 can generate authored assets 122 that include asset content objects reflective of the user's level of knowledge, experience, and/or familiarity with the components 302, devices, systems, and sub-systems included in the current item of manufacture 504. The method of generating authored assets 122 using asset content objects 108 selected based on changes between the current item 504 and prior versions of the same item owned by the user commences at 3702.

At 3704, the asset authoring and delivery system 104 receives at least one input that includes data indicative changes between the current item 504 and prior versions of the same item owned by the user. Responsive to receipt of the data indicative of the changes between versions of the item, the asset authoring and delivery system 104 selects asset content objects 108 logically related to the determined differences or changes for inclusion in one or more authored assets 122. Such asset content objects 108 may highlight, discuss, or otherwise elaborate on the changes that exist between prior versions of the item of manufacture and the current item of manufacture 504. Such an approach advantageously permits a user who is familiar with the overall item and interested in viewing information related to changes made between item models or between model years to review one or more concise authored assets 122 that each include information relevant to the changes in components, devices, systems, and sub-systems included in the item 504.

The asset authoring and delivery system 104 generates one or more authored assets 122 using asset content objects 108 selected at least in part based on the build configuration 116 associated with a particular item or class of items and based at least in part on data indicative of changes existent between prior versions of the item of manufacture and the current item of manufacture 504. In some instances, the asset authoring and delivery system 104 may select asset content objects 108 that include instructional materials, training documents, and the like. In at least some instances, the asset authoring and delivery system 104 can use social media data acquired from one or more other users of similar or identical items 504 or former owners of one or more prior versions of the item of manufacture to select such asset content objects 108. For example, one asset content object may include a crowd-sourced informational or instructional video produced by an individual sharing a similar level of item ownership experience with the item user. The method of generating authored assets 122 using asset content objects 108 selected based at least in part on the build configuration 116 of the item and based at least in part on determined changes that exist between prior versions of the same item and the current item of manufacture 504 concludes at 3706.

Figure 38:
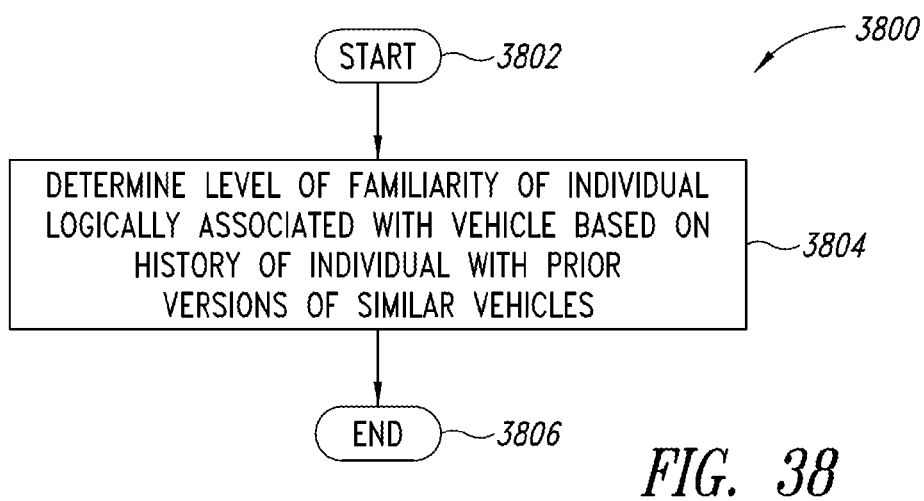
FIG. 38 is a flow diagram of a method of generating an authored asset on a remote device based using the determined level of familiarity of the individual based on the history of the individual with prior versions of similar vehicles, according to one non-limiting illustrated embodiment.

FIG. 38 shows a logic diagram 3800 for an example authored asset and delivery system 104 capable of generating a number of authored assets 122 based at least in part on differences or changes between the current item 504 and one or more similar items owned by or associated with the user. In at least some instances, the asset authoring and delivery system 104 receives data indicative of the differences or changes between the current item 504 and one or more similar items owned by or associated with the user. Data indicative of such changes between items may be provided to the asset authoring and delivery system 104 via one or more remote devices 118; via the item of manufacture 504; via one or more electronic devices communicably coupled to at least one of the one or more remote devices 118 and/or item of manufacture 504; or via one or more external electronic devices communicably coupled to the asset authoring and delivery system 104. In at least some instances, the asset authoring and delivery system 104 generates asset content objects 122 based at least in part on the build configuration of the item 504 and based at least in part on differences or changes between the current item 504 and one or more similar items owned by or associated with the user.

Identifying differences or changes between the current item 504 and one or more similar items owned by or associated with the user provides an indication of the level of knowledge, experience, and/or familiarity with the item possessed by the user. With a knowledge of the differences or changes existent between the current item 504 and similar items owned by or associated with the user, the asset authoring and delivery system 104 can generate authored assets 122 that each include asset content objects 108 reflective of the user's level of knowledge, experience, and/or familiarity with the components 302, devices, systems, and sub-systems included in the current item of manufacture 504. The method of generating authored assets 122 using asset content objects 108 selected based on changes between the current item 504 and one or more similar items owned by the user commences at 3802.

At 3804, the asset authoring and delivery system 104 receives at least one input that includes data indicative changes between the current item 504 and prior versions of the same item owned by the user. Responsive to receipt of the data indicative of the changes between the item of manufacture 504 and similar items owned by or associated with the user, the asset authoring and delivery system 104 selects asset content objects 108 for inclusion in one or more authored assets 122. Such asset content objects 108 may highlight, discuss, or otherwise elaborate on the changes that exist between the item of manufacture 504 and similar items of manufacture owned by or associated with the user. Such an approach advantageously permits the asset authoring and delivery system 104 to generate one or more authored assets 122 containing asset content objects 108 related to the determined differences between the item 504 and the similar items owned by or associated with the user. These authored assets 122 containing information relevant to the changes in components, devices, systems, and sub-systems included in the item 504 are delivered by the asset authoring and delivery system 104 to one or more remote devices 118 logically associated with the user.

In some instances, the asset authoring and delivery system 104 may select asset content objects 108 that include instructional materials, training documents, and the like. In at least some instances, the asset authoring and delivery system 104 can use social media data acquired from one or more other users of similar or identical items 504 or former owners of one or more prior versions of the item of manufacture to select such asset content objects 108. For example, one asset content object may include a crowd-sourced informational or instructional video produced by an individual sharing a similar level of item ownership experience or ownership or association with similar items of manufacture with the item user. The method of generating authored assets 122 using asset content objects 108 selected based at least in part on the build configuration 116 of the item and based at least in part on determined changes that exist between similar items owned by or associated with the user and the current item of manufacture 504 concludes at 3806.

Figure 39:
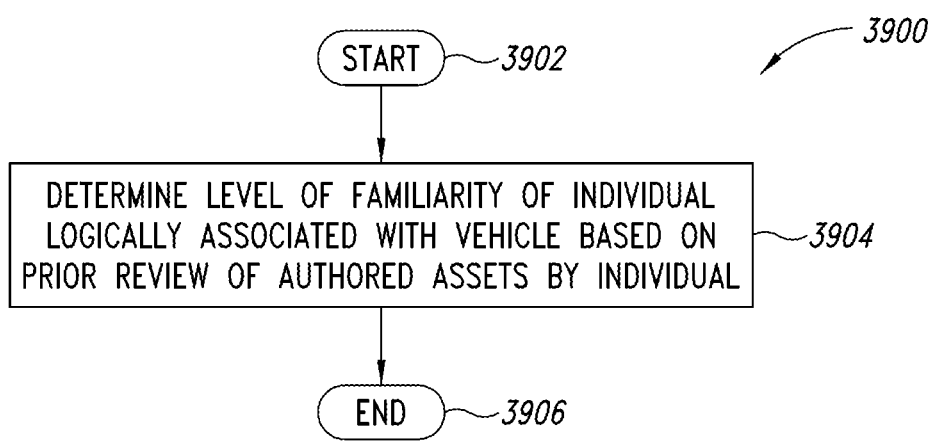
FIG. 39 is a flow diagram of a method of generating an authored asset on a remote device based using the determined level of familiarity of an individual based on the individual's prior review of authored assets, according to one non-limiting illustrated embodiment.

FIG. 39 shows a logic diagram 3800 for an example authored asset and delivery system 104 capable of generating a number of authored assets 122 using a determined level of user familiarity with the item of manufacture 504 based at least in part on the user's prior review of one or more logically related authored assets 122. In at least some instances, the asset authoring and delivery system 104 receives data indicative of the determined level of user familiarity with the item of manufacture 504 based at least in part on the user's prior review of one or more logically related authored assets 122. Data indicative of the determined level of user familiarity with the item of manufacture 504 based at least in part on the user's prior review of one or more logically related authored assets 122 may be provided to the asset authoring and delivery system 104 via one or more remote devices 118; via the item of manufacture 504; via one or more electronic devices communicably coupled to at least one of the one or more remote devices 118 and/or item of manufacture 504; or via one or more external electronic devices communicably coupled to the asset authoring and delivery system 104. In at least some instances, the asset authoring and delivery system 104 generates asset content objects 122 based at least in part on the build configuration of the item 504 and based at least in part on the determined level of user familiarity with the item of manufacture 504 based at least in part on the user's prior review of one or more logically related authored assets 122. The method of generating authored assets 122 using asset content objects 108 selected based at least in part on the determined level of user familiarity with the item of manufacture 504 based at least in part on the user's prior review of one or more logically related authored assets 122 commences at 3902.

At 3904, the asset authoring and delivery system 104 receives at least one input that includes data indicative of the level of user familiarity with a particular item of manufacture 504 or a particular class of item of manufacture based in whole or in part on authored assets 122 previously viewed by the user of the item of manufacture 504. Responsive to the determined level of user familiarity, the asset authoring and delivery system 104 selects asset content objects 108 not previously viewed by the user but logically related to the identified topic of interest for inclusion in one or more authored assets 122. Such an approach advantageously adjusts the content of the authored assets 12 to reflect the user's level of familiarity and eliminates the need to "flip through" previously viewed authored assets 122 to access those authored assets 122.

The asset authoring and delivery system 104 generates one or more authored assets 122 using asset content objects 108 selected at least in part based on the build configuration 116 associated with a particular item or class of items and based at least in part on data indicative of the user's level of familiarity with the item 504 based on previously viewed authored assets 122. In some instances, the asset authoring and delivery system 104 may select asset content objects 108 that include instructional materials, training documents, interactive training materials, and the like. In at least some instances, the asset authoring and delivery system 104 can select additional asset content objects 108 or generate additional authored assets 122 based on the recommendations or other data provided by other users of the item of manufacture 504. The method of generating authored assets 122 using asset content objects 108 selected based at least in part on a level of user familiarity with the item based on authored assets previously viewed by the user concludes at 3906.

Figure 40:
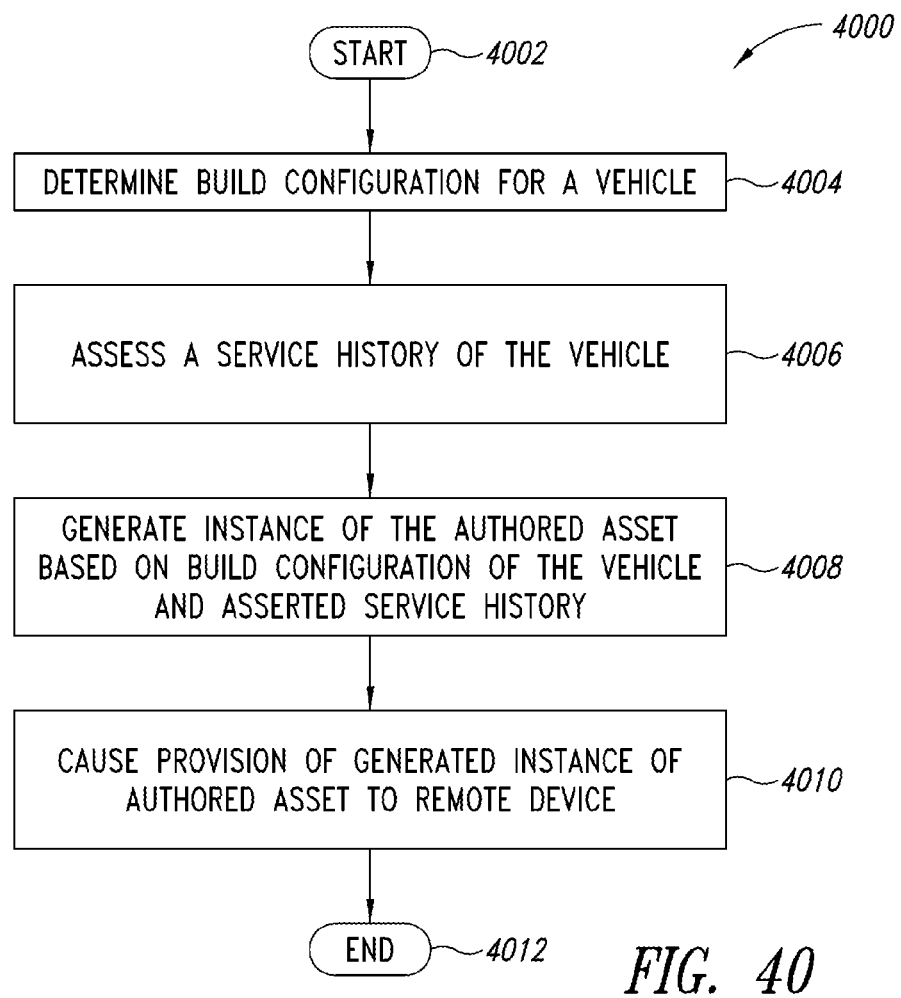
FIG. 40 is a high-level flow diagram of a method of generating an instance of the authored asset on a remote device based on the build configuration of a vehicle and a service history associated with the vehicle, according to one non-limiting illustrated embodiment.

FIG. 40 shows a high level logic diagram 4000 for an example authored asset and delivery system 104 that generates a number of authored assets 122 including asset content objects 108 logically associated with a topic of interest identified at least in part using a service history associated with an item of manufacture 504. In at least some instances, the asset authoring and delivery system 104 receives one or more inputs indicative of the service history associated with a particular item of manufacture 504. Such a service history input may be provided to the asset authoring and delivery system 104 via one or more remote devices 118, via the item of manufacture 504, or via one or more electronic devices communicably coupled to at least one of the one or more remote devices 118 and/or item of manufacture 504 and/or one or more external electronic devices communicably coupled to the asset authoring and delivery system 104. In at least some instances, the asset authoring and delivery system 104 generates asset content objects 122 based at least in part on the build configuration 116 of the particular item 504 and based at least in part on the received data indicative of the service history associated with the particular item 504.

For example, a service history stored on a dealership enterprise data system indicates brake pads on a particular vehicle have historically been replaced every 25,000 miles (e.g., at 25,000 miles and at 50,000 miles). At 70,000 miles, the asset authoring and delivery system 104 may autonomously generate one or more prospective authored assets 122 containing asset content objects 108 related to the projected upcoming brake pad replacement. Such authored assets 122 may include asset content objects in the form of brake pad coupons or offers provided by the dealership in addition to asset content objects related to the braking system of the vehicle.

As described in detail herein, an asset authoring and delivery system 104, can advantageously generate electronic asset content objects 108 that include edited and formatted data representative of printed and electronic publications logically associated with a particular component 302, components 302a-302n, and/or an item of manufacture 504. As generated by the asset authoring and delivery system 104, each asset content object 108 contains information edited to focus on a particular operational or maintenance aspect of a component 302, components 302a-302n, and/or an item of manufacture 504. The asset authoring and delivery system 104 advantageously selects and combines these asset content objects 108 using the build configuration 116 associated with a particular item 504. Thus, the item manufacturer 502 is able to combine asset content objects 108 according to logical rules to generate authored assets 122 such as "custom" sets of user guides and manuals tailored to an individual item of manufacture 504. The asset authoring and delivery system 104 can dynamically and autonomously create and deliver such asset content objects 122 to one or more remote devices 118 on a defined, regular, periodic, or intermittent basis or upon receipt of a request from one or more remote devices 118.

In some instances, the asset authoring and delivery system 104 can autonomously generate, deliver, and store on one or more remote devices 118 one or more authored assets 122 such as "custom" sets of Owner's Guides and Maintenance Manuals custom assembled for and logically associated with a particular item of manufacture 504. Such local storage of authored assets 122 advantageously eliminates the need for a "live" connection to the asset authoring and delivery system 104. Such an arrangement also permits the manufacturer 502 to periodically or intermittently issue updates, patches, upgrades, and the like to the locally stored authored assets 122. Thus, the time and expense of providing up-to-date authored assets 122 in the form of owner's guides and maintenance manuals is significantly reduced and the reliability and accuracy of information contained therein improved.

One or more remote devices 118 can be logically associated with each item of manufacture 504. One or more items of manufacture 504 can be logically associated with a single remote device 118. In some implementations, an owner and/or user of the item of manufacture 504 logically associates the one or more remote devices with a particular item 504. In other implementations, asset authoring and delivery system 104 forms the logical association between a particular remote device 118 and a particular item of manufacture 504 (e.g., a head unit in a vehicle). In at least some implementations, a remote device 118 can communicate or otherwise forward all or a portion of the authored asset to another device, for example a device logically associated with the recipient remote device 118 through one or more relationships external to the asset authoring and delivery system 104 (e.g., a Facebook "friend"). The asset authoring and delivery system 104 can store data indicative of the logical association between a particular item of manufacture 504 and one or more remote devices 118 in one or more communicably coupled data stores or data bases.

Authored assets 122 can include comprehensive documents such as Owner's Guides and Maintenance Manuals associated with a particular make and model of item of manufacture 504 or a specific item of manufacture 504. However, authored assets 122 may also be directed to specific topics such as a particular maintenance or operating procedure. For example, a vehicle operator may be interested in using the vehicle entertainment system and requests the Owner's Guide on the head unit in the vehicle. Responsive to the request and based on received data indicative of the vehicle operator's interaction with the entertainment system, the asset authoring and delivery system 104 may generate, format, and transmit an authored asset 122 including asset content objects 108 logically related to only entertainment system components rather than asset content objects 108 related to the entire Owner's Guide.

In at least some implementations, the asset authoring and delivery system 104 can generate one or more authored assets 122 based at least in part on a determined service history associated with a particular item of manufacture 504. The use of the determined service history in selecting asset content objects 108 for inclusion in one or more authored assets 122 offers several advantages. In some instances, one or more authored assets 122 may provide information on the importance of a service procedure or the possible consequences of delaying a service procedure to a remote device 118 logically associated with an item 504 on which one or more service procedures have not been performed. In other instances, one or more authored assets 122 may provide coupons, promotional offers, or discounts for retailers such as automotive dealers or service centers offering to perform service work. In yet other instances, the one or more authored assets 122 may provide instructions in the form of text, audio, video, or A/V presentations that instruct the user of the item 504 in performing at least a portion of the service work (e.g., inflating tires to an appropriate air pressure). The method of generating authored assets 122 using asset content objects 108 selected based upon a determined service history associated with the item of manufacture 504 begins at 4002.

At 4004, the asset authoring and delivery system 104 determines the build configuration 116 of a particular item of manufacture 504. The build configuration 116 includes data indicative of some or all of the components 302 used in an item of manufacture 504. In at least some implementations, an item identifier 162, such as a model number, serial number, model/serial number, vehicle identification number, etc., is logically associated an item of manufacture 504. In one or more build configuration data stores or databases 118, the item identifier 162 is logically associated with any number of component identifiers 152a-152n logically associated with a corresponding component 302a-302n included in the item of manufacture 504.

In at least some instances, the asset authoring and delivery system 104 can receive an item identifier 162 logically associated with a particular item of manufacture 504. Using the received item identifier 162, the asset authoring and delivery system 104 can retrieve or otherwise obtain the build configuration 116 for an item 504 from one or more build configuration data stores or databases 184. In at least some instances, the asset authoring and delivery system 104 can retrieve or otherwise obtain the build configuration 116 corresponding to a particular item identifier 162 using the item identifier 162 as an index to search the one or more build configuration data stores or databases 184. The one or more build configuration data stores or databases 184 contain data indicative of build configurations for some or all of the items of manufacture 504 produced by the manufacturer 502. For example, an enterprise business system, inventory management system, or supply chain management system may include one or more build configuration data stores or databases 184, each containing build configurations 116 indexed by item identifiers 162. Each of such build configurations 116 can include component identifiers 152a-152n logically associated with corresponding components 302a-302n present in the item of manufacture 504. The build configuration 116 for a particular item of manufacture 504 may include one or more manufacturer supplied components 302a-302n, one or more dealer/retailer/distributor supplied components 302a-302n, one or more aftermarket supplied components 302a-302n, or combinations thereof.

At 4006, the asset authoring and delivery system 104 receives at least one input that includes data indicative of the service history associated with a particular item of manufacture 504. One or more remote devices 118 logically associated with the item of manufacture 504, the item of manufacture 504, and/or the asset authoring and delivery system 104 may provide the item service history data. Responsive to the receipt of the determined service history of the particular item 504, the asset authoring and delivery system 104 selects asset content objects 108 logically related to the particular item 504. The asset authoring and delivery system 104 generates one or more authored assets 122 using the selected asset content objects 108. In at least some instances, such asset content objects 108 may include data indicative of sales, special offers, coupons, promotional offers and the like based at least in part on the determined service history of the particular item of manufacture 504.

At 4008, the asset authoring and delivery system 104 generates one or more authored assets 122 based at least in part on the retrieved build configuration 116 of an item of manufacture 504 and based at least in part on the determined service history associated with the item of manufacture 504 identified at 4006. In at least some instances, the asset authoring and delivery system 104 can retrieve or otherwise obtain the asset content objects 108 corresponding to a component identifier 152 included with item 504 or a particular class of items 504. The asset authoring and delivery system 104 may retrieve such asset content objects 108 using the component identifier 152 as an index to search the one or more asset content object data stores or databases 154. For example, an enterprise business system, inventory management system, or supply chain management system may include one or more asset content object data stores or databases 154, indexed by component identifiers 152 and containing a number of asset content objects 108a-108n logically associated with each of the component identifiers.

The asset authoring and delivery system 104 generates one or more authored assets 122 that each contain a number of asset content objects 108 logically associated with one or more components, devices, systems, or sub-systems included in the build configuration 116 that is logically associated with the particular item 504. Additionally, the asset authoring and delivery system 104 can include in the one or more authored assets 122 a number of asset content objects 108 that are selected based at least in part on the determined service history associated with the particular item 504.

At 4010, the asset authoring and delivery system 104 communicates the generated authored asset 122 to one or more recipient remote devices 118 associated with the item 504. The recipient remote device 108 then generates an instance of the authored asset 122 using the data communicated by the asset authoring and delivery system 104. In at least some implementations, the asset authoring and delivery system 104 can format the authored asset 122 for presentation on one or more particular remote devices 118. For example, the asset authoring and delivery system 104 may provide a content rich authored asset 118 to a remote device 118 having significant computational resources such as a personal computer or vehicular head unit. Conversely, the asset authoring and delivery system 104 may provide a content lean authored asset 118 to a remote device 118 having more limited computational resources such as a smartphone, wearable computer, or personal digital assistant. The method 4000 concludes at 4012.

Figure 41:
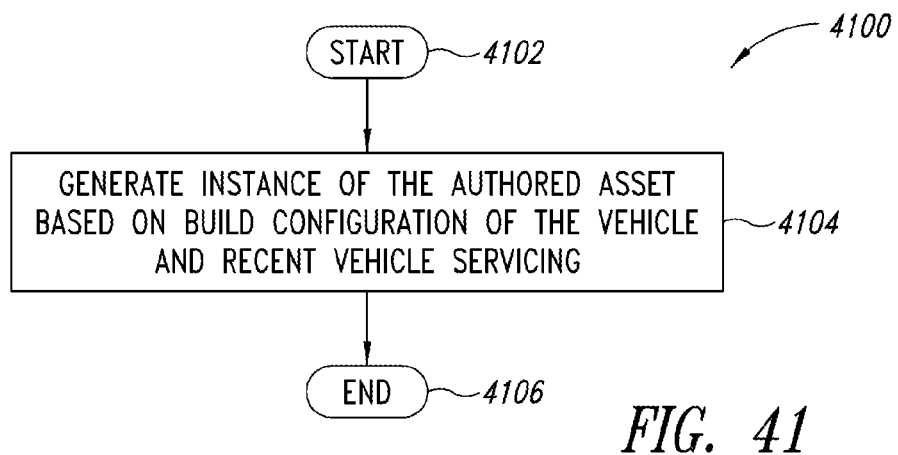
FIG. 41 is a flow diagram of a method of generating an authored asset on a remote device based on a build configuration of the vehicle and a recent servicing of the vehicle, according to one non-limiting illustrated embodiment.

FIG. 41 shows a logic diagram 4100 for an example authored asset and delivery system 104 capable of generating a number of authored assets 122 using the build configuration 116 associated with a particular item of manufacture 504, data indicative of a service history associated with the item 504, and data indicative of one or more recent service procedures performed on the item 504. In at least some instances, the asset authoring and delivery system 104 receives data indicative of the service history and one or more recent service procedures performed on the item of manufacture 504 from one or more external, communicably coupled, data stores or databases. In at least some instances, one or more auto dealer or service center enterprise business systems may store or otherwise retain one or more data stores or databases containing data indicative of an item service history and/or an item service procedure. In at least some instances, one or more manufacturer 502 enterprise business systems may store or otherwise retain one or more data stores or databases containing data indicative of an item service history and/or an item service procedure. In some instances, the user may provide all or a portion of data indicative of service history and/or service procedures to the asset authoring and delivery system 104. Data indicative of the service history or service procedures associated with a particular item 504 may be provided to the asset authoring and delivery system 104 via one or more remote devices 118; via the item of manufacture 504; via one or more electronic devices communicably coupled to at least one of the one or more remote devices 118 and/or item of manufacture 504; or via one or more external electronic devices communicably coupled to the asset authoring and delivery system 104. The method of generating authored assets 122 using asset content objects 108 selected based at least in part on the determined service history and/or service procedures associated with a particular item of manufacture 504 commences at 4102.

At 4104, the asset authoring and delivery system 104 receives at least one input that includes data indicative of the service history associated with and/or one or more service procedures performed on a particular item of manufacture 504. Responsive to the determined service history associated with and/or one or more service procedures performed on a particular item of manufacture 504, the asset authoring and delivery system 104 selects logically related asset content objects 108 for inclusion in one or more authored assets 122. Such an approach advantageously adjusts the asset content objects 108 included in the one or more authored assets 122. For example, responsive to receipt of data indicative of a front end alignment performed on a vehicle, the asset authoring and delivery system 104 can generate an authored asset 122 containing one or more asset content objects 108 describing the work performed; one or more asset content objects 108 teaching the user how to determine if the front end is properly aligned; and one or more asset content objects 108 teaching the user how to determine if the front end requires alignment.

In another example, the asset authoring and delivery system 104 can receive data indicative of a vehicle service history that does not indicate the completion of a front-end alignment on a particular vehicle. In response, the asset authoring and delivery system 104 can generate an authored asset 122 including one or more asset content objects 108 explaining the importance of a front-end alignment; one or more asset content objects 108 explaining the consequences (and costs) associated with not obtaining a front-end alignment; and one or more asset content objects 108 providing auto dealer location and appointment scheduling information.

The method of generating authored assets 122 using asset content objects 108 selected based at least in part on data indicative of the service history associated with and/or one or more service procedures performed on a particular item of manufacture 504 concludes at 4106.

Figure 42:
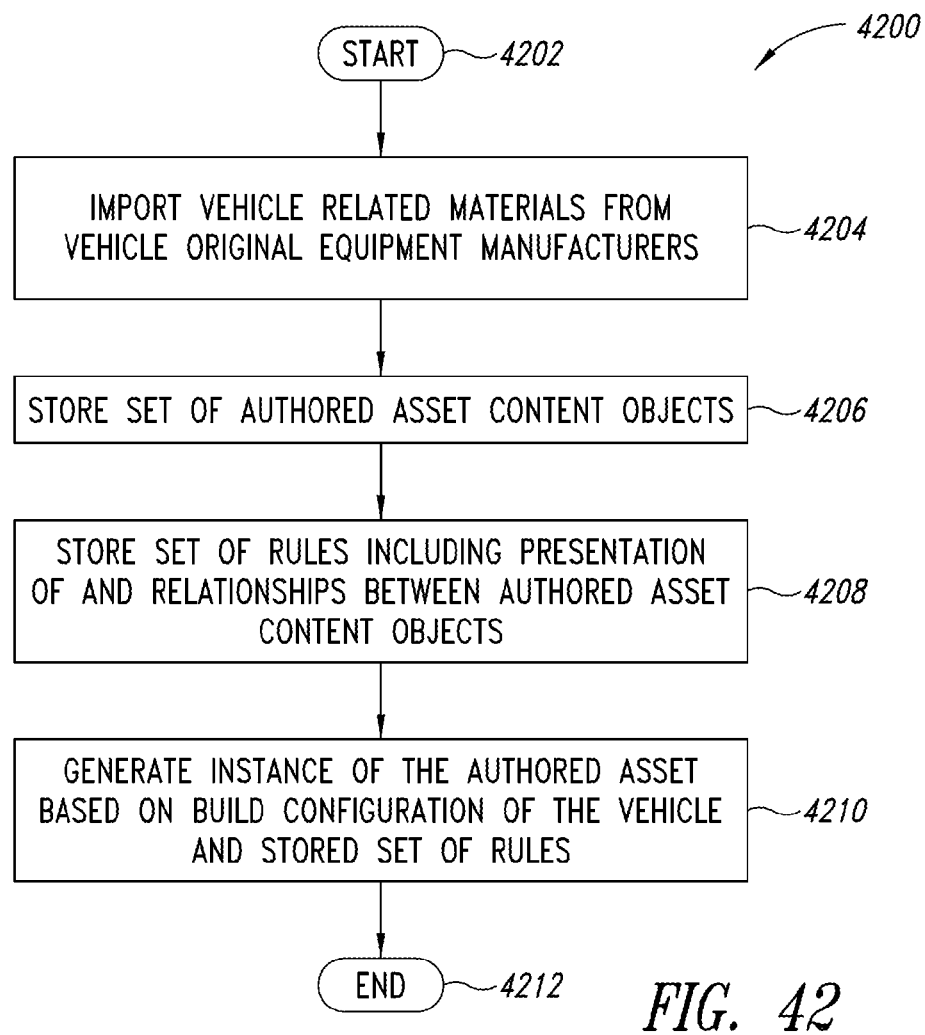
FIG. 42 is a high-level flow diagram of a method of generating an instance of the authored asset by importing data from vehicle original equipment manufacturers and presenting the authored asset in a format based on a set of rules including presentation and relationships between authored asset content objects, according to one non-limiting illustrated embodiment.

FIG. 42 shows a high level logic diagram 4200 for an example authored asset and delivery system 104 that generates a number of authored assets 122 including one or more asset content objects 108 generated using information 102 provided by one or more original equipment manufacturers ("OEMs") associated with an item of manufacture 504. The information 102 provided by the OEMs can include physical and/or electronic documentation. In at least some implementations, use of one or more OEM supplied components, devices, systems, and/or sub-systems causes the asset authoring and delivery system 104 to pull documentation from the OEM supplier. Such documentation pulls can be performed electronically, for example as a file transfer from one or more servers operated at the direction of the OEM or physically, for example as a transmitted request to forward physical documentation to the manufacturer 502 for incorporation into the asset authoring and delivery system 104.

In other instances, the provision of one or more components, devices, systems, and/or sub-systems by an OEM can cause the pushing of information 102 from the OEM supplier to the asset authoring and delivery system 104. Such documentation pushes can be performed electronically, for example as a file transfer between one or more servers operated at the direction of the OEM and the asset authoring and delivery system 104 or physically, for example as a forwarding of physical documentation from the OEM to the manufacturer 502 for incorporation into the asset authoring and delivery system 104.

In at least some implementations, the asset authoring and delivery system 104 assembles the asset content objects 108 into authored asset 122 using one or more sets of rules. Such sets of rules may include machine executable code providing logical relationships between various asset content objects 108. For example, one or more such rules may cause the display of the image asset content object 108a on a remote device 118 proximate the display of a caption asset content object 108b on the remote device 118.

Other rules may preclude the display of one or more asset content objects 108. For example, a first asset content object 108a can be associated with an OEM 6 cylinder vehicle engine offered as in a base model vehicle. A second asset content object 108b can be associated with an OEM 8 cylinder engine offered as an option in the base model vehicle. Since a single vehicle (i.e., item of manufacture 504) can only have one engine included on the build configuration 116, the selection or either the first asset content object 108a or the second asset content object 108b precludes the inclusion of the other asset content object in an authored asset 122 logically associated with the item of manufacture 504. Data representative of such sets of rules can be provided to the asset authoring and delivery system 104 by a manufacturer 502, one or more OEMs, one or more aftermarket equipment suppliers, or any combination thereof. In some instances, such sets of rules alter, adjust, control or otherwise affect the substantive content of one or more asset content objects 118 and/or one or more authored assets 122. In some instances, such sets of rules alter, adjust, control, or otherwise affect the presentation layout, style, format, or combinations thereof of one or more asset content objects 118 and/or one or more authored assets 122.

In at least some instances, a user of one or more remote devices 118 may provide sets of rules to the asset authoring and delivery system 104. Such user supplied sets of rules may include, but are not limited to: remote device 118 preferences; authored asset 122 content preferences; asset content object 108 preferences; authored asset delivery to vehicle driver and/or vehicle owner format, configuration, and preferences; and the like.

In at least some instances, one or more local, state, and/or federal agencies or rulemaking authorities may provide sets of rules to the asset authoring and delivery system 104. Such regulatory sets of rules may include, but are not limited to: required display of asset content objects 108 associated with human health; required display of asset content objects 108 associated with environmental protection; required font size and type for asset content objects 108 associated with governmental warnings and/or disclaimers; required format for audio, video, and A/V for asset content objects 108 associated with governmental warnings and/or disclaimers; and the like.

The method of generating authored assets 122 using asset content objects 108 provided as information from one or more OEMs, converted into one or more asset content objects 108, and assembled into one or more authored assets 122 according to one or more sets of rules begins at 4202.

At 4204, by the asset authoring and delivery system 104 receives information 102 from one or more OEMs. Such information 102 may be in physical format, electronic format, or any combination thereof. Such information 102 may include printed text, graphics, images, schematics, and drawings as well as electronic documents, graphics, images, schematics, drawings, audio files, video files, A/V files, and the like. In some instances, the OEM supplier can provide information 102 in the form of one or more asset content objects 108. In such instances, the asset content objects from a particular OEM supplier may be stored in a nontransitory storage medium under at least partial control of the OEM supplier. Such advantageously permits the OEM supplier to update the asset content objects 108 as changes and improvements are made in the products supplied to the manufacturer 502.

At 4206, the asset authoring and delivery system 104 stores the asset content objects 108 generated using the information supplied by the OEM suppliers. In at least some implementations, the asset authoring and delivery system 104 stores all or a portion of the generated asset content objects in one or more asset content object data stores or databases 154 on one or more communicably coupled nontransitory storage media 111. In some instances, the nontransitory storage media 111 can be disposed local to the asset authoring and delivery system 104. In other instances, all or a portion of the nontransitory storage media 111 can be disposed remote from the asset authoring and delivery system 104. In some implementations, the asset authoring and delivery system 104 pushes all or a portion of the asset object content 108 to one or more remote devices 118 for storage on the one or more remote devices 118.

At 4208, the asset authoring and delivery system 104 stores one or more sets of rules for generating authored assets 122 on the one or more remote devices. The one or more sets of rules may be stored in a nontransitory storage memory communicably coupled to the asset authoring and delivery system 104. The sets of rules provide the asset authoring and delivery system 104 with relationships between various asset content objects. Such rules may for example, provide for the display of all asset content objects 108 related to a vehicle climate control system in a single location of an authored asset providing the vehicle Owner's Guide. Such rules may for example, provide for the display of a first asset content object containing data representative of an image caption with a second asset content object containing data representative of the image.

One or more parties may provide some or all of the one or more sets of rules. In some instances, a manufacturer 502 provides all or a portion of the one or more sets of rules. Such may advantageously permit the presentation of authored assets 122 in a uniform or complimentary presentation style and format. Such may advantageously permit the presentation of authored assets 122 in a format similar to prior published documentation, thereby improving the acceptance of the electronic format authored assets by the public.

In some instances, one or more third parties may provide all or a portion of the one or more sets of rules. Third parties may include an OEM supplier and/or governmental agencies. In some instances, an OEM supplier may provide rules for the presentation of authored assets 122 containing asset content objects 108 logically related to the components, devices, systems, and/or sub-systems supplied by the OEM. In some instances, one or more governmental agencies may require the inclusion and/or arrangement of specific authored assets 122 and/or asset content objects 108 (e.g., consumer information, warnings, and the like) in documentation accompanying an item of manufacture 504.

In some instances, the user may provide all or a portion of the one or more sets of rules. Users may personalize the delivery of authored assets 122 and/or asset content objects 108 by providing the asset authoring and delivery system 104 with one or more sets of rules. The asset authoring and delivery system 104 may pre-store sets of rules to provide users of an item of manufacture with the ability to personalize the appearance and/or content of authored assets 122 and/or asset content objects 108 delivered to a remote device 118 associated with the user. For example, a family (mother, father, and 17 year-old daughter) may share a single vehicle. The mother and father may select a first set of rules that presents authored assets 122 and/or asset content objects 108 in a first format that simulates a traditional text-and-graphics Owner's Guide with which they are familiar. On the other hand, the daughter may select a second set of rules that presents authored assets 122 and/or asset content objects 108 in a second format that presents the Owner's Guide in a modern format that emphasizes audio, video, and A/V presentation of the Owner's Guide. Thus, individual users may select or even customize rule sets covering both the substantive content and presentation format of authored assets 122 provided by the asset authoring and delivery system 104.

At 4210, the asset authoring and delivery system 104, using one or more sets of rules, generates one or more authored assets 122 using the asset content objects 108. In some instances, the asset authoring and delivery system 104 locally generates the one or more authored assets 122 using one or more stored sets of rules and then pushes the one or more authored assets 122 to one or more remote devices 118 associated with an item of manufacture 504. In some instances, the asset authoring and delivery system 104 causes the generation of one or more authored assets 122 locally at some or all of the remote devices 118. In such instances and based on one or more stored sets of rules, the asset authoring and delivery system 104 may communicate some or all of the asset content objects 108 used by the remote device 118 to create the one or more authored assets 122. The method of generating authored assets 122 using asset content objects 108 sourced from information 102 supplied by one or more OEM suppliers and combined using one or more sets of rules concludes at 4212.

Figure 43:
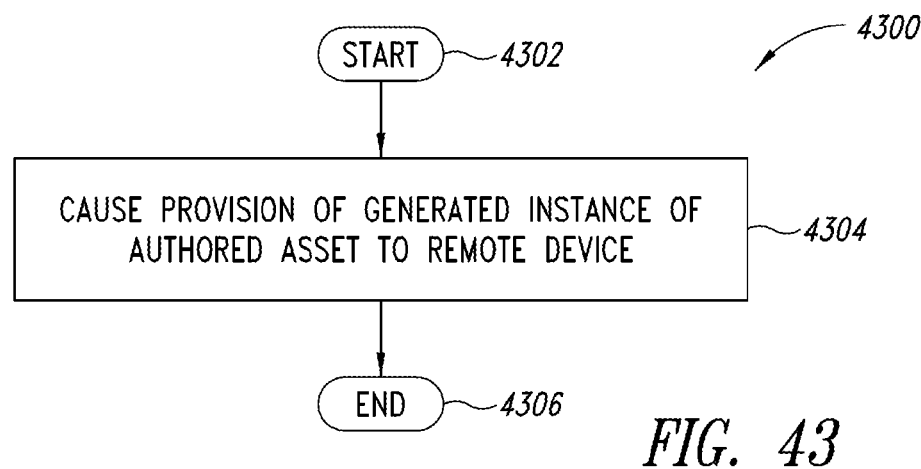
FIG. 43 is a flow diagram of a method of generating an authored asset as described in FIG. 42 on a remote device, according to one non-limiting illustrated embodiment.

FIG. 43 shows a logic diagram 4300 for an example authored asset and delivery system 104 in which the authored assets 122 created using the method of FIG. 42 are communicated to one or more remote devices 118. The asset authoring and delivery system 104 generates any number of authored assets 122 each of which can include any number of asset content objects 108. The asset authoring and delivery system 104 generates the number of authored assets using one or more sets of rules. After generation, the asset authoring and delivery system 104 formats each of the number of authored assets 122 and communicates each of the authored assets to some or all of the remote devices 118. The method of communicating authored assets 122 to one or more remote devices commences at 4302.

At 4304, the asset authoring and delivery system 104 receives at least one input that includes data indicative of the service history associated with and/or one or more service procedures performed on a particular item of manufacture 504. The asset authoring and delivery system 104 formats and communicates one or more authored assets 122 to one or more remote devices 118. In at least some instances, the asset authoring and delivery system 104 can deliver different authored assets 122 to different remote devices 118 logically related to the same item of manufacture 504. For example, a family (mother, father, and 17 year-old son) may share a single vehicle. Responsive to detecting operation of the vehicle at speeds above the speed limit and high lateral acceleration, one or more systems in the vehicle may transmit a message containing data indicative of vehicle speed and lateral acceleration to the asset authoring and delivery system 104. In accordance with a set of rules provided by the father, responsive to the receipt of the data indicative of vehicle speed and lateral acceleration, the asset authoring and delivery system 104 generates and transmits a first authored asset 122a containing asset content objects 108 that include detailed information on the operation of the vehicle to a first remote device 118a (e.g., a tablet computer) associated with the father. The asset authoring and delivery system 104 further generates and transmits a second authored asset 122b containing asset content objects 108 that include safe driving instructions to a second remote device 118b (e.g., a vehicle head unit) associated with the vehicle.

In another example, in response receipt of a request for an authored asset from a vehicle in which the CHECK ENGINE indicator is illuminated, the asset authoring and delivery system 104, using a first set of rules provided by the vehicle manufacturer 502, performs one or more diagnostic procedures and determines an engine timing sensor is malfunctioning. Responsive to the receipt of data indicative of the malfunctioning timing sensor, the asset authoring and delivery system 104, using a second set of rules provided by the vehicle manufacturer 502, generates and communicates a first authored asset 122a to a first remote device 118a (e.g., a smartphone associated with the vehicle operator). The first authored asset 122a can include asset content objects 118 that explain the problem, explain possible consequences if the problem remains unresolved, identify the closest dealership, identify an available service time at the dealership, and provide driving directions to the dealership. In at least some implementations, the asset authoring and delivery system 104 may interface with one or more enterprise management systems, such as an auto dealer enterprise management system. Through such an interface the asset authoring and delivery system 104 can, for example, obtain item delivery dates and/or schedule service appointments.

Using a third set of rules provided by the vehicle manufacturer 502, the asset authoring and delivery system 104 generates and communicates a second authored asset 122b to a second remote device (e.g., an auto dealer computer terminal). The second authored asset 122b can include asset content objects 118 that explain the problem, identify needed replacement parts, identify the vehicle and operator, and identify the scheduled service time and expected repair completion time identify an available service time at the dealership. In at least some instances, the asset authoring and delivery system 104 may further automatically order the necessary repair parts, for example by providing an output containing data indicative of the required parts and a required delivery date, to an auto dealer enterprise management system. The method of generating and communicating authored assets 122 to one or more remote devices 118 concludes at 4306.

Figure 44:
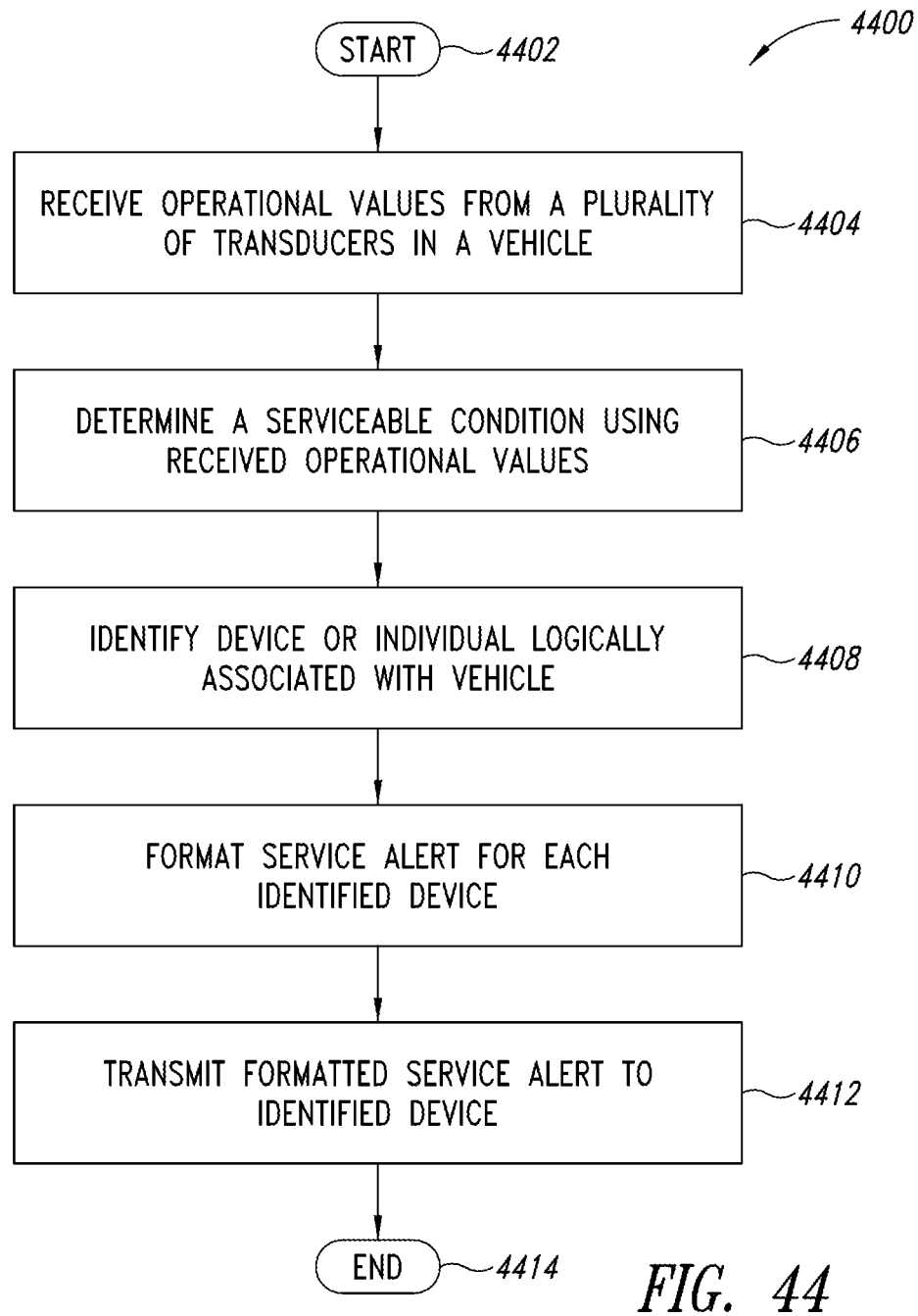
FIG. 44 is a high-level flow diagram of a method of generating at least one instance of a service alert based on data provided by a plurality of vehicle-mounted transducers using an assessment and notification system implemented in conjunction with an authoring and delivery system, according to one non-limiting illustrated embodiment.

FIG. 44 shows a high level logic diagram 4400 for an example authored asset and delivery system 104 functioning as an assessment and notification system that generates vehicle service alerts based upon operational values received from a plurality of transducers in a vehicle. One or more networks 508 communicably couple an item of manufacture 504 such as a vehicle to the asset authoring and delivery system 104. Vehicles 504 are equipped with data acquisition systems to collect data from any number transducers, onboard computers, data collectors, digital processors, and the like. Such data can include raw data indicative a measured vehicle operating parameter such as speed, acceleration, engine revolutions per minute (RPM), lateral acceleration, suspension travel, steering input, braking input, etc. Such data can include data associated with one or more operational aspects of a vehicular system, for example headlamp illumination, turn signals, climate controls, windshield wipers, entertainment controls, etc. Such data can include signals or outputs such as error codes, system operating codes, maintenance codes, service codes, and the like generated by one or more onboard computers, data collectors, and/or digital processors.

Data communicated from an item of manufacture 504 such as a vehicle to the asset authoring and delivery system 104 can provide the asset authoring and delivery system 104 an indication that a condition requiring maintenance or service attention has arisen. For example, wear indicators on the vehicle braking system may provide an input to one or more vehicle systems that brake pad thickness is approaching a defined replacement thickness. In another example, a clutch wear sensor may provide an input to one or more vehicle systems that the pressure plate in the clutch is approaching a defined replacement thickness. In yet another example, a timekeeper and maintenance log on the vehicle may provide an input to one or more vehicle systems indicative of an upcoming recommended 3-month oil change interval.

The asset authoring and delivery system 104 generates one or more service alerts logically associated with a vehicle based on vehicle operational data or values obtained from the respective vehicle. The asset authoring and delivery system 104 formats the generated service alerts prior to communicating the service alerts to one or more remote devices 108 logically associated with the respective vehicle, one or more remote devices logically associated with an operator of the vehicle, one or more remote devices logically associated with an owner of the vehicle, or combinations thereof.

In some implementations, for example a commercial vehicle fleet owner or operator, such service alert information may be advantageously integrated with one or more enterprise management systems. For example, the enterprise system can provide predictive fleet management and scheduling services based on the pending service alerts associated with fleet vehicles. In another example, an enterprise system may advantageously ensure sufficient parts (e.g., oil filters) and consumables (e.g., oil) to meet upcoming fleet maintenance requirements based on pending service alerts. The method 4400 commences at 4402.

At 4404, the asset authoring and delivery system 104 receives data indicative of one or more vehicle operational values from each of a plurality of transducers associated with a vehicle. In at least some instances, the data indicative of one or more vehicle operational values may include data indicative of a single event. For example, the data indicative of one or more vehicle operational values may include data indicative of an air bag deployment, a plugged fuel filter, or a cracked windscreen associated with a particular vehicle. In some instances, the data indicative of one or more vehicle operational values may include data collected over time. For example, one or more transducers can measure engine oil viscosity, oil pump pressure, or tire wear as a function of time.

At 4406, the asset authoring and delivery system 104 can detect at least one serviceable condition based at least in part on the operational values provided by the one or more vehicle operational values. Data indicative of one or more defined threshold values is stored in a nontransitory storage communicably coupled to the asset authoring and delivery system 104. In some instances, the asset authoring and delivery system 104 compares the received data indicative of one or more vehicle operational values with the data indicative of one or more defined threshold values.

For example, the asset authoring and delivery system 104 can compare a vehicle operational value indicative of the engine oil viscosity with one or more defined viscosity thresholds to determine the need for an oil change. In some instances, the asset authoring and delivery system 104 can determine a rate of viscosity degradation to determine a projected date for a future oil change. In another example, the asset authoring and delivery system 104 can compare a vehicle operational value indicative of the tire tread depth with one or more defined tread depth thresholds to determine the need for tire replacement. In some instances, the asset authoring and delivery system 104 can determine a rate of tire tread wear to determine a projected date for a future tire replacement.

At 4408, the asset authoring and delivery system 104 identifies one or more remote devices 108 logically associated with the vehicle providing the operational values. Such remote devices can include one or more remote devices 108 associated with the vehicle owner (e.g., smartphone, portable computer, desktop computer), one or more remote devices 118 associated with the vehicle operator (e.g., smartphone, wearable computer), one or more remote devices 108 associated with the vehicle (e.g., head unit), or any combination thereof. In at least some instances, the asset authoring and delivery system 104 can access one or more communicably coupled data stores or databases to retrieve or otherwise obtain data indicative of the remote devices 118 logically associated with a particular vehicle 504.

At 4410, the asset authoring and delivery system 104 formats the one or more generated service alerts for display on a particular remote device 118 logically associated with the vehicle. Such formatting can include, for example: adjusting text size and spacing; adjusting, changing, or converting video codecs and/or formats, adjusting, changing, or converting audio codecs and/or formats, adjusting, changing, or converting A/V codecs and/or formats; adjusting presentation size; and the like.

In some instances, the asset authoring and delivery system 104 obtains some or all of the remote device parameters from the remote device 108 during using header data, metadata, or similar exchange of protocol during each communication session between the asset authoring and delivery system 104 and the remote device 118. Such can advantageously permit the use of a replacement remote device 118 associated with a particular vehicle simply be porting address data from the old remote device 118 to the new remote device 118. In other instances, the asset authoring and delivery system 104 obtains some or all of the remote device parameters from the one or more data stores or databases accessed during the remote device lookup and retrieval performed at 4408.

At 4412, the asset authoring and delivery system 104 transmits the data indicative of the one or more service alerts formatted at 4410 to the one or more remote devices identified at 4408. The method 4400 of gathering operational values, determining serviceable conditions, and communicating service alerts to a number of remote devices concludes at 4414.

Figure 45:
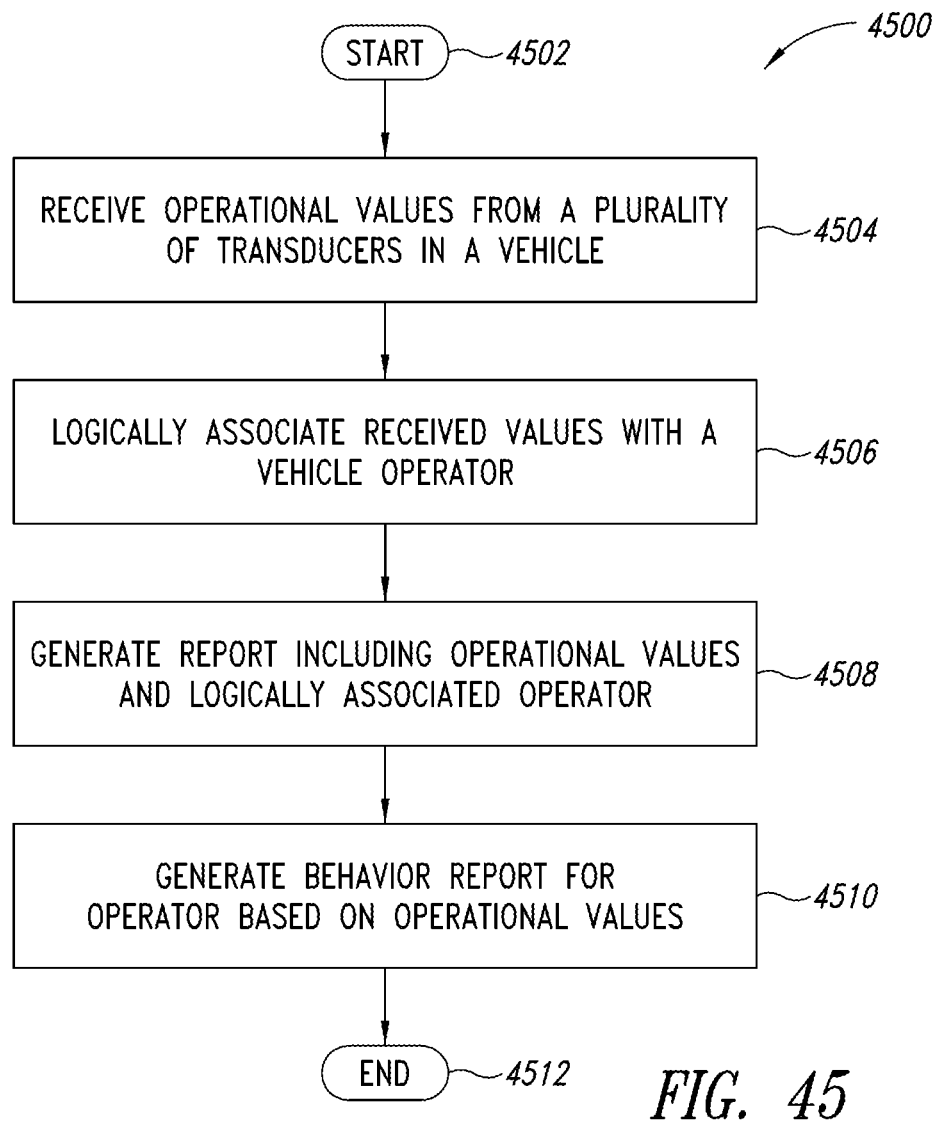
FIG. 45 is a high-level flow diagram of a method of generating driver behavior reports using an assessment and notification system implemented in conjunction with an authoring and delivery system, according to one non-limiting illustrated embodiment.

FIG. 45 shows a high level logic diagram 4500 for an example authored asset and delivery system 104 functioning as an assessment and notification system that generates vehicle operator behavior reports based upon operational values received from a plurality of transducers in a vehicle. One or more networks 508 communicably couple an item of manufacture 504 such as a vehicle to the asset authoring and delivery system 104. Vehicles 504 are equipped with data acquisition systems to collect data from any number transducers, onboard computers, data collectors, digital processors, and the like. Such data can include raw data indicative a measured vehicle operating parameter such as speed, acceleration, engine revolutions per minute (RPM), lateral acceleration, suspension travel, steering input, braking input, etc. Such data can include data associated with one or more operational aspects of a vehicular system, for example headlamp illumination, turn signals, climate controls, windshield wipers, entertainment controls, etc. Such data can include signals or outputs such as error codes, system operating codes, maintenance codes, service codes, and the like generated by one or more onboard computers, data collectors, and/or digital processors.

Data communicated from an item of manufacture 504 such as a vehicle to the asset authoring and delivery system 104 can be logically associated with a vehicle operator. Such data may advantageously provide fleet owners with information regarding the "real life" driving practices of drivers. Similarly, such data may advantageously provide parents with information regarding the "real life" driving practices of teenage drivers. In some instances, the logical association of vehicular data with a particular driver may be schedule or temporal based. Vehicular data from received between 8:00 AM and 12:00 PM on January $5^{th}$ is logically associated with the scheduled driver of the vehicle during that interval. In some instances, the asset authoring and delivery system 104 autonomously performs the logical association of vehicular data with a particular driver based on one or more unique identifiers carried by the driver. Such unique identifiers can include personalized ignition keys, identification cards, radio frequency identifiers, and the like. The method 4500 commences at 4502.

At 4504, the asset authoring and delivery system 104 receives data indicative of one or more vehicle operational values from each of a plurality of transducers associated with a vehicle. In at least some instances, the data indicative of one or more vehicle operational values may include data indicative of a single event. For example, the data indicative of one or more vehicle operational values may include data indicative of an air bag deployment, a plugged fuel filter, or a cracked windscreen associated with a particular vehicle. In some instances, the data indicative of one or more vehicle operational values may include data collected over time. For example, one or more transducers can measure engine oil viscosity, oil pump pressure, or tire wear as a function of time.

At 4506, the asset authoring and delivery system 104 logically associated the received operational values with a particular vehicle operator. In some instances, the asset authoring and delivery system 104 performs such an association by obtaining vehicle operator information by receiving data from one or more external systems or devices. Such external systems can include but are not limited to one or more communicably coupled systems capable of providing data indicative of vehicle operator scheduling. Such external devices can include one or more devices that uniquely identify the operator of a vehicle. Example devices can include but are not limited to identification badges, magstripe cards, smart cards such as HID cards, RFID equipped cards, unique ignition keys, and the like. The asset authoring and delivery system 104 stores data indicative of the vehicle operator and data indicative of the received operational values in one or more communicably coupled data stores or databases.

At 4508, the asset authoring and delivery system 104 generates one or more outputs containing data indicative of the vehicular operational values along with data indicative of the vehicle operator. Such information advantageously permits the association between vehicle operator driving habits and the operational values reported by the vehicle. Thus, the asset authoring and delivery system 104 advantageously permits identification of vehicle operators demonstrating proper driving techniques as well as particular vehicle operators demonstrating improper driving techniques.

In some instances, the asset authoring and delivery system 104 may logically associate additional data with the driver identification data and operational value data provided by the vehicle transducers. For example, the asset authoring and delivery system 104 may associate data indicative of a geolocation with a operational value data provided by the vehicle transducers. Such an association would advantageously permit a fleet operator to identify locations where vehicle operational data indicates a high frequency of unacceptable values and reroute deliveries to route demonstrating a more favorable operational data.

At 4510, the asset authoring and delivery system 104 generates one or more reports including data indicative of the operational values associated with a particular driver. In at least some instances, the asset authoring and delivery system 104 can analyze some or all of the operational values to provide an assessment of the vehicle operator. Such an assessment may include one or more general assessments such as "Driver "A" tends to operate the vehicle at speeds of 5-10 MPH above recommended speed" or "Driver "B" tends to take curves too quickly." When location or geolocation data is available, such an assessment may include one or more specific observations such as, "Driver "C" tends to take the corner at $10^{th}$ and Pine too quickly." The method 4500 of gathering operational values, associating the values with a particular vehicle operator, and generating a vehicle operator behavioral assessment concludes at 4512.

Figure 46:
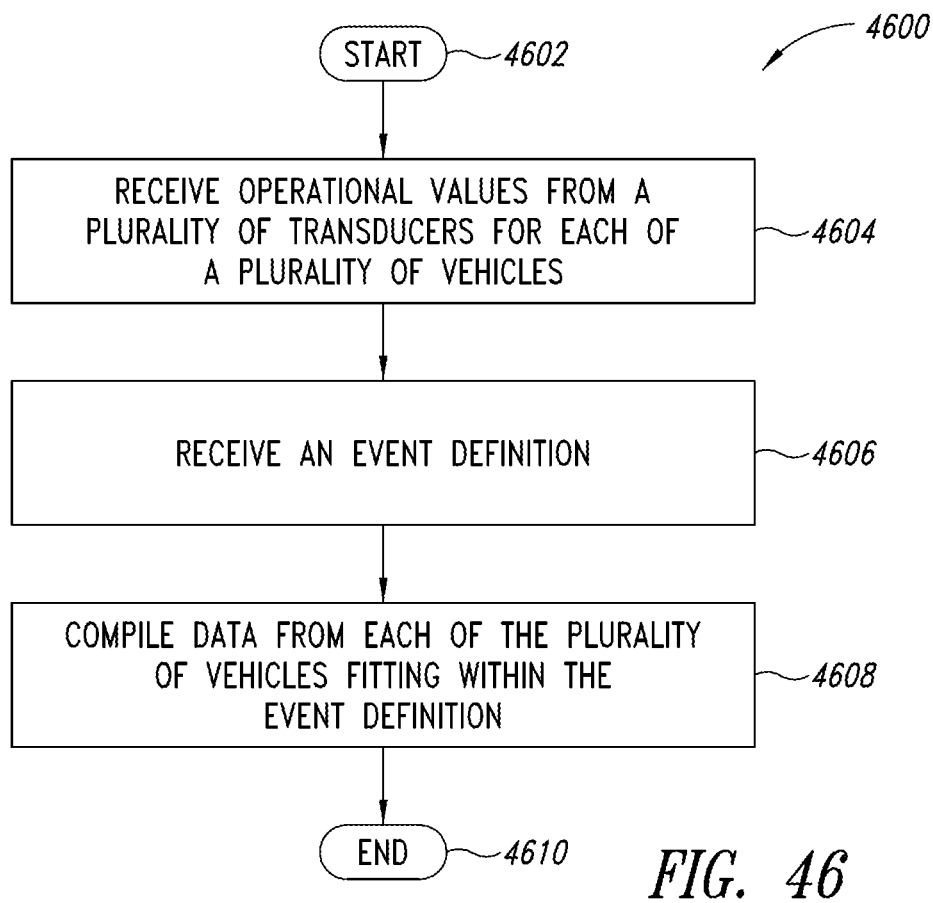
FIG. 46 is a high-level flow diagram of a method of obtaining data from a plurality of vehicles based on one or more user defined event definitions using an assessment and notification system implemented in conjunction with an authoring and delivery system, according to one non-limiting illustrated embodiment.

FIG. 46 shows a high level logic diagram 4600 for an example authored asset and delivery system 104 functioning as a vehicle assessment system that generates reports base on operational values received from a plurality of transducers in a number of vehicles meeting one or more user supplied event definitions. Vehicle mounted transducers obtain information on a wide variety of vehicular systems. Additionally, one or more digital controllers, computers, or digital processors partially or completely control many vehicle systems and devices. Consequently, a vehicle is in operation has the capability of generating a tremendous quantity of data. In some instances, manufacturers 502, dealers, retailers, governmental agencies, police agencies and the like may have an interest in obtaining statistical and/or operational data related to a particular vehicle or a particular class of vehicles.

For example, a manufacturer may receive reports of an issue with a particular make and model of vehicle such as a rapid battery drain if the rear defroster is left ON when the vehicle ignition is switched OFF. In such instances, the manufacturer may desire data from a large population of similar make and model vehicles to assess the prevalence and severity of the problem. In such instances, a system user may provide data indicative of an event definition to the asset authoring and delivery system 104. Such a query may take the form of:

> Make = "A"
> Model = "B"
> REAR DEFROSTER = "ON"
> VEHICLE IGNITION = "OFF"
> BATTERY LEVEL = "LOW"

When the asset authoring and delivery system 104 receives the query, the system 104 can query every vehicle matching the make and model designation for the given combination of conditions. In such an instance, the asset authoring and delivery system 104 returns data in the form of a report that the manufacturer may use as a tool in assessing the prevalence of the issue. The method 4600 commences at 4602.

At 4604, the asset authoring and delivery system 104 receives data indicative of one or more vehicle operational values from each of a plurality of transducers associated with a vehicle. In at least some instances, the data indicative of one or more vehicle operational values may include data indicative of a single event. For example, the data indicative of one or more vehicle operational values may include data indicative of an air bag deployment, a plugged fuel filter, or a cracked windscreen associated with a particular vehicle. In some instances, the data indicative of one or more vehicle operational values may include data collected over time. For example, one or more transducers can measure engine oil viscosity, oil pump pressure, or tire wear as a function of time.

At 4606, the asset authoring and delivery system 104 receives a data input indicative of one or more event definitions. The one or more event definitions may include data indicative of any number of defined values and/or defined ranges of values. In some instances, the event definition may include all vehicles of a certain make and/or model. In some instances, the event definition may include temporal limitations, for example restricting data collection to vehicles manufactured subsequent to Jan. 1, 2013. In some instances, the event definition may include geographic limitations, for example restricting data collection to vehicles in or transiting a certain geographic area, for example vehicles within or transiting within a 25 mile radius of downtown Chicago or vehicles above the 49$^{th}$ parallel of latitude.

A system user can enter data indicative of the event definition locally at the asset authoring and delivery system 104. In some instances, the system user can enter data remotely, for example using a terminal communicably coupled to the asset authoring and delivery system 104 via one or more local area networks, wide area networks, private networks, or worldwide networks (e.g., the Internet).

At 4608, the asset authoring and delivery system 104 compiles data provided by some or all of the vehicles into one or more deliverable outputs. The deliverable output can include hardcopy (e.g., printouts) and/or data files (e.g., a Microsoft® Excel® format spreadsheet file). In at least some instances, the asset authoring and delivery system 104 may perform one or more statistical analyses on the data to confirm the accuracy and/or reliability of the data obtained from each vehicle.

In some instances, all or a portion of the data may be autonomously reported by each vehicle, via one or more remote devices communicably coupled to the vehicle, via one or more portable electronic devices, or some combination thereof. In such instances, the data reporting may be transparent to the vehicle operator. In other instances, the vehicle operator and/or vehicle owner may be notified, for example via one or more SMS messages, pop-up messages, or the like informing the operator and/or owner of the pending data transmission. In yet other instances, the vehicle operator and/or vehicle owner may be notified and permission requested, for example via one or more SMS messages, pop-up messages, or the like to perform the pending data transmission. Such enables the vehicle owner and/or operator to control what may be perceived as the imposition of mandatory data collection while retaining the ability to collect data in compliance with local, state or federal regulations (e.g., that a certain percentage of a vehicle population has undergone a mandatory recall service). The method 4600 of gathering operational values, receiving an event definition, and compiling data returned by a number of vehicles based on the event definition concludes at 4610.

The various methods described herein may include additional acts, omit some acts, and/or may perform the acts in a different order than set out in the various flow diagrams.

The foregoing detailed description has set forth various embodiments of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. In one embodiment, the present subject matter may be implemented via one or more microcontrollers. However, those skilled in the art will recognize that the embodiments disclosed herein, in whole or in part, can be equivalently implemented in standard integrated circuits (e.g., Application Specific Integrated Circuits or ASICs), as one or more computer programs executed by one or more computers (e.g., as one or more programs running on one or more computer systems), as one or more programs executed by on one or more controllers (e.g., microcontrollers), as one or more programs executed by one or more processors (e.g., microprocessors), as firmware, or as virtually any combination thereof, and that designing the circuitry and/or writing the code for the software and/or firmware would be well within the skill of one of ordinary skill in the art in light of the teachings of this disclosure.

When logic is implemented as software and stored in memory, logic or information can be stored on any non-transitory computer-readable medium for use by or in connection with any processor-related system or method. In the context of this disclosure, a memory is a nontransitory computer- or processor-readable storage medium that is an electronic, magnetic, optical, or other physical device or means that non-transitorily contains or stores a computer and/or processor program. Logic and/or the information can be embodied in any computer-readable medium for use by or in connection with an instruction execution system, apparatus, or device, such as a computer-based system, processor-containing system, or other system that can fetch the instructions from the instruction execution system, apparatus, or device and execute the instructions associated with logic and/or information.

In the context of this specification, a "computer-readable medium" can be any physical element that can store the program associated with logic and/or information for use by or in connection with the instruction execution system, apparatus, and/or device. The computer-readable medium can be, for example, but is not limited to, an electronic, magnetic, optical, electromagnetic, infrared, or semiconductor system, apparatus or device. More specific examples (a non-exhaustive list) of the computer readable medium would include the following: a portable computer diskette (magnetic, compact flash card, secure digital, or the like), a random access memory (RAM), a read-only memory (ROM), an erasable programmable read-only memory (EPROM, EEPROM, or Flash memory), a portable compact disc read-only memory (CDROM), and digital tape.

While generally discussed in the environment and context of power system for use with personal transportation vehicle such as all-electric scooters and/or motorbikes, the teachings herein can be applied in a wide variety of other environments, including other vehicular as well as non-vehicular environments. U.S. provisional patent application Ser. No. 61/861,887, filed Aug. 2, 2013; U.S. provisional patent application Ser. No. 61/865,463, filed Aug. 13, 2013; and U.S. application Ser. No. 14/448,683, filed Jul. 31, 2014 are incorporated herein in their entirety. The above description of illustrated embodiments, including what is described in the Abstract, is not intended to be exhaustive or to limit the embodiments to the precise forms disclosed. Although specific embodiments and examples are described herein for illustrative purposes, various equivalent modifications can be made without departing from the spirit and scope of the disclosure, as will be recognized by those skilled in the relevant art.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

We claim:

1. An assessment and notification system, comprising:
at least one communications interface:
a processor communicably coupled to the at least one communications interface; and
at least one nontransitory storage communicably coupled to the processor and containing processor-readable, machine-executable instructions that, when executed by the processor, cause the at least one processor to provide an assessment and notification system, and which further cause the processor to:
receive respective vehicle operational values from a plurality of transducers for at least a first vehicle, the vehicle operational values specifying operational values for a plurality of at least one of functions or subsystems of at least the first vehicle over time;
determine a serviceable condition based at least on the vehicle operational values;
access a set of user preference information which identifies a set of devices for use in communicating with at least one of an owner or a driver of the vehicle;
identify one or more devices logically associated with at least one of the vehicle or an individual logically associated with the vehicle based at least in part on the set of user preference information;
for each of at least one of the identified devices, format at least one instance of a service alert based on at least one characteristic of the respective at least one of the identified devices; and
transmit the formatted instances of the service alert to the at least one of the identified devices.

2. The system of claim 1 wherein the machine-executable instructions that cause the processor to receive respective vehicle operational values from a plurality of transducers for at least a first vehicle includes receiving a fault code from a diagnostic system of the vehicle, and further causes the processor to:
evaluate the fault code;
determine a severity of a fault indicated by the fault code; and
determine a description of a fault associated with the fault code.

3. The system of claim 1 wherein the machine-executable instructions that cause the processor to determine a serviceable condition based at least on the vehicle operational values, further cause the processor to:
determine the serviceable condition based at least in part on both the vehicle operational values and a service history of the vehicle.

4. The system of claim 3 wherein the machine-executable instructions that cause the processor to determine a serviceable condition based at least in part on the vehicle operational values, further cause the processor to:
determine the serviceable condition based at least in part on a build configuration of the vehicle.

5. The system of claim 1 wherein the machine-executable instructions that cause the processor to identify one or more devices logically associated with at least one of the vehicle or an individual logically associated with the vehicle, further cause the processor to:
select one or more of the identified devices based on at least one situational awareness criteria indicative of a current situation of at least one of the vehicle, the owner or the driver of the vehicle, or of the devices.

6. The system of claim 1 wherein the machine-executable instructions that cause the processor to identify one or more devices logically associated with at least one of the vehicle or an individual logically associated with the vehicle, further cause the processor to:
identify a user interface of a head unit of the vehicle and at least one of a handheld mobile communications device or an electronic mail address logically associated with at least one of an owner or a driver of the vehicle.

7. The system of claim 1 wherein the machine-executable instructions that cause the processor to format at least one instance of a service alert based on at least one characteristic of the respective at least one of the identified devices, further cause the processor to:
format a first instance of the service alert as at least one of an audio or an audiovisual message playable via a head unit of the vehicle.

8. The system of claim 7 wherein the machine-executable instructions that cause the processor to format at least one instance of a service alert based on at least one characteristic of the respective at least one of the identified devices, further cause the processor to:

format a second instance of the service alert as at least one of an audio or an audiovisual message playable via at least one of a head unit of the vehicle or handheld mobile communications device or a Web browser executed by a processor-based device.

9. The system of claim 8 wherein the machine-executable instructions that cause the processor to format at least one instance of a service alert based on at least one characteristic of the respective at least one of the identified devices, further cause the processor to:

format a third instance of the service alert as a textual description for transmission as an electronic mail or text, providing further details of regarding the serviceable condition and a subsystem to which the serviceable condition relates beyond the audio or the audiovisual message.

10. The system of claim 9 wherein the machine-executable instructions that cause the processor to format the third instance of the service alert as a textual description, further cause the processor to:

determine a user specified level of detail reporting preference; and format the third instance of the service alert as a textual description based at least in part on the user specified level of detail reporting preference.

11. The system of claim 1 wherein the machine-executable instructions cause the processor to further:

identify at least one service provider;

determine a number of appointment availabilities for the identified service providers; and transmit the determined appointment availabilities to at least one of the vehicle, an owner of the vehicle or a driver of the vehicle.

12. The system of claim 11 wherein the machine-executable instructions that cause the processor to transmit the determined appointment availabilities, further cause the processor to:

transmit the appointment availabilities for presentation as respective selectable icons.

13. The system of claim 11 wherein the machine-executable instructions that cause the processor to identify at least one service provider, further cause the processor to:

identify at least one service provider previously used by the owner of the vehicle or the driver of the vehicle.

14. The system of claim 11 wherein the machine-executable instructions further cause the processor to:

transmit an appointment request to the at least one service provider in response to a selection of one of the appointment availabilities.

15. The method of claim 11 wherein the machine-executable instructions further cause the processor to:

transmit to the at least one service provider a report which provides at least a fault code.

16. The system of claim 11 wherein the machine-executable instructions further cause the processor to:

identify at least one service that is at least one of overdue or due to be performed on the vehicle within a defined period of a current date; and transmit a scheduled service notification to the at least one device notifying at least one of the owner or the driver of the vehicle of the service to be performed.

17. The system of claim 16 wherein the machine-executable instructions further cause the processor to:

determine an amount of time required to service the vehicle to correct the a fault condition; and account for the time required to service the vehicle to correct the fault condition when determining the appointment availabilities.

18. The system of claim 17 wherein the machine-executable instructions further cause the processor to:

determine whether parts are needed to service the vehicle to correct the fault condition;

if parts are needed, determine whether the parts are in stock;

if the parts are not in stock, determine an amount of time required to obtain the parts; and account for the time required to obtain the parts when determining the appointment availabilities.

19. The system of claim 11 wherein the machine-executable instructions further cause the processor to:

identify at least one scheduled maintenance service that is at least one of overdue or due to be performed in a defined period of a present date;

transmit a scheduled maintenance service notification to the at least one device notifying at least one of the owner or the driver of the vehicle of the scheduled maintenance service to be performed.

20. The system of claim 11 wherein the machine-executable instructions further cause the processor to:

identify at least one warranty service that is at least due to be performed;

transmit a warranty service notification to the at least one device that notifies at least one of the owner or the driver of the vehicle of the warranty service to be performed.

21. The system of claim 20 wherein the machine-executable instructions further cause the processor to:

determine an amount of time required to perform the warranty service on the vehicle; and account for the time required to perform the warranty service on the vehicle in addition to the service to correct a fault condition when determining the appointment availabilities.

22. The system of claim 21 wherein the machine-executable instructions further cause the processor to:

determine whether parts are needed to perform the warranty service on the vehicle;

if parts are needed, determine whether the parts are in stock;

if the parts are not in stock, determine an amount of time required to obtain the parts; and account for the time required to obtain the parts when determining the appointment availabilities.

23. The system of claim 1 wherein the machine-executable instructions further cause the processor to:

determine an amount of time required to perform a scheduled maintenance service on the vehicle; and account for the time required to perform the scheduled maintenance service on the vehicle in addition to the service to correct a fault condition when determining appointment availabilities.

24. The system of claim 23 wherein the machine-executable instructions further cause the processor to:

determine whether parts are needed to perform the scheduled maintenance service on the vehicle;

if parts are needed, determine whether the parts are in stock;

if the parts are not in stock, determine an amount of time required to obtain the parts; and account for the time required to obtain the parts when determining the appointment availabilities.

25. A vehicle assessment system, comprising:

at least one communications interface;

a processor communicably coupled to the at least one communications interface; and at least one nontransitory storage communicably coupled to the processor and containing processor-readable, machine-executable instructions that, when executed by the processor, cause the at least one processor to provide an assessment system, and which further cause the processor to:

receive respective vehicle operational values from a plurality of transducers for each of a plurality of vehicles of a first make and model of vehicle by at least one circuit of the vehicle assessment system, the vehicles of the first make and model of vehicles having respective ones of a number of build configurations, the vehicle operational values specifying operational values for a plurality of at least one of functions or subsystems of a respective one of the vehicles over time;

receive an event definition, the event definition specifying at least one of: driver demographic specifying information, environmental condition specifying information, geographic area specifying information, driver behavior specifying information, vehicle build configuration specifying information; and compile data from each of the vehicles that fit within or which operation fits within the event definition.

26. The system of claim 25 wherein the machine-executable instructions further cause the processor to:

perform a statistical trend analysis of the complied data.

27. The system of claim 25 wherein the machine-executable instructions further cause the processor to:

sample data for a first set of functions at a first frequency over a first period; and sample data for a second set of functions at a second frequency over the first period.

28. The system of claim 25 wherein the machine-executable instructions that cause the processor to receive an event definition, further cause the processor to:

receive driver demographic specifying information that specifies a set of driver age ranges.

29. The system of claim 25 wherein the machine-executable instructions that cause the processor to receive an event definition, further cause the processor to:

receive environmental condition specifying information that specifies a set of climate zones.

30. The system of claim 25 wherein the machine-executable instructions that cause the processor to receive an event definition, further cause the processor to:

receive environmental condition specifying information that specifies a portion of vehicles to be sampled from each of at least two different climate zones.

31. The system of claim 25 wherein the machine-executable instructions that cause the processor to receive an event definition, further cause the processor to:

receive driver behavior specifying information that specifies at least one of a driver braking profile or acceleration profile.

32. The system of claim 25 wherein the machine-executable instructions that cause the processor to receive an event definition, further cause the processor to:

receive vehicle build configuration specifying information that specifies at least one sales code that identifies a subset from all vehicles of the first make and model of vehicles.

33. The system of claim 25 wherein the machine-executable instructions further cause the processor to:

for each of the plurality of vehicles, receive respective environmental data indicative of ambient environmental conditions in which the vehicle is operating; and correlate the received environmental data with the operational values.

* * * * *